(12) United States Patent
Ito et al.

(10) Patent No.: US 7,393,569 B2
(45) Date of Patent: Jul. 1, 2008

(54) POLYMERIZABLE LIQUID CRYSTAL COMPOSITION AND POLYMER THEREOF

(75) Inventors: Maiko Ito, Chiba (JP); Masami Kimura, Chiba (JP); Ryushi Shundo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 187 days.

(21) Appl. No.: 11/449,593

(22) Filed: Jun. 9, 2006

(65) Prior Publication Data

US 2006/0278851 A1    Dec. 14, 2006

(30) Foreign Application Priority Data

Jun. 9, 2005   (JP) ............................. 2005-169337
Apr. 24, 2006  (JP) ............................. 2006-118810

(51) Int. Cl.
    C09K 19/52   (2006.01)
    C09K 19/38   (2006.01)
    C07D 305/02  (2006.01)
    C07D 305/04  (2006.01)
    C07C 69/76   (2006.01)

(52) U.S. Cl. .................... 428/1.1; 252/299.01; 549/511; 560/76; 560/80; 560/83; 560/87

(58) Field of Classification Search ............ 252/299.01, 252/299.62, 299.67; 560/183, 65, 76, 80, 560/83, 87; 570/126, 129; 428/1.1; 549/511
See application file for complete search history.

(56) References Cited

U.S. PATENT DOCUMENTS

| 5,635,106 A * | 6/1997 | Basturk et al. ......... 252/299.01 |
| 7,101,595 B2 * | 9/2006 | Shundo et al. ............... 428/1.1 |
| 2005/0031801 A1 * | 2/2005 | Shundo et al. ............... 428/1.1 |
| 2006/0006364 A1 * | 1/2006 | Shundo et al. ......... 252/299.62 |

FOREIGN PATENT DOCUMENTS

| JP | 2001-55573 | * | 2/2001 |
| JP | 2001-154019 | * | 6/2001 |
| JP | 2005-60373 | * | 3/2005 |

OTHER PUBLICATIONS

Choi et al. "Synthesis, Thermal and Radiation Sensitivities of Halogen-containing Decamethylene-spacered Aromatic Polyesters", Polymers for Advance Technologies vol. 9, pp. 52-61, 1998.*
Zhang et al. "Effect of Flexible Spacers in Liquid Crystalline Copolyesters containing a Non-linear Biphenyl Moiety", Makromol. Chem. 189, pp. 2219-2229, 1988.*

* cited by examiner

*Primary Examiner*—Shean C Wu
(74) *Attorney, Agent, or Firm*—Hogan & Hartson LLP

(57) ABSTRACT

A polymerizable liquid crystal composition containing compounds represented by the formula (1-1) and the formula (1-2), compounds represented by the formula (2-1) and the formula (2-2), and a compound represented by the formula (3-1):

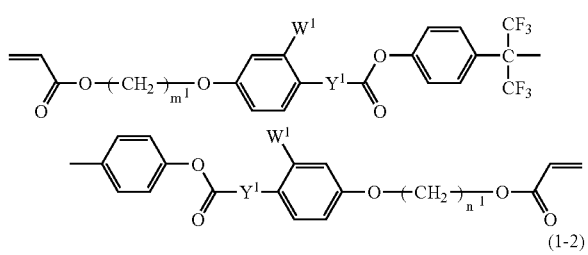

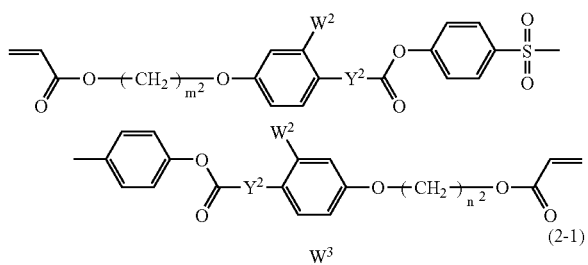

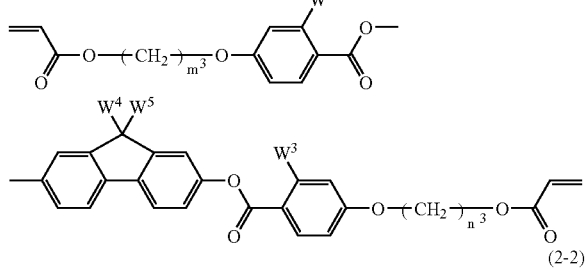

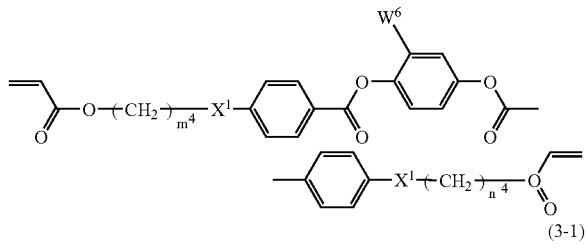

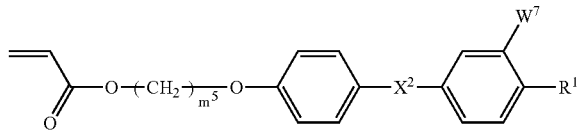

the polymerizable liquid crystal composition having homogeneous, homeotropic, or hybrid alignment, which can be coated on a support substrate, for example, of a transparent plastic film such as a triacetyl cellulose film or cycloolefin polymer film, or glass, and is aligned on a substrate as a polymer film while maintaining the alignment.

29 Claims, 1 Drawing Sheet

POLYMERIZABLE LIQUID CRYSTAL COMPOSITION AND POLYMER THEREOF

CROSS REFERENCE TO RELATED APPLICATIONS

This application claims priority under 35 U.S.C. § 119 to Japanese Patent Application No. JP 2005-169337, filed Jun. 9, 2005 and Japanese Patent Application No. 2006-118810, filed Apr. 24, 2006, which applications are expressly incorporated herein by reference in their entirety.

BACKGROUND OF THE INVENTION

1. Field of the Invention

The invention concerns a compound having —$C(CF_3)_2$— (hexafluoroisopropylidene) or —$SO_2$— (sulfonyl), a polymerizable liquid crystal composition containing the same, a polymer obtained from the composition, and application use thereof.

2. Description of the Related Art

It has been known that a polymer having optical anisotoropy is obtained by polymerizing a polymerizable compound when it has liquid crystallinity (as disclosed in JP-A No. 2001-55573). This is because the alignment of liquid crystal molecules is fixed by polymerization. An example of such a compound is a liquid crystal compound having —$OCOCH=CH_2$ (disclosed in JP-A No. 2001-154019). A liquid crystal compound polymerized at a room temperature under irradiation of UV-light has also been known (disclosed in JP-A No. 2005-60373). Such a polymerizable liquid crystal compound copolymerizes with a polymerizable compound not having liquid crystallinity. The non-liquid crystal compound has a role of controlling the characteristics of the obtained copolymer. Accordingly, development of the polymerizable non-liquid crystal compound is important for obtaining a polymer having an appropriate optical isomerism.

SUMMARY OF THE INVENTION

The invention provides a polymerizable liquid crystal composition that can be coated on a support substrate, for example, a transparent plastic film such as a triacetyl cellulose film or cycloolefin polymer film, or glass, and has an alignment property such as homogeneous, homeotropic, or hybrid alignment. The invention also provides a film formed by aligning and polymerizing a polymerizable liquid crystal composition on a substrate while keeping the alignment as it is. The invention further provides a polymer film capable of satisfying a plurality of characteristics including, for example, having optical anisotoropy, colorless transparency, low photoelasticity, less peeling property from a support substrate, sufficient hardness, high heat resistance, high light fastness, etc. Furthermore, the invention provides a polymerizable compound capable of stabilizing alignment and obtaining a coating film with less alignment defects by adding to a polymerizable liquid crystal composition.

The invention includes (i) a polymerizable liquid crystal composition containing at least one compound selected from the group of compounds represented by the formula (1-1) and the formula (1-2) as a first ingredient, at least one compound selected from the group of compounds represented by the formula (2-1) and the formula (2-2) as a second ingredient, and at least one compound selected from the group of compounds represented by the formula (3-1) as a third ingredient, (ii) a polymer obtained by polymerizing the composition, (iii) the application use of the polymer, and (iv) polymerizable compounds represented by the formula (7), (8), (9), (10), and (11):

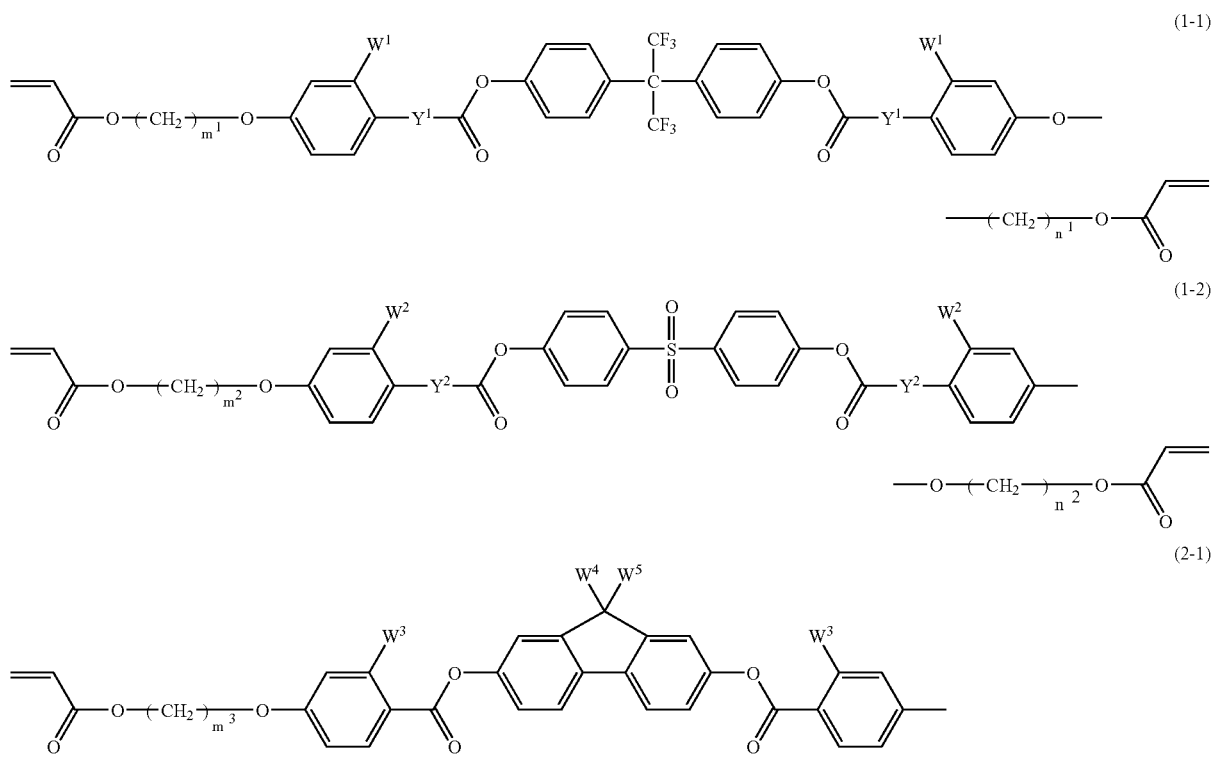

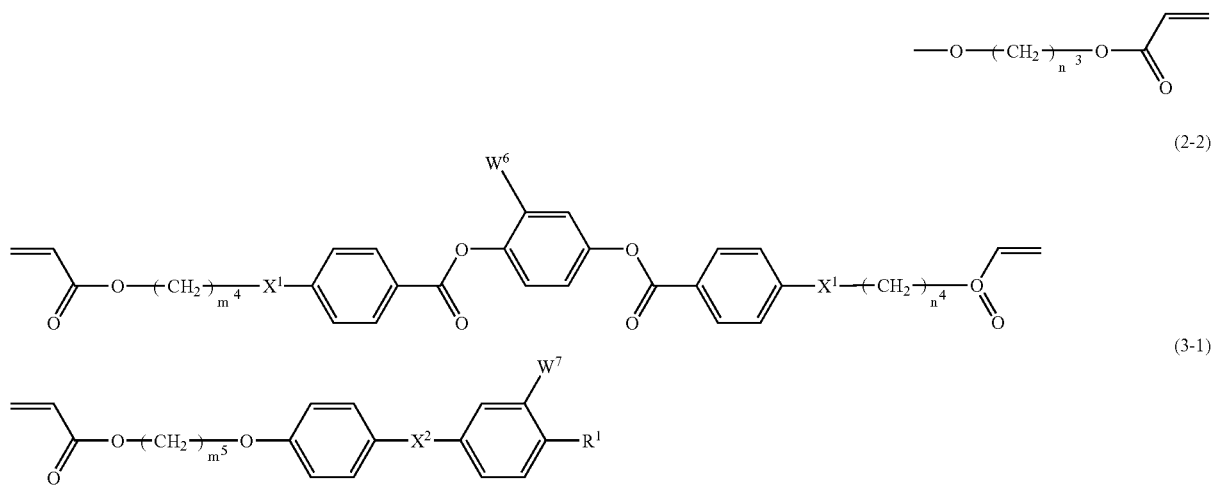

(2-2)

(3-1)

in which, $Y^1$ and $Y^2$ each represents independently a single bond, $-(CH_2)_2-$ or $-CH=CH-$, $W^1$ and $W^2$ each represents independently hydrogen or fluorine, $m^1$, $m^2$, $n^1$, and $n^2$ each represents independently an integer of from 2 to 15 in the formula (1-1) and the formula (1-2); $W^3$ represents hydrogen or fluorine, $W^4$ and $W^5$ each represents independently hydrogen or methyl, $W^6$ represents hydrogen or methyl, $X^1$ represents a group represented by $-O-$ or the formula ($X^1$-2),

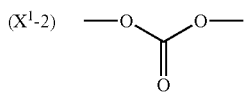

and $m^3$, $m^4$, $n^3$ and $n^4$ each represents independently an integer of from 2 to 15 in the formula (2-1) and the formula (2-2); $R^1$ represents cyano, trifluoromethoxy, alkyl of 1 to 10 carbon atoms, or alkoxy of 1 to 10 carbon atoms, $W^7$ represents hydrogen or fluorine, $X^2$ represents a single bond, $-COO-$, or $-OCO-$, and $m^5$ represents an integer of from 2 to 15 in the formula (3-1).

The invention provides a polymerizable liquid crystal composition containing a non-liquid crystal polymerizable compound. When the composition is coated on a substrate, it exhibits alignment such as homeotropic, homogeneous or hybrid alignment. The polymer obtained from the composition satisfies a plurality of characteristics such as having optical anisotoropy, colorless transparency, low photoelasticity, less peeling property from support substrate, sufficient hardness, high heat resistance, high light fastness, etc. The invention provides a compound having polymerizability and not having liquid crystallinity. The compound satisfies a plurality of characteristics including easy polymerizability even at room temperature, easy photopolymerizability, high solubility to solvent, colorless, chemical stability, good compatibility with polymerizable liquid crystal compound, good wettability with the support substrate, etc. The compound stabilizes the polymerizable liquid crystal composition to which the compound is added for a long time and, further, controls the alignment of liquid crystal molecules. The compound has an appropriate balance with respect to the plurality of characteristics.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
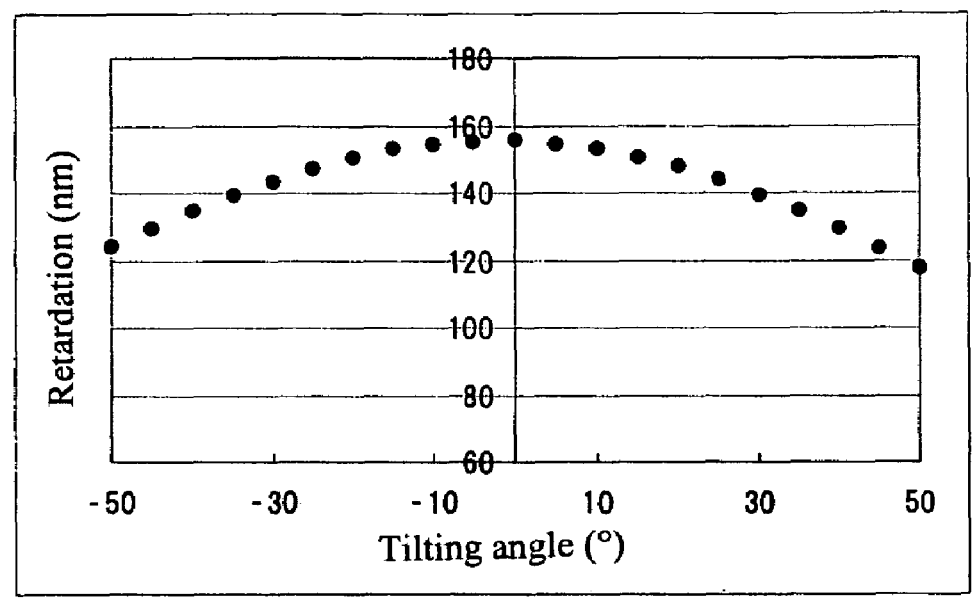
FIG. 1 shows homogeneous alignment, which is a result of measuring retardation of a polymer film (F-1) obtained in Example 17.

Reference will now be made in detail to the preferred embodiments of the invention. This invention may, however, be embodied in many different forms and should not be construed as limited to the embodiments set forth herein. In addition and as will be appreciated by one of skill in the art, the invention may be embodied as a method, system or process.

The terminology in the specification is as described below. The liquid crystal compound is a general term for compounds having a liquid crystal phase and compounds not having the liquid crystal phase but useful as an ingredient for liquid crystal compositions. The liquid crystal phase includes a nematic phase, smectic phase, cholesteric phase, etc. and often means the nematic phase. The polymerizability means an ability of a monomer which is polymerized by light, heat, catalyst or like other to form a polymer. The compound represented, for example, by the formula (1-1) may sometimes be expressed, for example, as a compound (1-1). The term "% by weight" for the polymerizable compound is a ratio based on the entire weight of the polymerizable compound contained in the composition. The term "% by weight" for the additive is a ratio based on the entire weight of the polymerizable composition.

A polymer obtained from a polymerizable liquid crystal compound has optical anisotoropy. This is because the alignment of liquid crystal molecules is fixed by polymerization. We have found that by adding the compound (1-1), the compound (1-2), the compound (5-1), or the compound (5-2) which is a non-liquid crystal polymerizable compound to a polymerizable liquid crystal composition, alignment of the polymerizable liquid crystal composition is stabilized to obtain a polymerizable liquid crystal coating film with no alignment defects and that when the coating film is polymerized, polymerization proceeds while fixing the alignment of the liquid crystal molecules to obtain an optically anisotoropic film with no alignment defects. Further, as a result of reviewing the molecular structure of the non-liquid crystalline polymerizable compound, we have found a compound excellent in compatibility with a polymerizable liquid crystal composition and, further, capable of stabilizing the polymerizable liquid crystal composition to which the compound is added for a long time and have accomplished the invention, including:

(1) A polymerizable liquid crystal composition containing at least one compound selected from the group of compounds represented by the formula (1-1) and the formula (1-2) as a first ingredient, at least one compound selected from the group of compounds represented by the formula (2-1) and the formula (2-2) as a second ingredient, and at least one compound selected from the group of compounds represented by the formula (3-1) as a third ingredient,

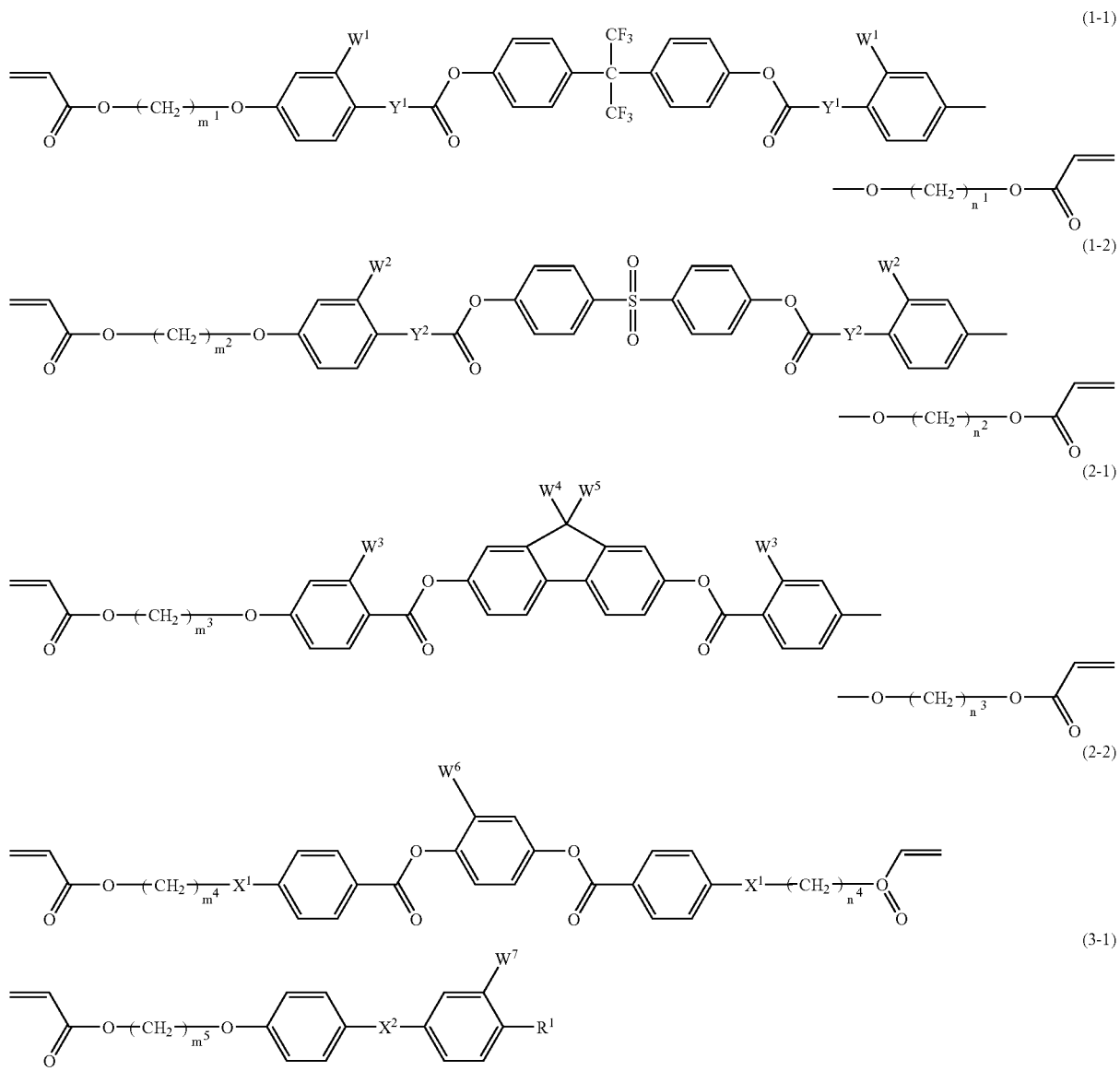

in which $Y^1$ and $Y^2$ each represents independently a single bond, —$(CH_2)_2$— or —CH=CH—, $W^1$ and $W^2$ each represents independently hydrogen or fluorine, $m^1$, $m^2$, $n^1$, and $n^2$ each represents independently an integer of from 2 to 15 in the formula (1-1) and the formula (1-2); $W^3$ represents hydrogen or fluorine, $W^4$ and $W^5$ each represents independently hydrogen or methyl, $W^6$ represents hydrogen or methyl, $X^1$ is a group represented by —O— or the following formula ($X^1$-2),

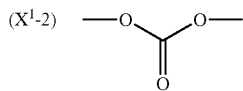

and $m^3$, $m^4$, $n^3$, and $n^4$ each represents independently an integer of from 2 to 15 in the formula (2-1) and the formula (2-2); and $R^1$ represents cyano, trifluoromethoxy, alkyl of 1 to 10 carbon atoms, or alkoxy of 1 to 10 carbon atoms, $W^7$ represents hydrogen or fluorine, $X^2$ represents a single bond, —COO—, or —OCO—, and $m^5$ represents an integer of from 2 to 15 in the formula (3-1).

(2) A polymerizable liquid crystal composition according to (1) described above, wherein the second ingredient is at least one compound selected from the group of compounds represented by the formula (2-1), the ratio of the first ingredient is within a range from approximately 1% to approximately 25% by weight, the ratio of the second ingredient is within a range from approximately 50% to approximately 98% by weight, and the ratio of the third ingredient is within a range from approximately 1% to approximately 25% by weight based on the polymerizable liquid crystal composition; $Y^1$ and $Y^2$ each represents independently a single bond or —$(CH_2)_2$—, $W^1$ and $W^2$ each represents independently hydrogen or fluoride, and $m^1$, $m^2$, $n^1$, and $n^2$ each represents independently an integer of from 2 to 10 in the formula (1-1) and the formula (1-2); $W^3$ represents hydrogen, $W^4$ represents hydrogen, $W^5$ represents methyl, and $m^3$ and $n^3$ each represents independently an integer of from 2 to 10 in the general formula (2-1); and $X^2$ represents a single bond, —COO—, or —OCO—, $W^7$ represents hydrogen, $m^5$ represents an integer of from 2 to 10, and $R^1$ represents cyano, alkyl of 2 to 8 carbon atoms, or alkoxy of 2 to 8 carbon atoms in the formula (3-1).

(3) A polymerizable liquid crystal composition according to (2) described above, wherein the ratio of the first ingredient is within a range from approximately 7% to approximately 22% by weight, the ratio of the second ingredient is within a range from approximately 56% to approximately 86% by weight, and the ratio of the third ingredient is within the range from approximately 7% to approximately 22% by weight based on the polymerizable liquid crystal composition; $Y^1$ and $Y^2$ each represents independently a single bond or —$(CH_2)_2$—, $W^1$ and $W^2$ each represents hydrogen, and $m^1$, $m^2$, $n^1$, and $n^2$ each represent independently an integer of from 4 to 6 in the formula (1-1) and the formula (1-2); $W^3$ represents hydrogen, $W^4$ represents hydrogen, $W^5$ represents methyl, and $m^3$ and $n^3$ each represents independently an integer of from 4 to 6 in the general formula (2-1); and $X^2$ represents a single bond, $W^7$ represents hydrogen, $m^5$ represents an integer of from 4 to 6, and $R^1$ represents cyano in the formula (3-1).

(4) A polymerizable liquid crystal composition according to (1) described above, wherein the second ingredient is at least one compound selected from the group of compounds represented by the formula (2-2), the ratio of the first ingredient is within a range from approximately 1% to approximately 25% by weight, the ratio of the second ingredient is within a range from approximately 50% to approximately 98% by weight, and the ratio of the third ingredient is within a range from approximately 1% to approximately 25% by weight based on the polymerizable liquid crystal composition; $Y^1$ and $Y^2$ each represents independently a single bond or —$(CH_2)_2$—, $W^1$ and $W^2$ each represents independently hydrogen or fluoride, and $m^1$, $m^2$, $n^1$, and $n^2$ each represents independently an integer of from 2 to 10 in the formula (1-1) and the formula (1-2); $X^1$ is a group represented by —O— or the following formula ($X^1$-2),

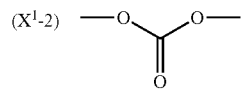

$W^6$ represents hydrogen or methyl, $m^4$ and $n^4$ each represents independently an integer of from 2 to 10 in the formula (2-1); and $X^2$ represents a single bond, —COO—, or —OCO—, $W^7$ represents hydrogen, $m^5$ represents an integer of from 2 to 10, and $R^1$ represents cyano, alkyl of 2 to 8 carbon atoms, or alkoxy of 2 to 8 carbon atoms in the formula (3-1).

(5) A polymerizable liquid crystal composition according to (4) described above, wherein the ratio of the first ingredient is within a range from approximately 7% to approximately 22% by weight, the ratio of the second ingredient is within a range from approximately 56% to approximately 86% by weight, and the ratio of the third ingredient is within the range from approximately 7% to approximately 22% by weight based on the polymerizable liquid crystal composition; $Y^1$ and $Y^2$ each represents independently a single bond or —$(CH_2)_2$—, $W^1$ and $W^2$ each represents hydrogen, and $m^1$, $m^2$, $n^1$, and $n^2$ each represents independently an integer of from 4 to 6 in the formula (1-1) and the formula (1-2); $W^6$ represents methyl, $X^1$ represents —O—, and $m^4$ and $n^4$ each represents independently an integer of from 4 to 6 in the general formula (2-2); and $X^2$ represents a single bond, $W^7$ represents hydrogen, $m^5$ represents an integer of from 4 to 6, and $R^1$ represents cyano in the formula (3-1).

(6) A polymerizable liquid crystal composition containing a polymerizable liquid crystal composition according to any one of (1) to (5) described above and a silane coupling agent represented by the following formula (4),

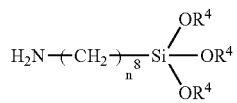

wherein the ratio of the polymerizable liquid crystal composition to the silane coupling agent is within a ration range from approximately 100:1 (by weight) to approximately 100:10 (by weight), and $R^4$ represents methyl or ethyl, and $n^8$ represents an integer of from 1 to 5 in the formula (4).

(7) A polymerizable liquid crystal composition containing at least one compound selected from the group of compounds represented by the formula (5-1) and the formula (5-2) as a first ingredient, at least one compound selected from the group of compounds represented by the formula (6-1) and the formula (6-2) as a second ingredient, and at least one compound selected from the group of compounds represented by the formula (7-1) as a third ingredient,

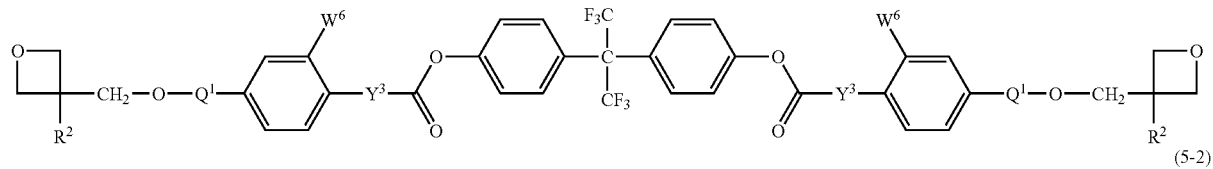
(5-1)

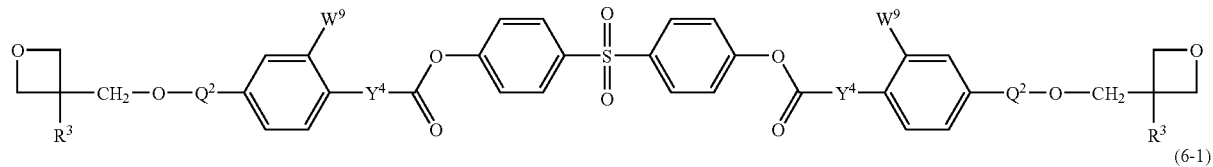
(5-2)

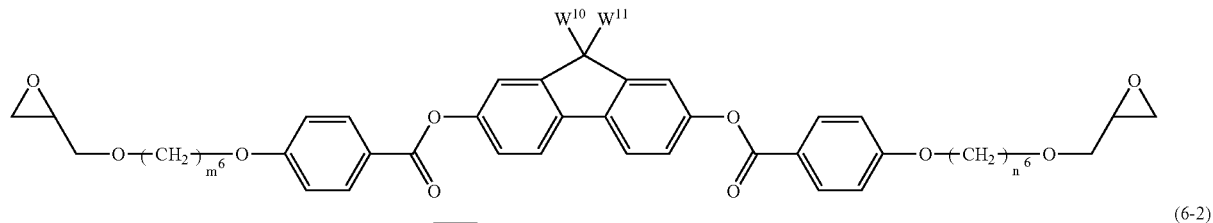
(6-1)

(6-2)

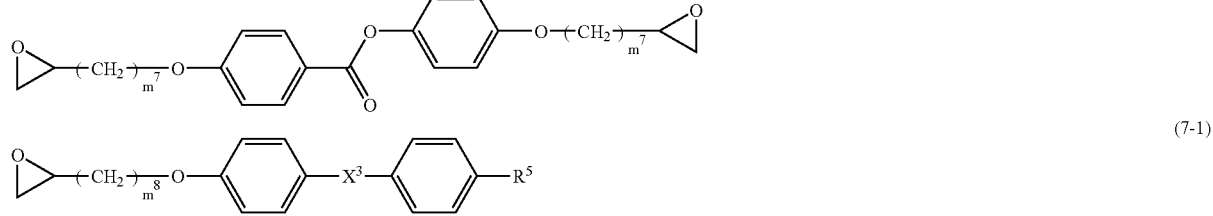
(7-1)

in which $R^2$ and $R^3$ each represents independently methyl or ethyl, $Y^3$ and $Y^4$ each represents independently a single bond, —$(CH_2)_2$— or —CH=CH—, $W^8$ and $W^9$ each represents independently hydrogen or fluorine, $Q^1$ and $Q^2$ each represents a single bond, —O—$(CH_2)_{r^1}$—, or —$(CH_2)_{r^1}$—O—, $r^1$ represents an integer of from 1 to 15 in the formula (5-1) and the formula (5-2); $W^{10}$ and $W^{11}$ each represents independently hydrogen or methyl, $m^6$, $m^7$, $n^6$, and $n^7$ each represents independently an integer of from 2 to 15 in the formula (6-1) and the formula (6-2); $X^3$ represents a single bond, —COO—, or —OCO—, $R^5$ represents cyano, alkyl of 2 to 8 carbon atoms, or alkoxy of 2 to 8 carbon atoms, and $m^8$ represents an integer of from 2 to 15 in the formula (7-1).

(8) A polymerizable liquid crystal composition according to (7) described above, wherein the first ingredient is at least one compound selected from the group of compounds represented by the general formula (5-1), and the second ingredient is at least one compound selected from the group of compounds represented by the general formula (6-1), the ratio of the first ingredient is within a range from approximately 1% to approximately 20% by weight, the ratio of the second ingredient is within a range from approximately 60% to approximately 98% by weight, and the ratio of the third ingredient is within a range from approximately 1% to approximately 20% by weight based on the polymerizable liquid crystal composition; $R^2$ represents methyl or ethyl, $Y^3$ represents a single bond or —$(CH_2)_2$—, $W^8$ represents hydrogen or fluorine, $Q^1$ represents a single bond, —O—$(CH_2)r^1$-, or —$(CH_2)r^1$-O—, $r^1$ represents an integer of from 1 to 10 in the formula (5-1); $W^{10}$ and $W^{11}$ each represents independently hydrogen or methyl, $m^6$, and $n^6$ each represents independently an integer of from 2 to 10 in the formula (6-1); and $X^3$ represents a single bond, $R^5$ represents cyano, and $m^8$ is an integer of from 2 to 10 in the formula (7-1).

(9) A polymerizable liquid crystal composition according to (8) described above wherein the ratio of the first ingredient is within a range from approximately 7% to approximately 20% by weight, the ratio of the second ingredient is within a range from approximately 60 to approximately 86% by weight, and the ratio of the third ingredient is within a range from approximately 7% to approximately 20% by weight based on the polymerizable liquid crystal composition; $R^2$ represents ethyl, $Y^3$ represents a single bond, $W^8$ represents hydrogen, and $Q^1$ represents a single bond in the formula (5-1); $W^{10}$ and $W^{11}$ each represents independently hydrogen or methyl, $m^6$ and $n^6$ each represents independently an integer of from 4 to 6 in the formula (6-1); and $X^3$ represents a single bond, $R^5$ represents cyano, and $m^8$ represents an integer of from 2 to 4 in the formula (7-1).

(10) A polymer obtained by polymerizing the polymerizable liquid crystal composition according to any one of (1) to (9) described above.

(11) A polymer film having optical anisotoropy obtained by polymerizing the composition according to any one of (1) to (9) described above.

(12) Use of the polymer film having the optical anisotoropy according to (11) described above as a phase difference plate.

(13) A liquid crystal display device using the polymer film having optically anisotoropy according to (12) described above.

(14) A compound represented by the formula (7):

(7)

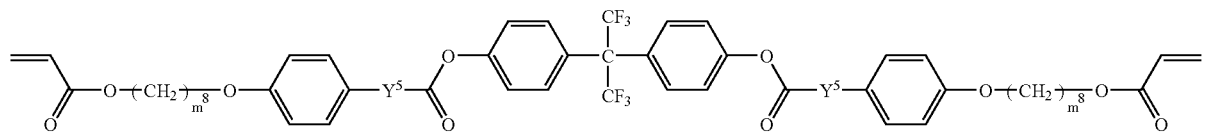

in which $Y^5$ represents —$CH_2CH_2$—, or —CH=CH—, and $m^8$ and $n^8$ each represents independently an integer of from 2 to 15 in the formula (7).

(15) A compound represented by the formula (8):

(8)

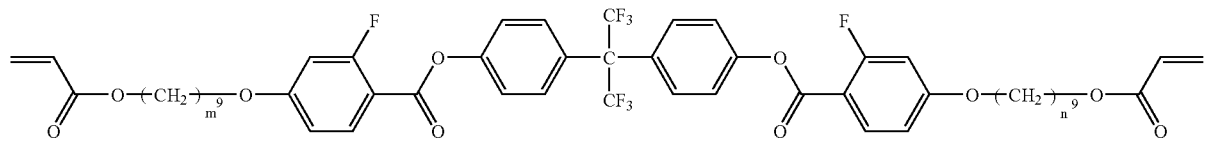

in which $m^9$ and $n^9$ each represents independently an integer of from 2 to 15 in the formula (8).

(16) A compound represented by the formula (9):

(9)

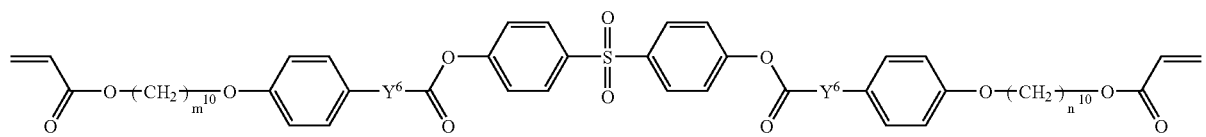

in which $Y^6$ represents —$CH_2CH_2$—, or —CH=CH—, and $m^{10}$ and $n^{10}$ each represents independently an integer of from 2 to 15 in the formula (9).

(17) A compound represented by the formula (10):

in which $R^7$ represents hydrogen, methyl, or ethyl, $A^4$ represents 1,4-phenylene, 2-fluoro-1,4-phenylene, 3-fluoro-1,4-phenylene, naphthalene-2,6-diyl or pyridine-2,5-diyl, $Y^7$ represents a single bond, —$CH_2CH_2$—, or —CH=CH—, $Q^3$ represents a single bond, —O—$(CH_2)r^2$- or —$(CH_2)r^2$-O—, and $r^2$ represents an integer of from 1 to 15 in the formula (10).

(18) A compound according to (17) described above, wherein $R^7$ represents methyl or ethyl, $A^4$ represents 1,4-phenylene, $Y^7$ represents a single bond, and $Q^3$ represents a single bond in the formula (10).

(19) A compound represented by the formula (11):

(10)

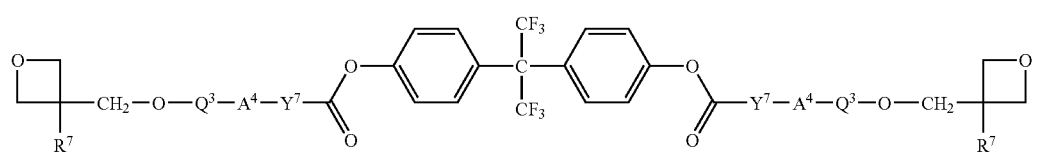

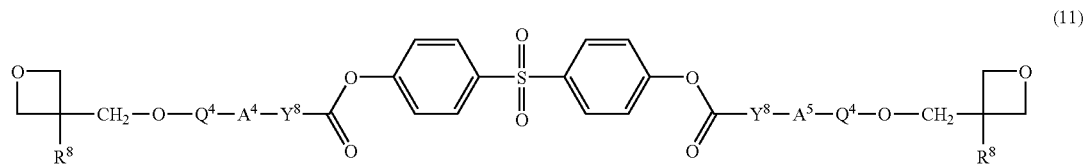

in which $R^8$ represents hydrogen, methyl, or ethyl, $A^5$ represents 1,4-phenylene, 2-fluoro-1,4-phenylene, 3-fluoro-1,4-phenylene, naphthalene-2,6-diyl or pyridine-2,5-diyl, $Y^8$ represents a single bond, —$CH_2CH_2$—, or —CH=CH—, $Q^4$ represents a single bond, —O—$(CH_2)r^3$- or —$(CH_2)r^3$-O—, and $r^3$ represents an integer of from 1 to 15 in the formula (11).

(20) A compound according to (19) described above, wherein $R^8$ represents ethyl, $A^5$ represents 1,4-phenylene, $Y^8$ represents a single bond, and $Q^4$ represents a single bond in the formula (11).

(21) A compound according (19) described above, wherein $R^8$ represents methyl, or ethyl, $A^5$ represents 1,4-phenylene, $Y^8$ represents a single bond, $Q^4$ represents —O—$(CH_2)r^3$- or —$(CH_2)r^3$-O—, and $r^3$ represents an integer of from 1 to 10 in the formula (11).

The polymerizable composition of the invention can be classified into five groups of compositions depending on the kind of the group of the compounds constituting the same.

The first composition group (hereinafter sometimes referred to as "MIX1") is a polymerizable liquid crystal composition containing at least one compound selected from the group of compounds represented by the formula (1-1) and the formula (1-2) as a first ingredient, at least one compound selected from the group of compounds represented by the formula (2-1) and formula the (2-2) as a second ingredient, and at least one compound selected from the group of compounds represented by the formula (3-1) as a third ingredient.

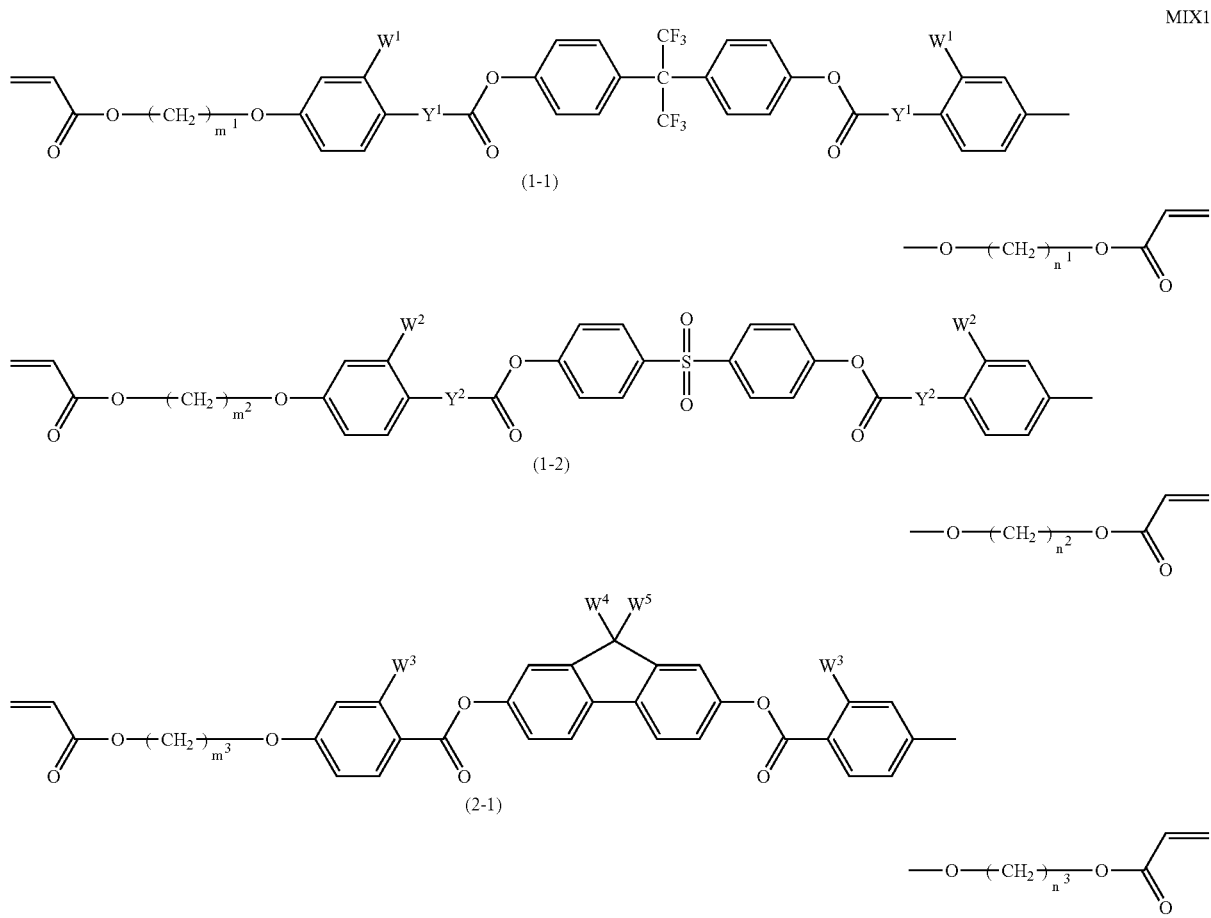

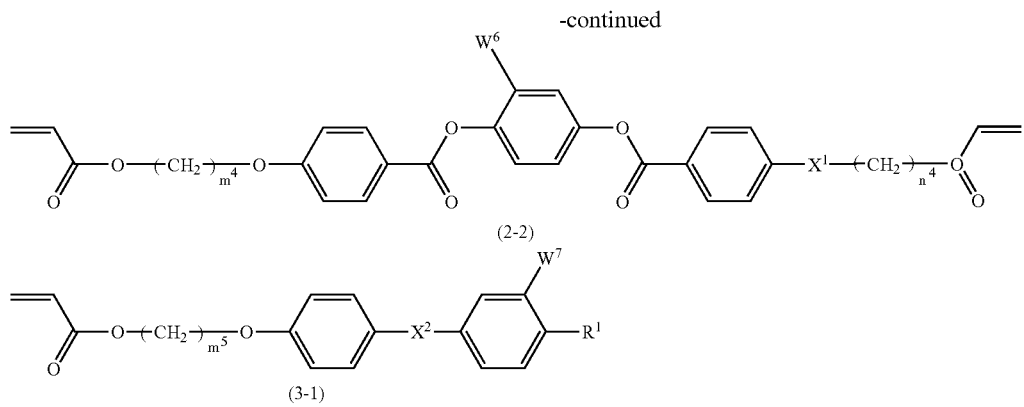

The second composition group (hereinafter sometimes referred to as "MIX2") is a polymerizable liquid crystal composition containing at least one compound selected from the group of compounds represented by the formula (1-1) and the formula the (1-2) as a first ingredient, at least one compound selected from the group of compounds represented by the formula (2-1) as a second ingredient, and at least one compound selected from the group of compounds represented by the formula (3-1) as a third ingredient.

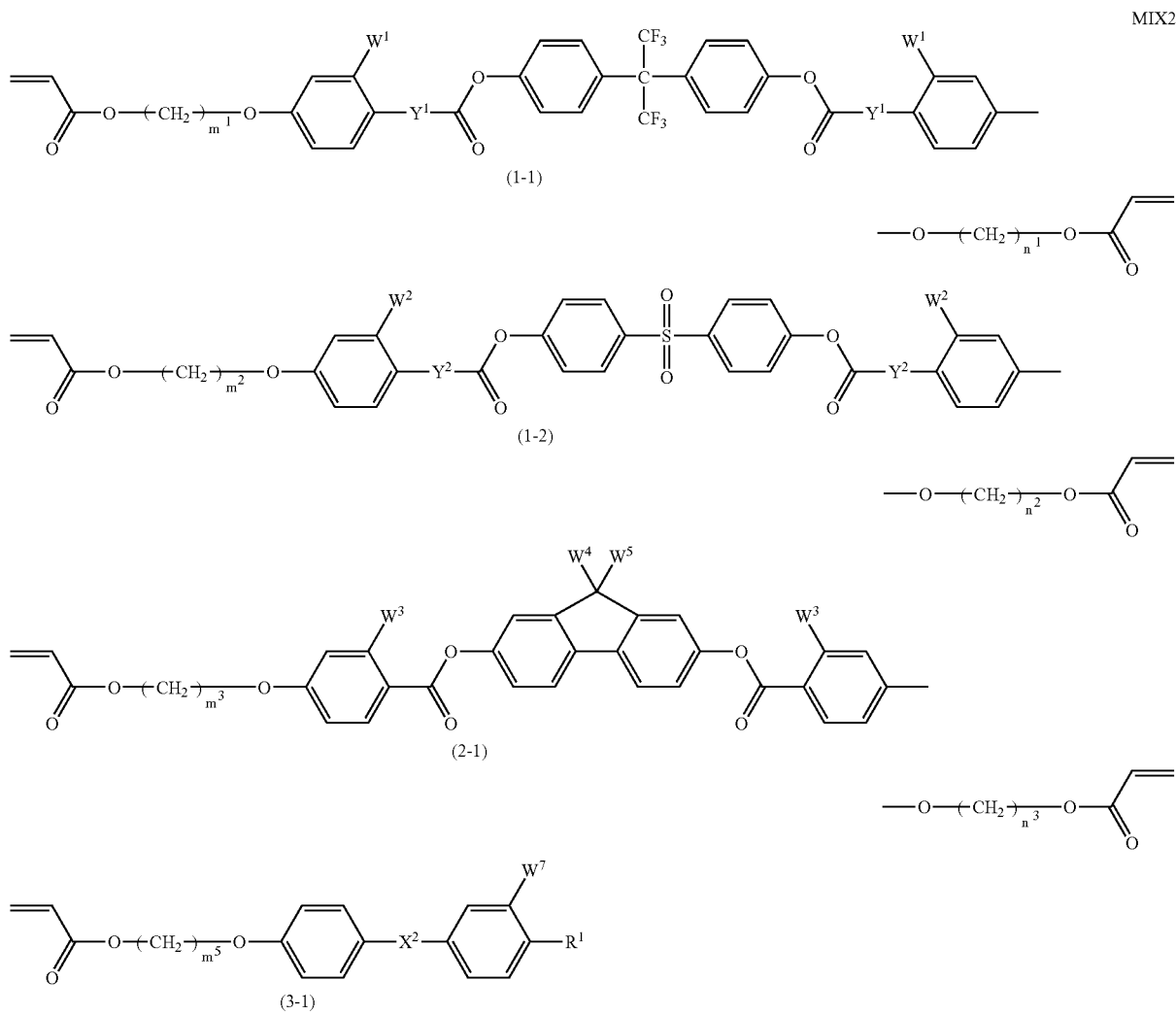

The third composition group (hereinafter sometimes referred to as "MIX3") is a polymerizable liquid crystal composition containing at least one compound selected from the group of compounds represented by the formula (1-1) and the formula the (1-2) as a first ingredient, at least one compound selected from the group of compounds represented by the formula (2-2) as a second ingredient, and at least one compound selected from the group of compounds represented by the formula (3-1) as a third ingredient.

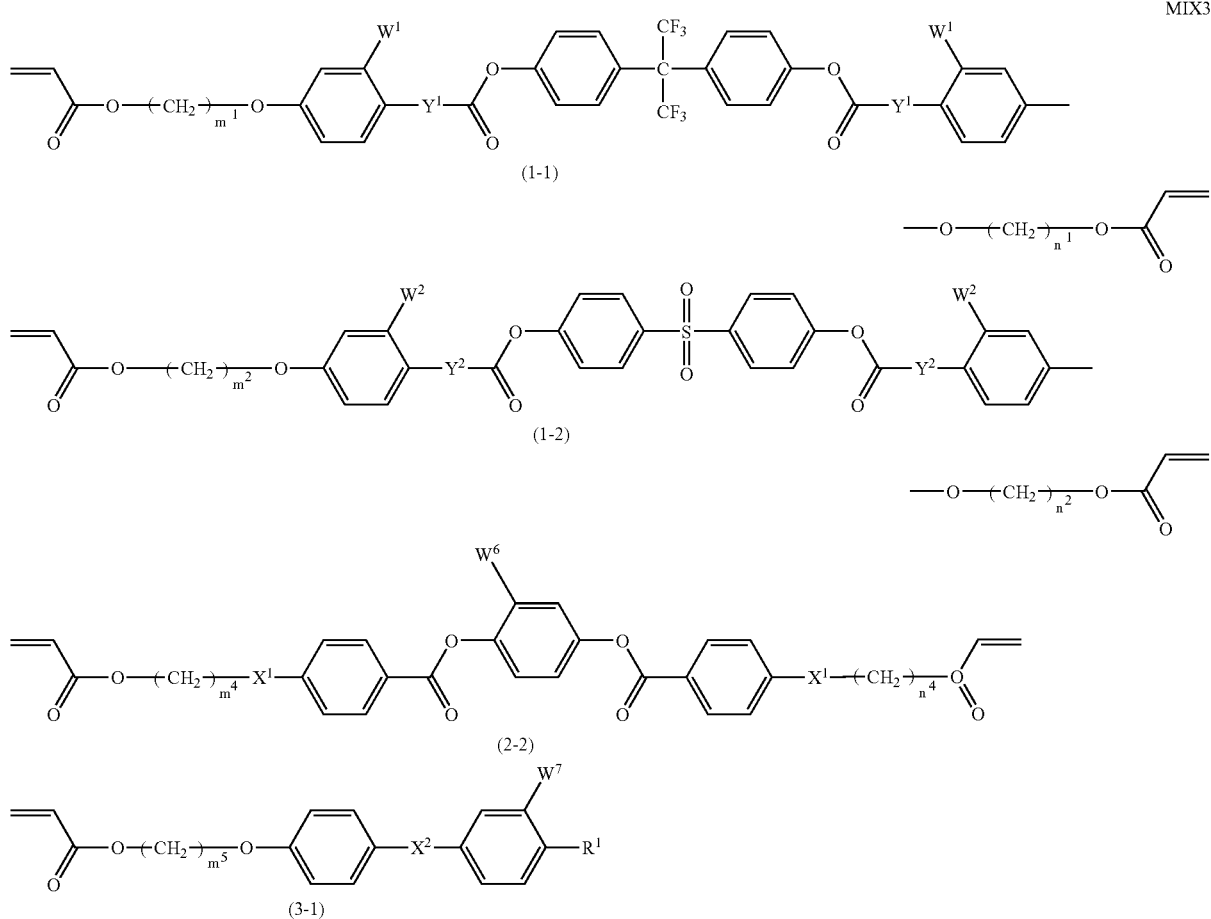

The fourth composition group (hereinafter sometimes referred to as "MIX4") is a polymerizable liquid crystal composition containing at least one compound selected from the group of compounds represented by the formula (5-1) and the formula the (5-2) as a first ingredient, at least one compound selected from the group of compounds represented by the formula (6-1) and the formula (6-2) as a second ingredient, and at least one compound selected from the group of compounds represented by the formula (7-1) as a third ingredient.

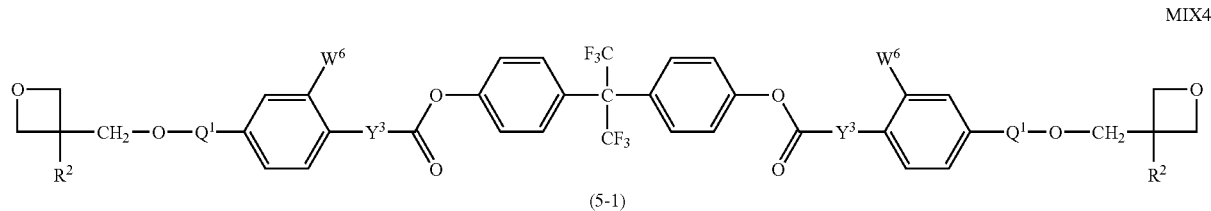

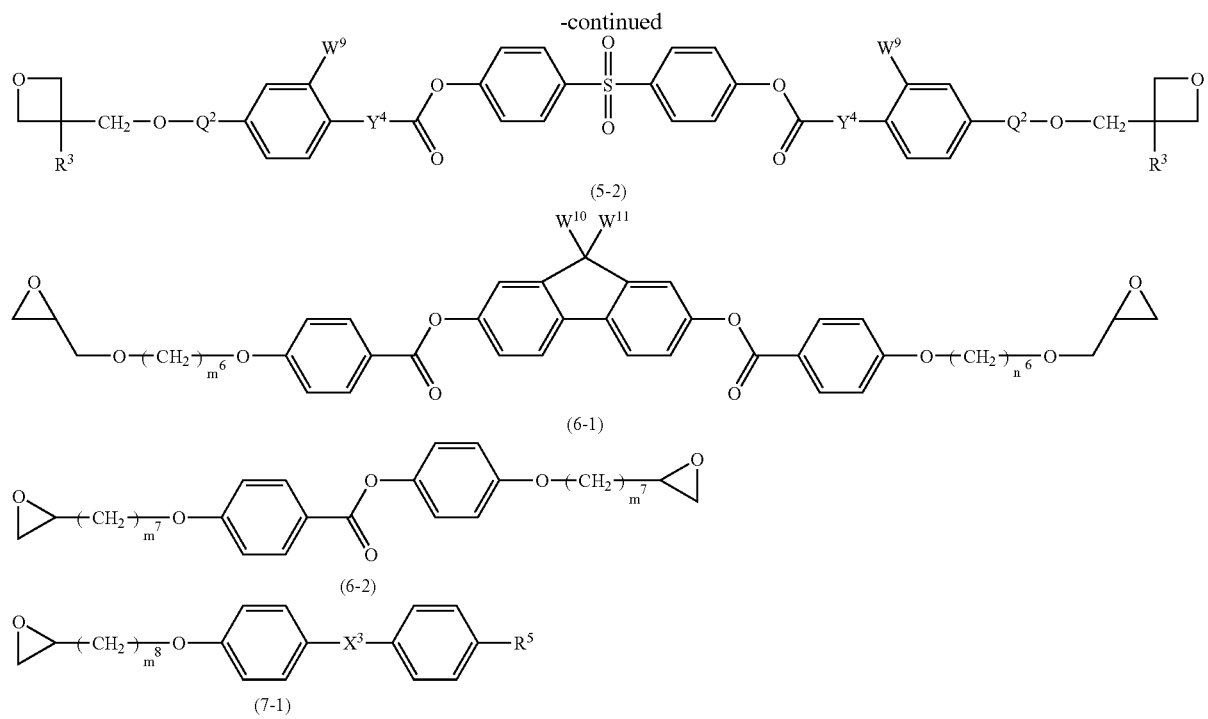

The fifth composition group (hereinafter sometimes referred to as "MIX5") is a polymerizable liquid crystal composition containing at least one compound selected from the group of compounds represented by the formula (5-1) as a first ingredient, at least one compound selected from the group of compounds represented by the formula (6-1) as a second ingredient, and at least one compound selected from the group of compounds represented by the formula (7-1) as a third ingredient.

First, description is to be made for the polymerizable liquid crystal composition comprising a compound having an acryloyloxy group. MIX1, MIX2, and MIX3 show liquid crystallinity and have polymerizability. The polymerizable liquid crystal compositions may further contain additives such as polymerization catalysts, sensitizers, fine particles, solvents, polymerization initiators, UV-absorbents, anti-oxidants, surfactant, silane coupling agents and non-liquid crystal polyfunctional monomers.

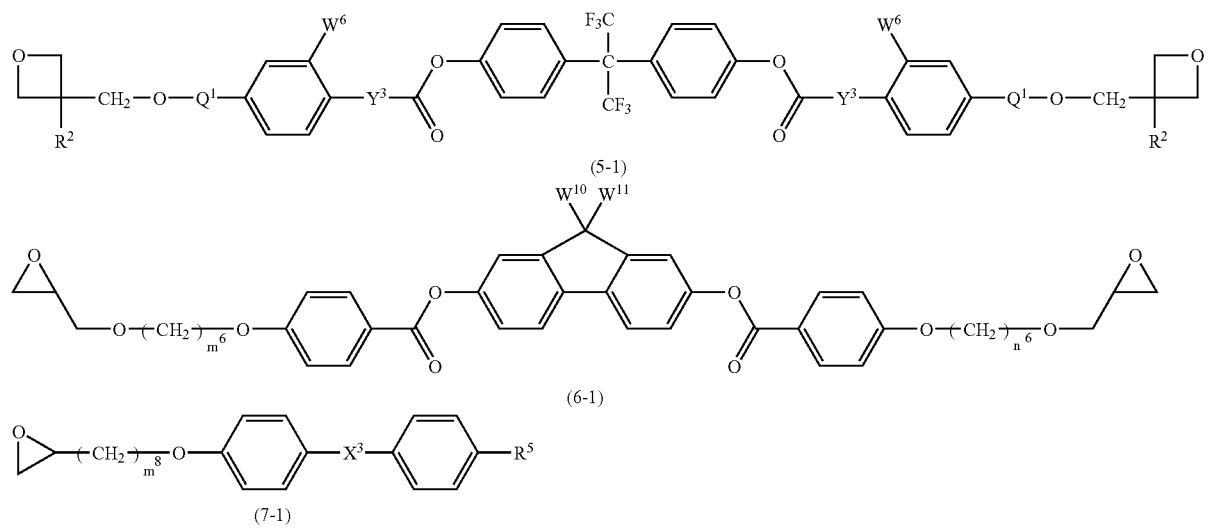

The first ingredient used for MIX1, MIX2, and MIX3 is a non-liquid crystalline polymerizable compound. The first ingredient is a compound represented by the formula (I-1) or the formula (1-2). The compound has a core structure of —Ph—C(CF$_3$)$_2$—Ph— or —Ph—SO$_2$—Ph—. Ph represents 1,4-phenylene. Both of the skeletons have a strong electron attracting groups. Accordingly, it is expected that they can control the alignment of the liquid crystal molecules since they have a large dipole moment. Further, since the compounds have a flexed molecular structure, it is estimated that the ability of controlling the alignment is increased. It seems that the compound having —Ph—C(CF$_3$)$_2$—Ph— has better compatibility with other polymerizable compounds compared with the compound having —Ph—SO$_2$—Ph—. The compound having —Ph—SO$_2$—Ph— can be synthesized relatively inexpensively compared with the compound having —Ph—C(CF$_3$)$_2$—Ph—. As the compound having the flexed structure, compounds not having polymerizable groups are disclosed in *Molecules*, 5, 383 (2000), and *Chem. Mater.*, 15, 3443 (2003). Further, the compound having the polymerizable group is disclosed in EP No. 703287. However, this is not a compound synthesized with an aim of controlling the alignment by addition to the polymerizable liquid crystal composition.

In the compound (1-1) and the compound (1-2) having the acryloyloxy groups on both terminal ends, $Y^1$ and $Y^2$ each represents independently a single bond, —CH$_2$)$_2$—, or —CH=CH—, $W^1$ and $W^2$ represents independently hydrogen or fluorine, $m^1$, $m^2$, $n^1$, and $n^2$ each represents independently an integer of from 2 to 15. Among them, preferred compounds are illustrated below.

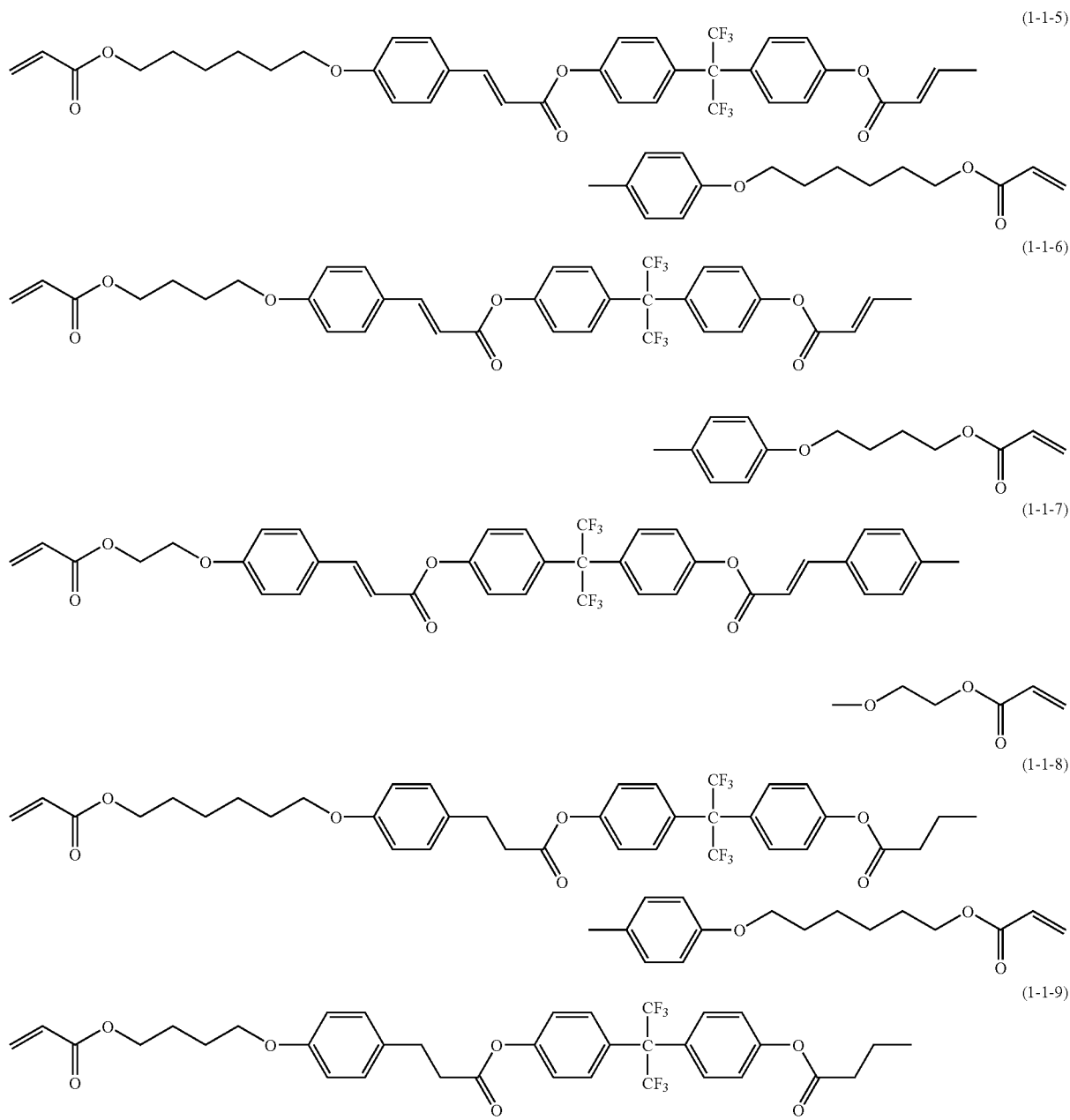

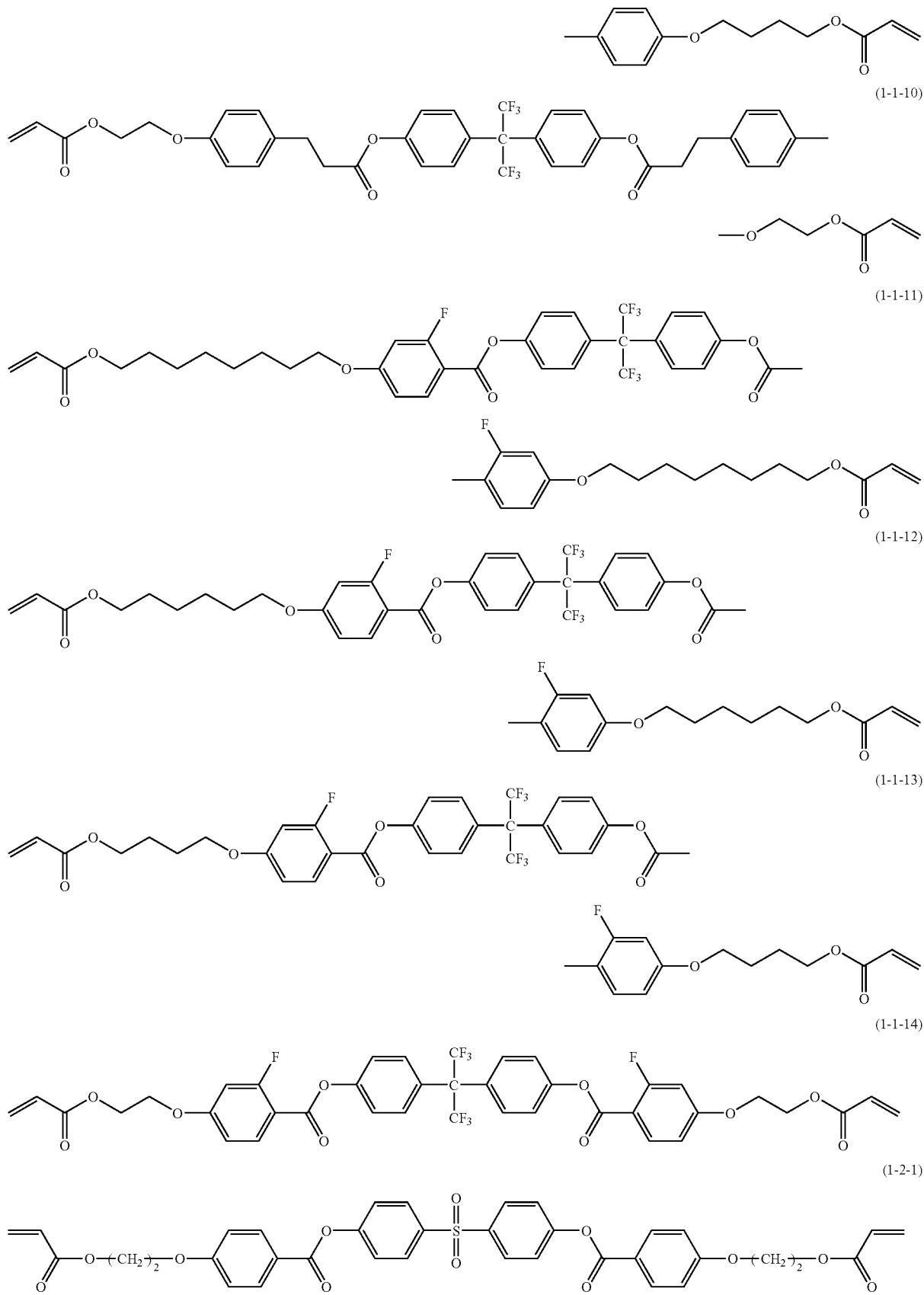

-continued
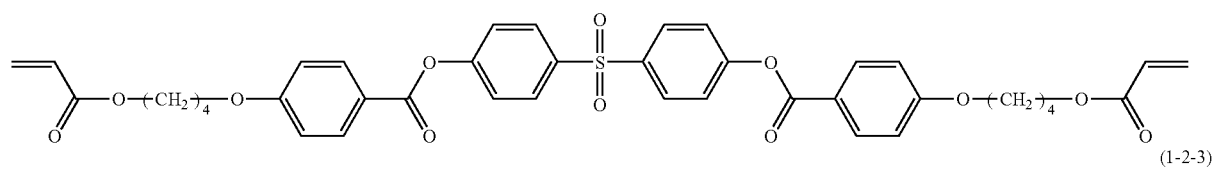
(1-2-2)
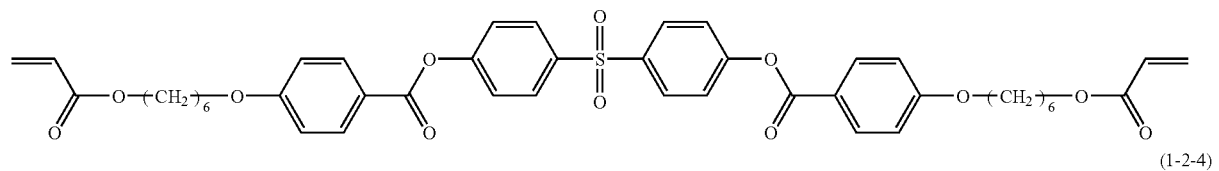
(1-2-3)
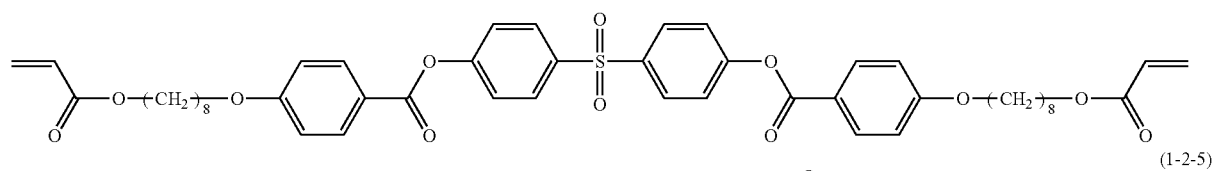
(1-2-4)
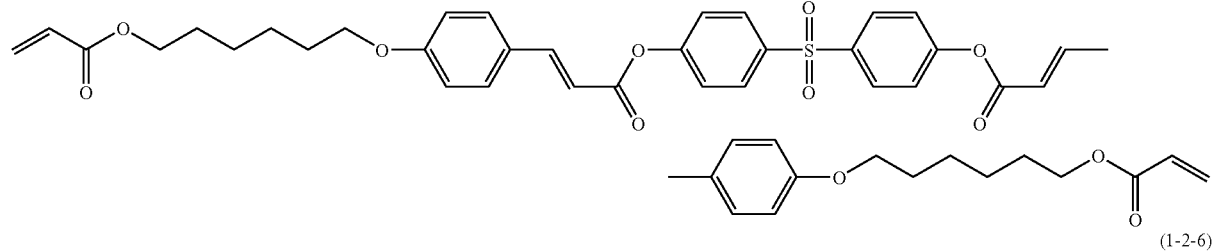
(1-2-5)
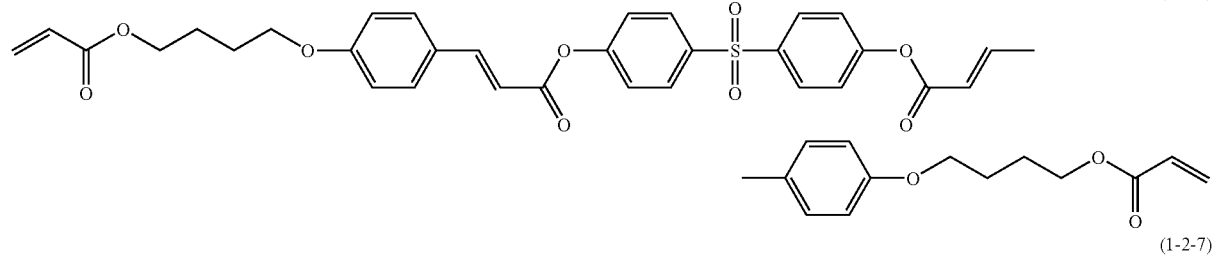
(1-2-6)
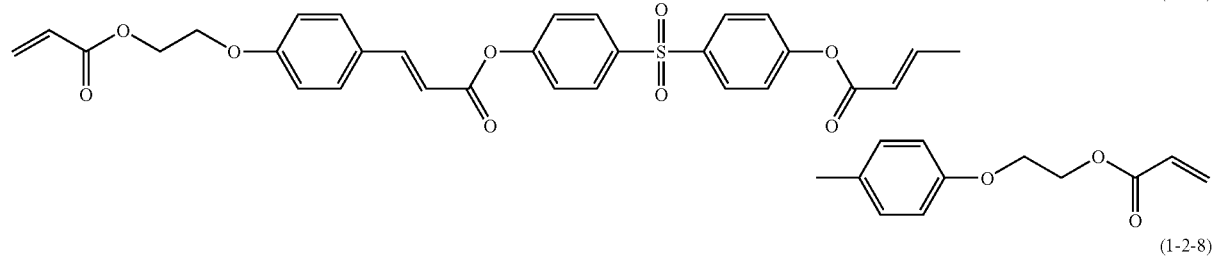
(1-2-7)
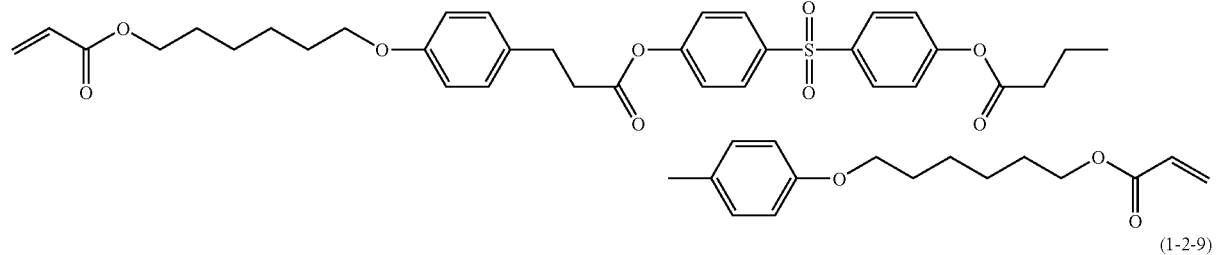
(1-2-8)
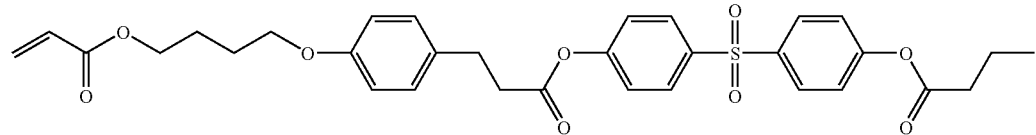
(1-2-9)

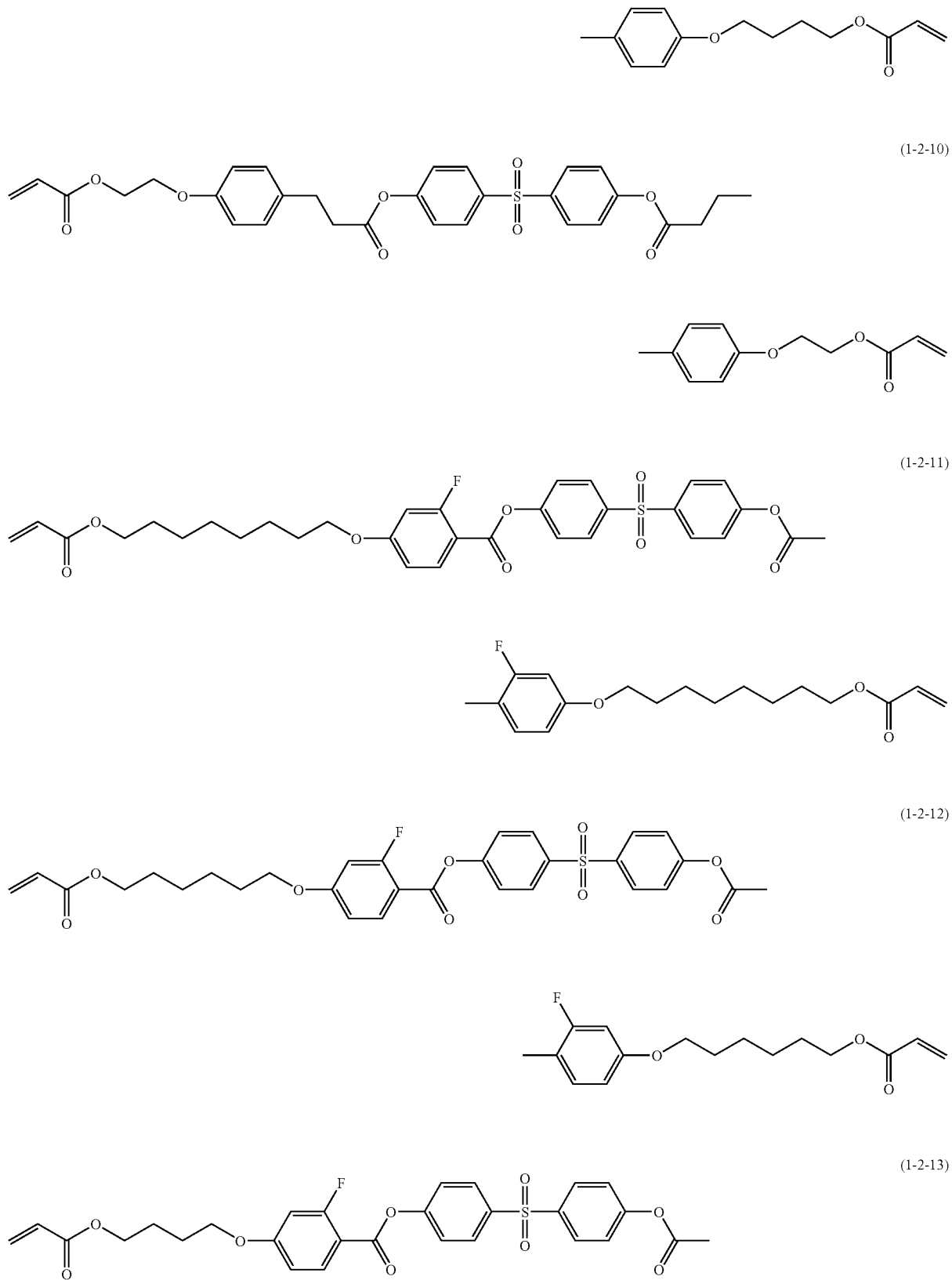

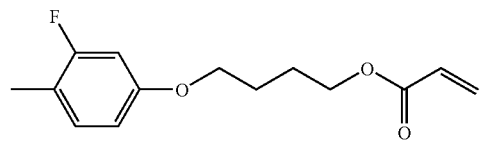

(1-2-14)

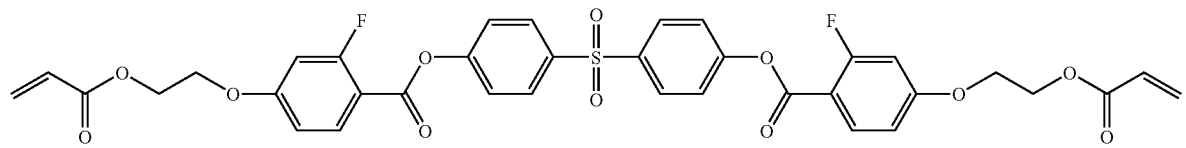

Then, the synthesis method for the compounds are to be described. The compounds used in the invention can be synthesized by properly combining the synthesis methods in "Organic Chemistry" described, for example, by Houben Wyle, METHODEN DER ORGANISCHEN CHEMIE (George Thieme Verlag, Stuttgart), ORGANIC REACTIONS (John Wily & Sons Inc.), ORGANIC SYNTHESES (John Wily & Sons, Inc.), COMPREHENSIVE ORGANIC SYNTHESIS (Pergamon Press) and NEW EXPERIMENTAL CHEMISTRY COURSE (Maruzen).

The compounds (1-1) or compound (1-2) of the invention are synthesized as described below. The carboxylic acid derivative having —OCOCH=CH$_2$ [b-1] is synthesized in accordance with the method described in *Polymer Journal*, Vol. 35, No. 2, 160-66 (2003). The method of forming the diester is disclosed in JP-A No. 2003-277359 (cols. 0040-0053). Description is to be provided while illustrating the synthesis scheme of the compound.

Scheme 1 illustrates the synthesis for the compound (1-1). The compound (1-1) is synthesized by esterification of 2,2-bis(4-hydroxyphenyl)-hexafluoropropane [a] and 2 equivalent amount of an acid derivative [b-1]. For synthesizing the compound (1-2), the same esterifying reaction is carried out by using the following 2,2-bis(4-hydroxyphenyl)sulfone [S]:

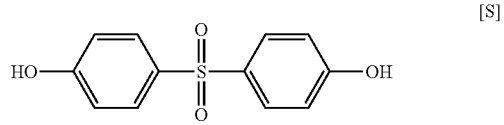

[S]

instead of 2,2-bis(4-hydroxyphenyl)-hexafluoropropane [a].

The second ingredient is a compound having two acryloyloxy groups and showing a liquid crystal phase. The second ingredient is represented by the formula (2-1) or the formula (2-2). The compound shows the liquid crystal phase in a wide temperature range. The temperature for the NI point (nematic

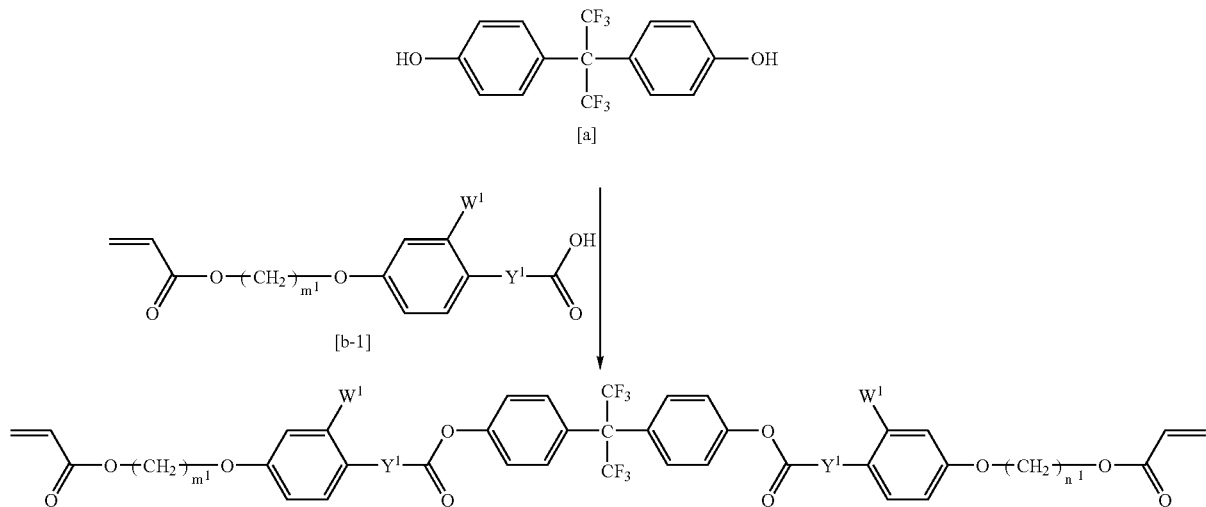

phase-isotropic phase transition point) of the polymerizable liquid crystal composition of the invention is controlled by controlling the amount of the compound.

In the compound (2-1) and the compound (2-2) having the acryloyloxy group on both terminal ends, $W^3$ represents hydrogen or fluorine, $W^4$ and $W^5$ each represents independently hydrogen or methyl, $W^6$ represents hydrogen or methyl, $X^1$ is a group represented by —O— or the following formula ($X^1$-2):

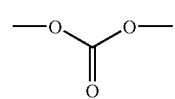
($X^1$-2)

and $m^3$, $m^4$, $n^3$, and $n^4$ each represent independently an integer of from 2 to 15.

At first, preferred compound (2-1-1) to compound (2-1-8) among the compounds (2-1), are illustrated.

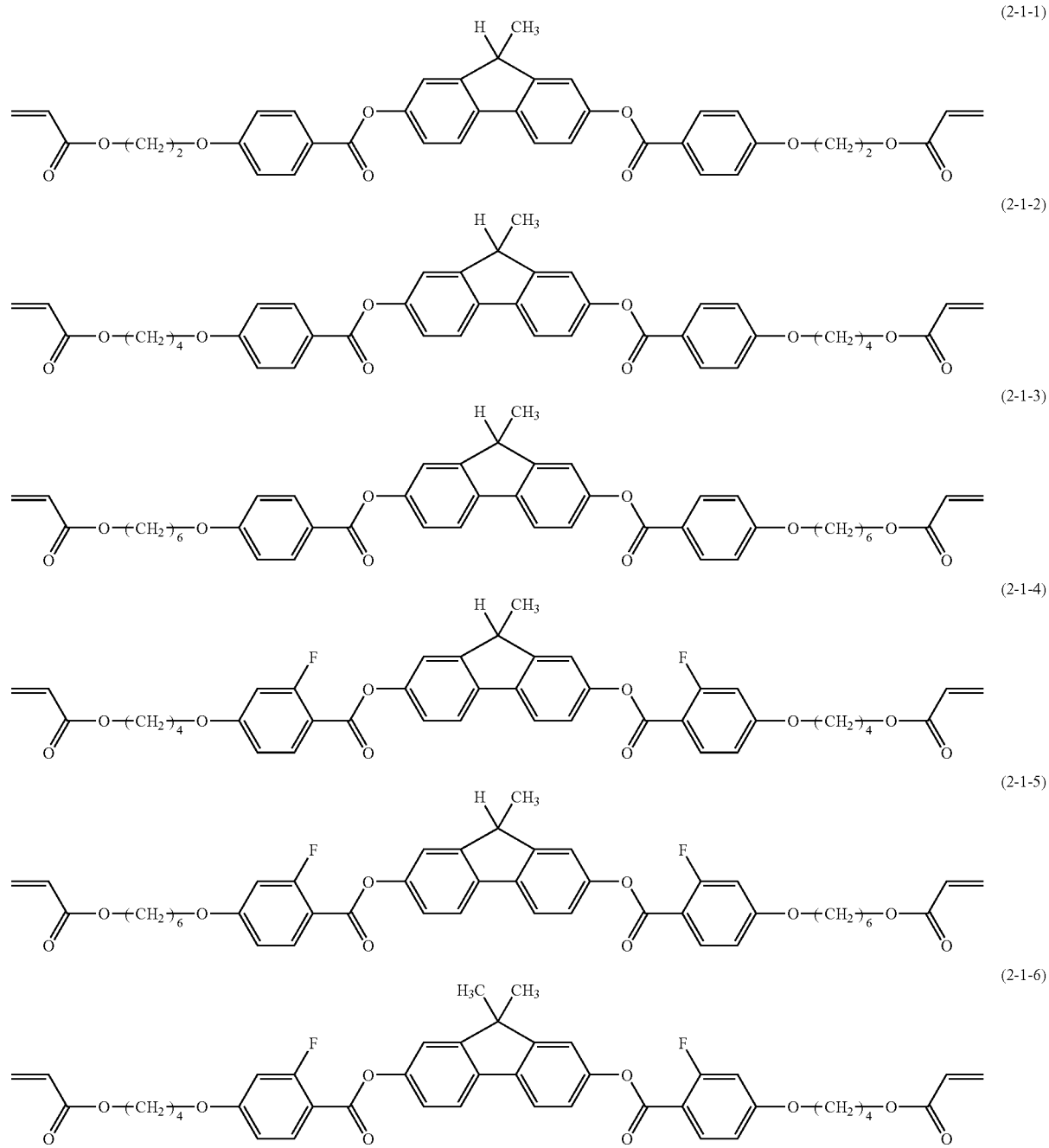

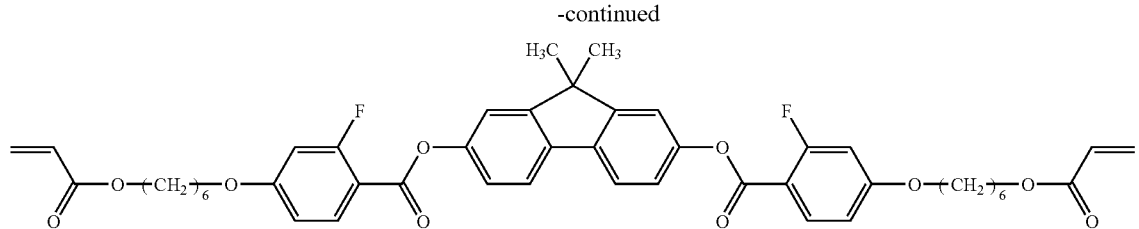
(2-1-7)
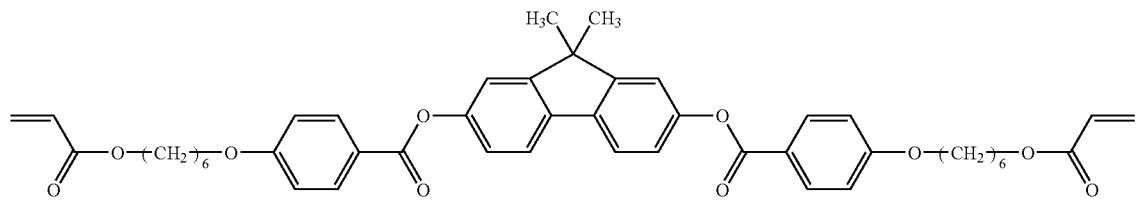
(2-1-8)
The compounds are synthesized by the method described in JP-A No. 2003-238491.
Among the compounds (2-2), preferred compound (2-2-1) to compound (2-2-10) are illustrated.
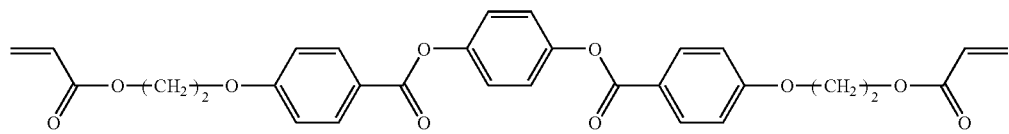
(2-2-1)
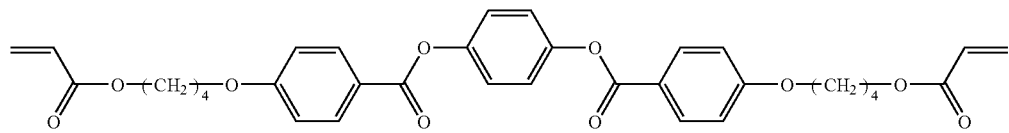
(2-2-2)
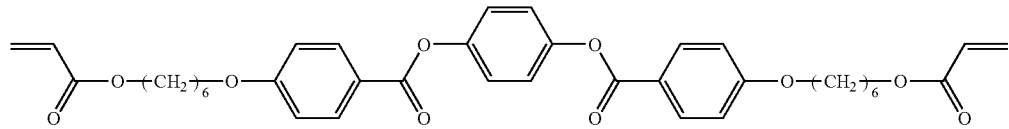
(2-2-3)
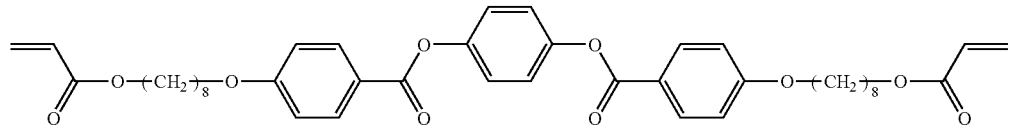
(2-2-4)
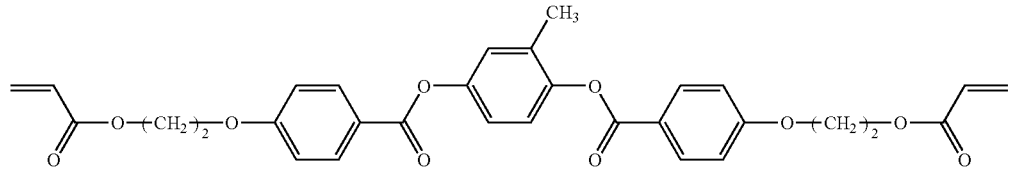
(2-2-5)
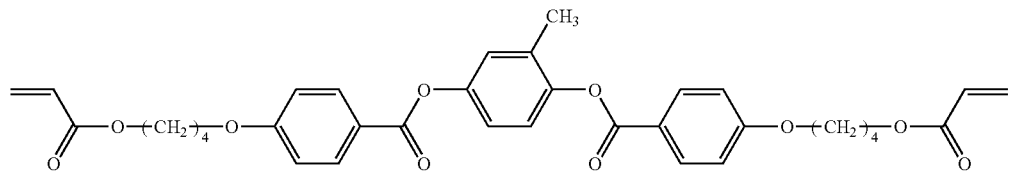
(2-2-6)

(2-2-7)
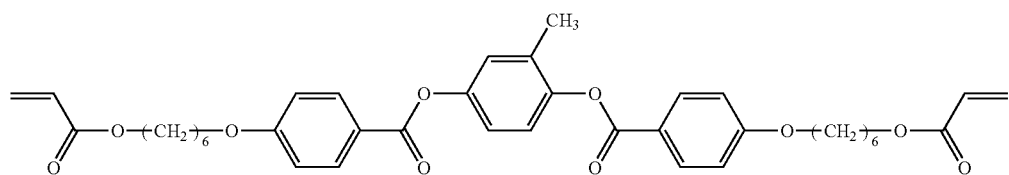

(2-2-8)
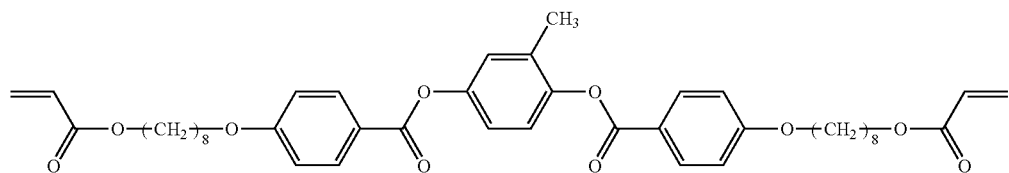

(2-2-9)
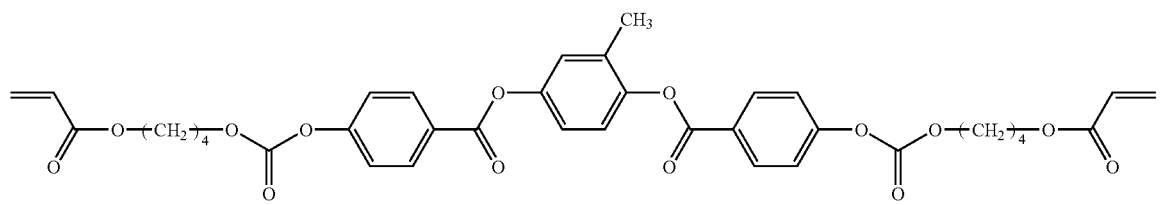

(2-2-10)
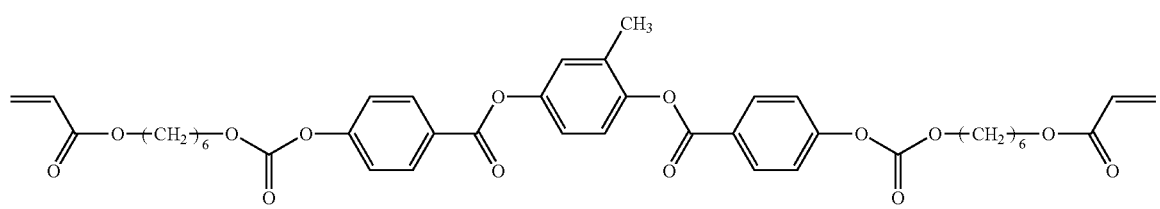

The compound (2-2-1) and the compound (2-2-7) are synthesized in accordance with the method described in *Makromol. Chem.*, 190, 3201-15 (1998). The compound (2-2-9) and the compound (2-2-10) are synthesized according to the method described in WO97/00600.

The third ingredient is a compound having one acryloyloxy group. The group of the compounds may either show or not show the liquid crystal phase. The third ingredient is represented by the formula (3-1). The melting point of the compound is approximately 100° C. or lower. The compound is used with an aim of controlling the melting point of the polymerizable liquid crystal composition of the invention.

In the compound (3-1) having an acryloyloxy group, $R^1$ represents cyano, trifluoromethoxy, alkyl of 1 to 10 carbon atoms, or alkoxy of 1 to 10 carbon atoms, $W^7$ represents hydrogen or fluorine, $X^2$ represents a single bond, —COO—, or —OCO—, and $m^5$ represents an integer of from 2 to 15. Among them, preferred compound (3-3-1) to compound (3-1-7) among them are illustrated.

(3-1-1)
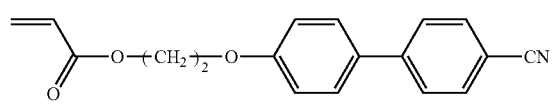

(3-1-2)
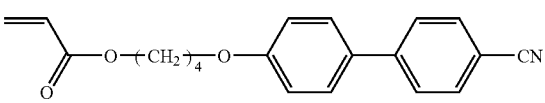

(3-1-3)
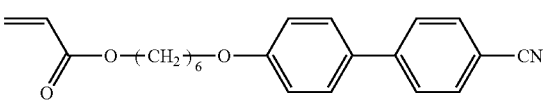

(3-1-4)
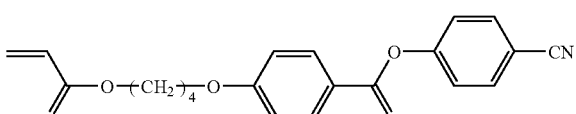

(3-1-5)
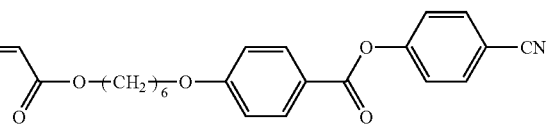

-continued

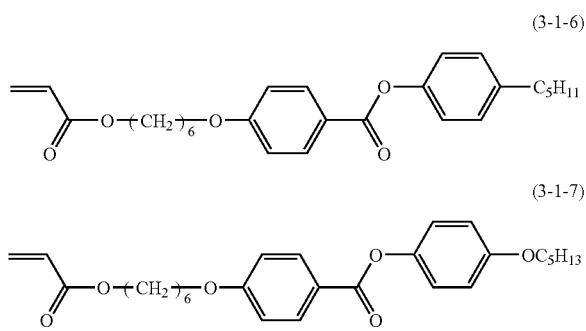

(3-1-6)

(3-1-7)

The compound (3-1-1) to the compound (3-1-3) are synthesized in accordance with the method as described in *Macromolecules*, 26, 6132-34 (1993). The compound (3-1-4) to the compound (3-1-7) are synthesized in accordance with the method as described in *Makromol. Chem.*, 183, 2311-21 (1982).

In MIX1, MIX2, and MIX3, the respective content ratios of the first ingredient, the second ingredient, and the third ingredient are not particularly restricted and it is preferred in the invention that the content ratio of the first ingredient is within a range from approximately 1% to approximately 25% by weight, the content ratio of the second ingredient is within a range from approximately 50% to approximately 98% by weight and the content ratio of the third ingredient is within a range from approximately 1% to approximately 25% by weight. Particularly preferably, the content ratio of the first ingredient is within a range from approximately 7% to approximately 22% by weight, the content ratio of the second ingredient is within a range from approximately 56% to approximately 86% by weight and the content ratio of the third ingredient is within a range from approximately 7% to approximately 22% by weight.

Among MIX1, MIX2, and MIX3 described above, MIX2 and MIX3 tend to exhibit a homogeneous alignment. Further, when a silane coupling agent is added to MIX2 or MIX3, respective alignments can be changed into a homeotropic alignment.

The addition ratio of the silane coupling agent is, preferably, at a ratio of from approximately 1 to approximately 10 parts by weight based on 100 parts by weight of the polymerizable liquid crystal composition. That is, it is preferred that the range of polymerizable liquid crystal compound: silane coupling agent equals approximately 100:1 to approximately 100:10 (weight ratio).

The silane coupling agent used in the invention is not particularly restricted and the silane coupling agent represented by the following formula (4) is preferred:

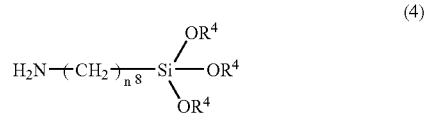

(4)

in which, $R^4$ represents methyl or ethyl and $n^8$ represents an integer of 1 to 5 in the formula (4).

Preferred compositions in the polymerizable liquid crystal composition of the invention are shown in Table 1.

TABLE 1

| Composition | First Ingredient | Ratio (wt %) | Second Ingredient | Ratio (wt %) | Third Ingredient | Ratio (wt %) |
|---|---|---|---|---|---|---|
| MIX2 | (1-1) or (1-2) | 1 to 25 | (2-1) | 50 to 98 | (3-1) | 1 to 25 |
| MIX3 | (1-2) or (1-2) | 1 to 25 | (2-2) | 50 to 98 | (3-1) | 1 to 25 |

In Table 1, MIX2 and MIX3 were polymerized at a room temperature by irradiating UV-light or the like under the presence of a photoradical polymerization catalyst in a nitrogen atmosphere.

Homogenously Aligned MIX2 or MIX3

MIX2 or MIX3 was coated on a transparent support substrate applied with a rubbing treatment. The support substrate is a triacetyl cellulose film applied with a saponification treatment or a norbornene resin film applied with a hydrophilic treatment. The hydrophilic treatment was conducted by corona treatment or plasma treatment. Alignment of liquid crystal molecules in the composition was homogeneous. After adding from approximately 1% to approximately 15% by weight of a photoradical polymerization catalyst based on the entire weight of the polymerizable compound to the composition, by irradiating UV-light under a nitrogen atmosphere, a polymer was obtained easily. The polymer maintained alignment in the composition.

Polymerizable Liquid Crystal Composition Aligned Homeotropically

Aminopropyltriethoxy silane was added to MIX2 or MIX3 such that the ratio of aminopropyltriethoxy silane was from approximately 1 to approximately 10 parts by weight based on 100 parts by weight of the polymerizable compound. The obtained composition was coated on the support substrate not applied with the rubbing treatment. The alignment in the composition was homeotropic. The alignment was maintained also after polymerization in the same manner described as in (1) above. Also in a case of coating on a glass substrate not applied with an alignment treatment, the alignment was homeotropic.

Then, MIX4 and MIX5 are to be described. MIX4 comprises a compound having an oxetanyl group or an oxiranyl group as a polymerizable functional group. The composition exhibits liquid crystallinity and has polymerizability. The polymerizable liquid crystal composition may further contain additives such as polymerization catalyst, sensitizing agent, fine particle, solvent, polymerization inhibitor, UV-absorbent, surfactant, silane coupling agent, non-liquid crystalline polyfunctional monomer, etc.

The first ingredient used for MIX4 and MIX5 is a non-liquid crystalline polymerizable compound. The first ingredient is a compound represented by the formula (5-1) or the formula (5-2). The compound has a core structure of —Ph—C(CF$_3$)$_2$—Ph— or —Ph—SO$_2$—Ph—. Ph represents 1,4-phenylene. The compounds have an ability of controlling and stabilizing the alignment.

In the compounds (5-1) and (5-2), $R^2$ and $R^3$ each represents independently methyl or ethyl, $Y^3$ and $Y^4$ each represents independently a single bond, —(CH$_2$)$_2$— or —CH=CH—, $W^8$ and $W^9$ each represents independently hydrogen or fluorine, $Q^1$ and $Q^2$ each represents independently a single bond, —O—(CH$_2$)$r^1$- or —(CH$_2$)$r_1$-O—, and $r^1$ is an integer from 1 to 15. Preferred compounds among them are illustrated below.

(5-2-6)
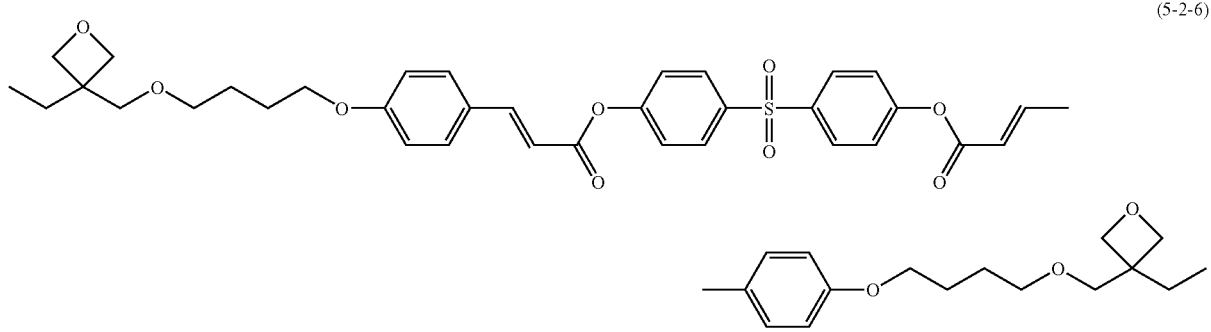
(5-2-7)
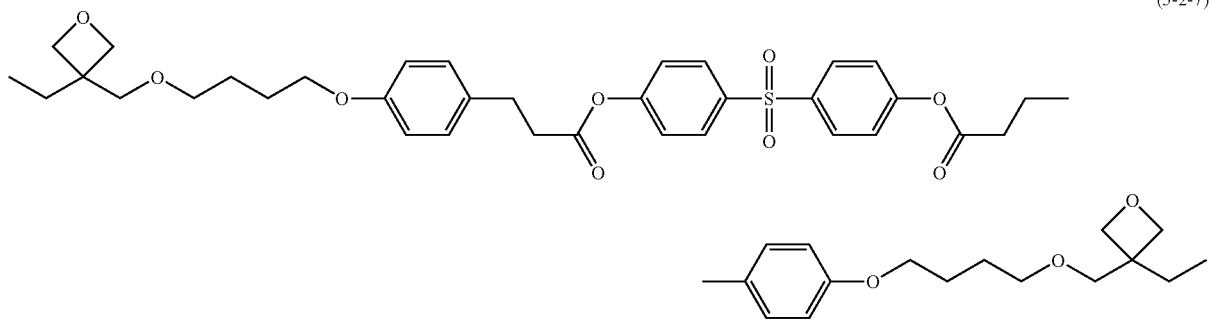
(5-2-8)
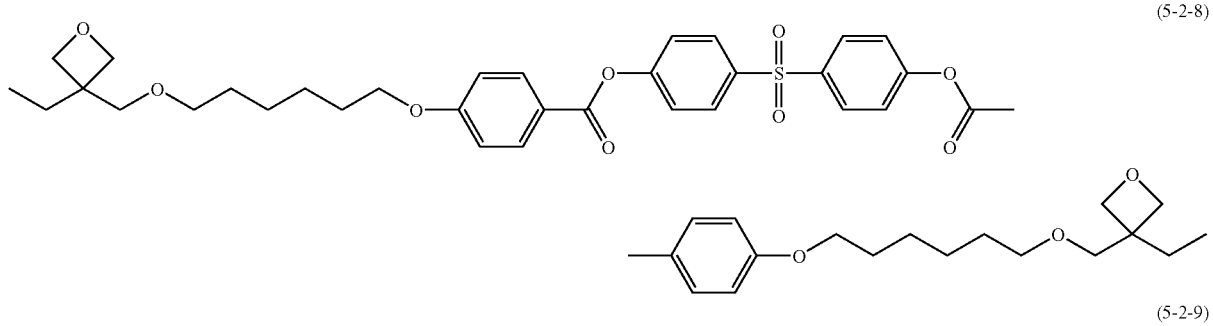
(5-2-9)
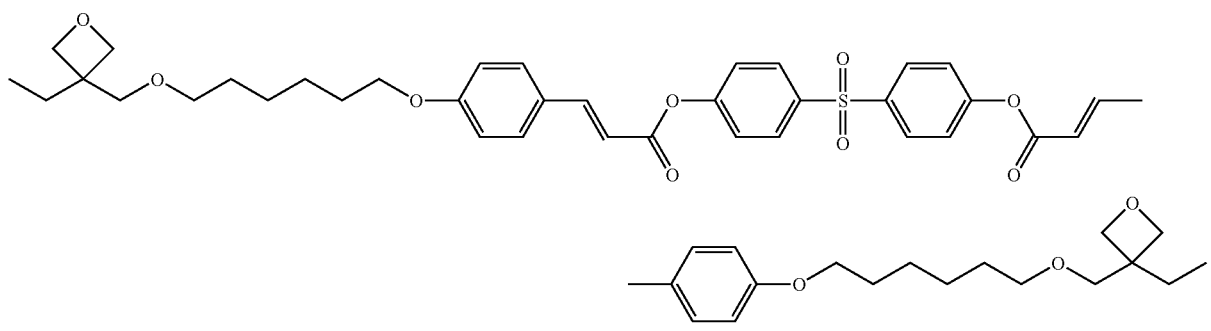
(5-2-10)
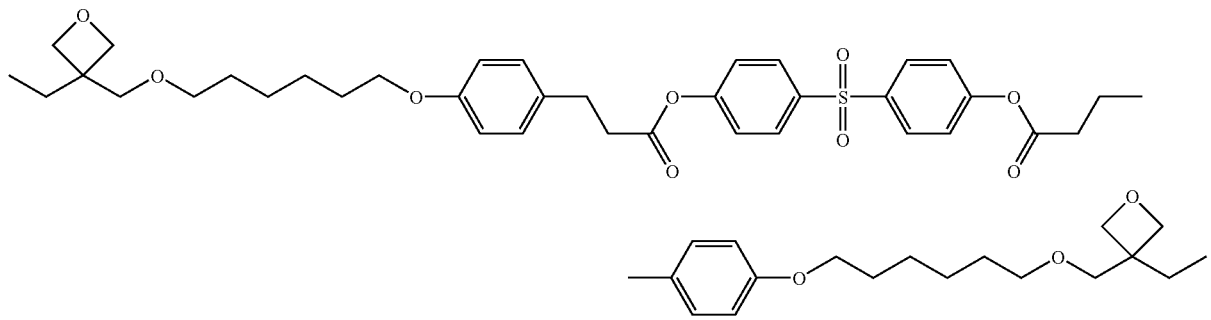

-continued
(5-2-11)
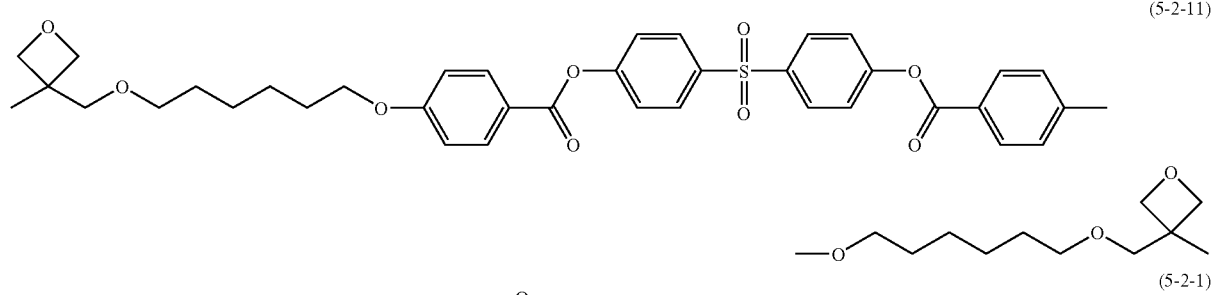
(5-2-1)
(5-2-2)
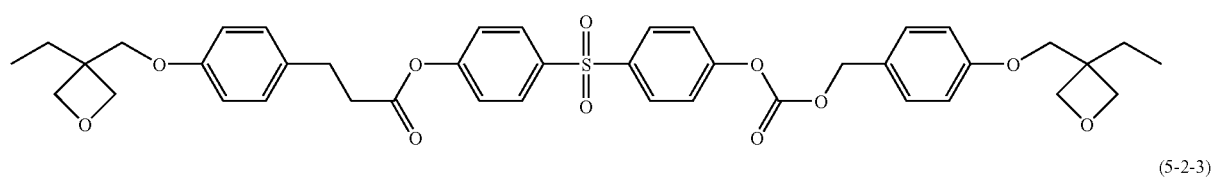
(5-2-3)
(5-2-4)
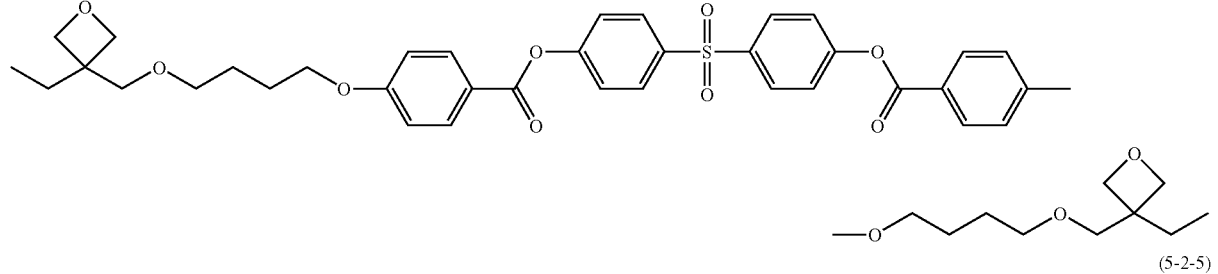
(5-2-5)
(5-2-6)
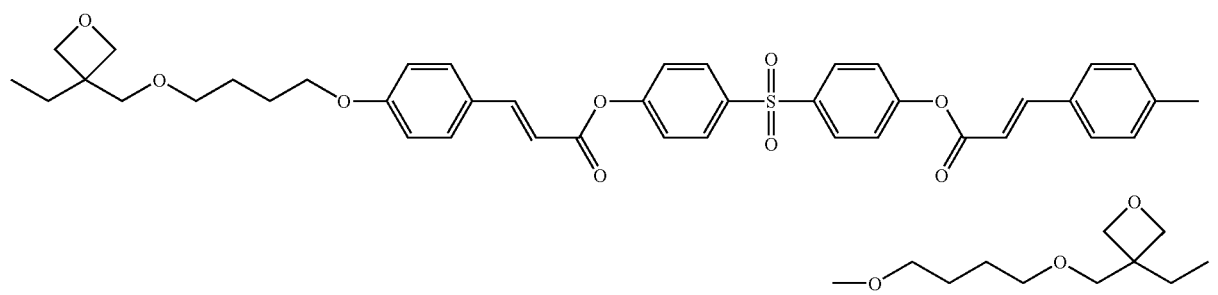

-continued (5-2-7)
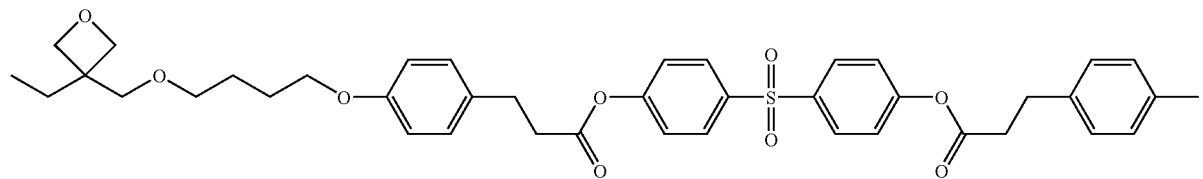

(5-2-8)
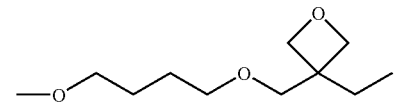
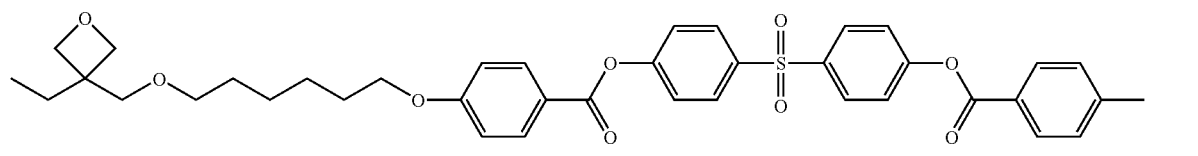

(5-2-9)
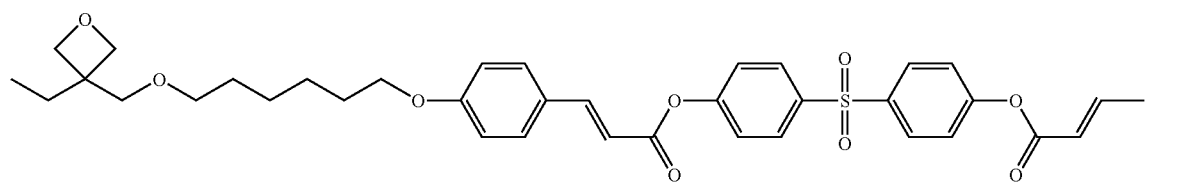

(5-2-10)
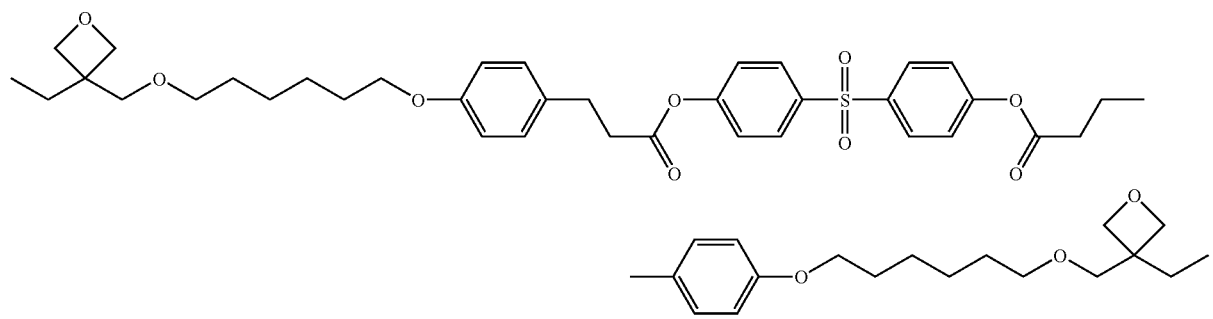

The compound (5-1) and the compound (5-2) are synthesized as described below. For the synthesis of the carboxylic acid derivative [b-2] having an oxetane ring, 3-alkyl-3-oxetane methanol can be utilized as a starting material. 3-ethyl-3-oxetane methanol and 3-methyl-3-oxetane methanol are available. By reacting the compounds and α,ω-dibromomethylene such as 1,2-dibromoethane, 1,4-dibromobutane, 1,6-dibromohexane, and 1,8-dibromooctane in accordance with the method of the literature, the carbon chain length can be extended. The literature is *Macromolecules*, 24, 4531-37 (1991).

The compound (5-1) is synthesized by esterification of 2,2-bis(4-hydroxyphenyl)-hexafluoropropane [a] and 2 equimolar amount of benzoic acid derivative [b-2]. For the synthesis of the compound (5-2), reaction is conducted in the same manner by using the following 2,2-bis(4-hydroxyphenyl)sulfone [S] instead of 2,2-bis(4-hydroxyphenyl)-hexafluoropropane [a].

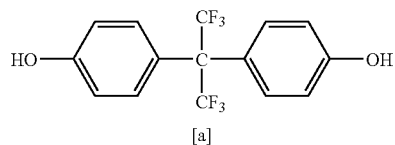

[a]

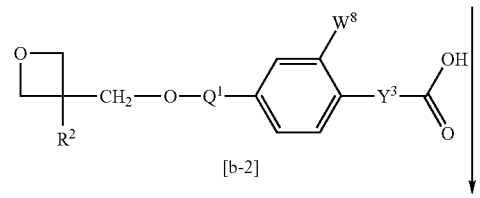

[b-2]

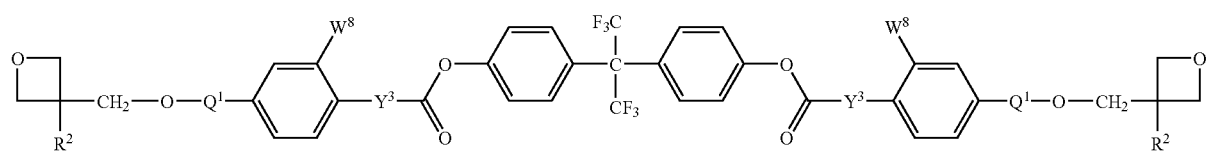

The second ingredient is a group of polymerizable compounds having two oxiranyl groups and having a liquid crystal phase, and represented by the formula (6-1) or the formula (6-2). The compound exhibits a liquid crystal phase in a wide temperature range. The NI point (transition point from nematic phase to isotropic phase) of the polymerizable liquid crystal composition of the invention is controlled by controlling the amount of the compound.

In the compounds (6-1) and (6-2), $W^{10}$ and $W^{11}$ each represents independently hydrogen or methyl, and $m^6$, $m^7$, $n^6$, and $n^7$ each represents independently an integer of from 2 to 15. Preferred compound (6-1-1) to compound (6-24) among them are illustrated below.

(6-1-1)

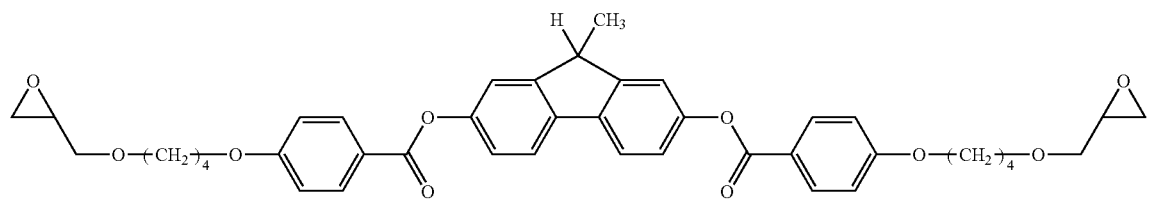

(6-1-2)

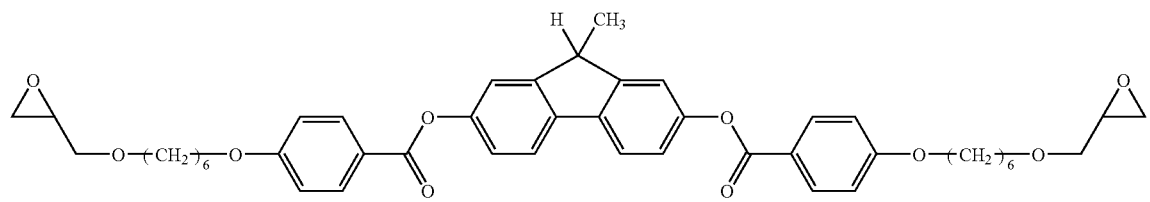

(6-1-3)

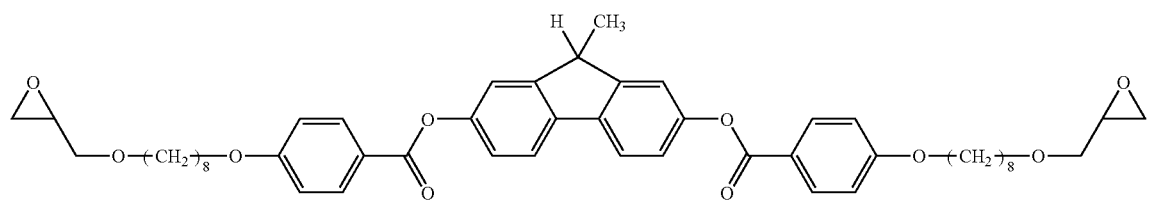

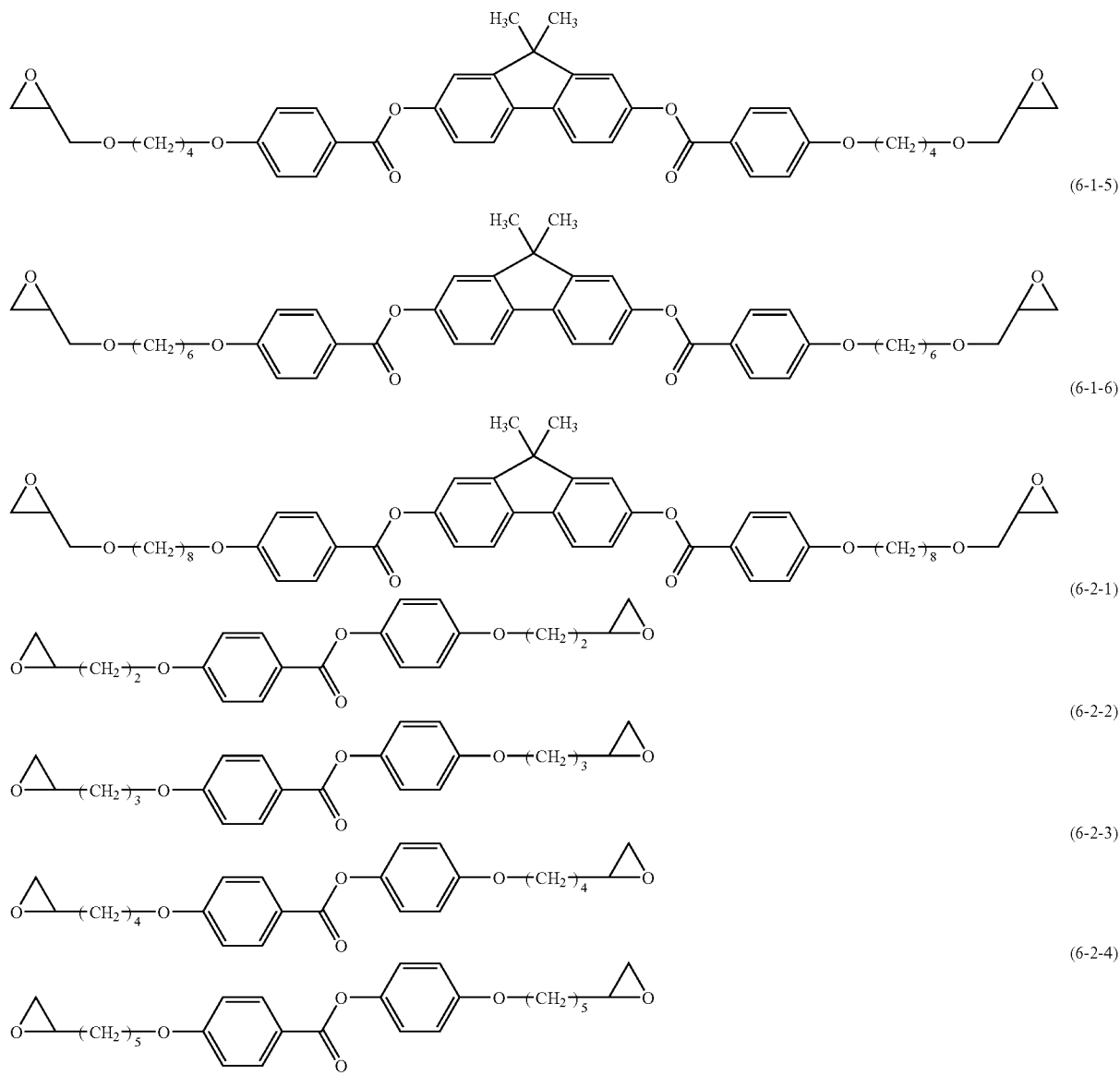

The compound (6-1-1) to the compound (6-1-6) are synthesized in accordance with the method described in JP-A No. 2005-60373. The compound (6-2-1) to the compound (6-24) are synthesized in accordance with the method as described in *Macromolecules*, 26, 1244-47 (1993).

The third ingredient is a polymerizable compound having an oxiranyl group. The compound may either show or not show the liquid crystal phase. The third ingredient is represented by the formula (7-1). The melting point of the compound is as low as approximately 100° C. or lower. The compound is used with an aim of controlling the melting point of the polymerizable liquid crystal composition of the invention.

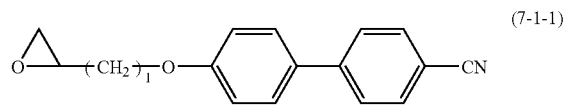

(7-1-1)

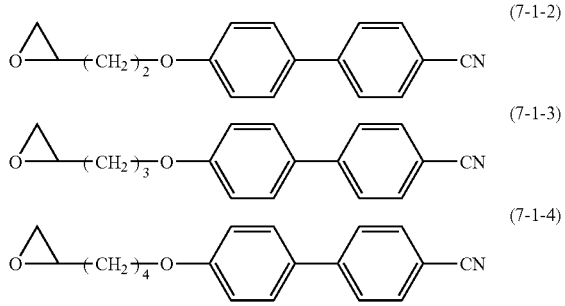

In the compound (7-1), $X^3$ represents a single bond, —COO—, or —OCO—, $R^5$ represents cyano, alkyl, or alkoxy of 2 to 8 carbon atoms, and $m^8$ represents an integer of from 2 to 15. Preferred compound (7-1-1) to compound (7-1-4) among them are illustrated.

The compound (7-1-1) to the compound (7-1-4) are synthesized in accordance with the method described in *Macromol. Chem. Phys.*, 196, 2941-54 (1995).

In MIX4 and MIX5, the respective content ratios of the first ingredient, the second ingredient, and the third ingredient are not particularly restricted and it is preferred in the invention that the content ratio of the first ingredient is within a range from approximately 1% to approximately 20% by weight, the content ratio of the second ingredient is within a from approximately 60% to approximately 98% by weight, and the content ratio of the third ingredient is within a range from approximately 1% to approximately 20% by weight. Particularly preferably, the content ratio of the first ingredient is within a range from approximately 7% to approximately 20% by weight, the content ratio of the second ingredient is within a range from approximately 60% to approximately 86% by weight and the content ratio of the third ingredient is within a range from approximately 7% to approximately 20% by weight.

For MIX4 and MIX5 described above, a preferred composition is MIX5. A particularly preferred composition of MIX5 is a composition that the ratio of the first ingredient is within a range from approximately 1% to approximately 20% by weight, the ratio of the second ingredient is within a range from approximately 60% to approximately 98% by weight and the ratio of the third ingredient is within a range from approximately 1% to approximately 20% by weight.

Homogeneously Aligned MIX5

MIX5 is coated on a support substrate applied with the rubbing treatment described above. The alignment in the composition is homogeneous. After adding from approximately 1% to approximately 15% by weight of a cationic photopolymerization catalyst based on the entire weight of the polymerizable compound to the composition, a polymer is obtained easily by irradiation of UV-light. Polymerization proceeds also in air. The polymer maintains alignment in the composition.

The polymerizable liquid crystal composition of the invention may further contain additives optionally. Other polymerizable compounds are suitable for further controlling the characteristics of the composition and the polymer. Examples of the additives include, for example, silane coupling agents, surfactant, antioxidants, UV-absorbents, fine particles, solvents, and non-liquid crystalline polyfunctional monomers. The additives are used for controlling the characteristics of the composition and the polymer. Examples of the additives necessary for polymerization are polymerization initiators, sensitizers, etc. For dilution of the composition, an organic solvent is preferred. Examples of the other polymerizable compounds and additives are shown below.

Examples of the silane coupling agents include, for example, vinyl trialkoxy silane, 3-aminopropyl trialkoxy silane, N-(2-aminoethyl)3-aminopropyl trialkoxy silane, 3-glycidoxypropyl trialkoxy silane, 3-chloro trialkoxy silane, and 3-methacryloxypropyl trialkoxy silane. Other examples are dialkoxymethyl silanes in which one of the alkoxy groups (three) is substituted with methyl in the compounds described above. A preferred silane coupling agent is 3-aminopropyl triethoxy silane.

Examples of the surfactants include quaternary ammonium salts, alkylamine oxides, polyamine derivatives, polyoxyethylene-polyoxypropylene condensates, polyethylene glycols and esters thereof, sodium lauryl sulfate, ammonium lauryl sulfate, lauryl sulfate amines, alkyl substituted aromatic sulfonates, alkyl phosphates, perfluoroalkyl sulfonates, perfluoroalkyl carboxylates, perfluoroalkyl ethylene oxide adducts, and perfluoroalkyl trimethyl ammonium salts. The surfactant has an effect of facilitating the coating of the composition to the support substrate or the like. A preferred ratio of the surfactant varies depending on the kind of the surfactant and the compositional ratio of the composition and it is within a range from approximately 100 ppm to approximately 5% by weight and, further preferably, within a range from approximately 0.1% to approximately 1% by weight based on the entire weight of the polymerizable compound.

Examples of the antioxidants include, hydroquinone, 2,6-di-t-butyl-p-cresol, 2,6-di-t-butyl phenol, triphenyl phosphite, and trialkyl phosphite. Preferred commercial products are, for example, Irganox 245® and Irganox 1035® manufactured by Ciba Specialty Chemicals Ltd.

Examples of the UV-absorbent include, for example, TINUVIN PS®, TINUVIN 292®, TINUVIN 109®, TINUVIN 328®, TINUVIN 384-2®, TINUVIN 123®, TINUVIN 400®, and TINUVIN 400L® manufactured by Ciba Specialty Chemicals Ltd.

Examples for the material of fine particles are inorganic materials, organic materials, metals, etc. A preferred grain size of the fine particles is within a range from approximately 0.001 µm to approximately 0.1 µm. A further preferred grain size is within a range from approximately 0.001 µm to approximately 0.05 µm. While depending on the material, smaller grain size is preferred for preventing agglomeration. It is preferred that the distribution of the grain size is sharp. Such fine particles are useful for controlling the optical anisotoropy, increase of the strength of the polymer, etc. A preferred ratio is within a range from approximately 0.1% to approximately 30% by weight based on the entire weight of the polymerizable compound. A smaller ratio is preferred so long as the aim of addition can be attained.

Examples of the inorganic materials include ceramics, fluoro gold mica, fluoro tetra-silicic mica, teniolite, fluoro vermiculite, fluoro hectorite, hectorite, saponite, stevensite, montmorlonite, beidellite, kaolinite, flaiponite, ZnO, $TiO_2$, $CeO_2$, $Al_2O_3$, $Fe_2O_3$, $ZrO_2$, $MgF_2$, $SiO_2$, $SrCO_3$, $Ba(OH)_2$, $Ca(OH)_2$, $Ga(OH)_3$, $Al(OH)_3$, $Mg(OH)_2$, $Zr(OH)_4$, etc. Fine particles such as acicular crystals of calcium carbonate, etc. have optical anisotropy. The optical anisotropy of the polymer can be controlled by such fine particle. Examples of the organic materials include, carbon nanotubes, fullerene, dendrimer, polyvinyl alcohol, polymethacrylate, polyimide, etc.

General-purpose products may be used for the photoradical polymerization initiator. Examples of the initiator include, for example, ROCUR 1173® (2-hydroxy-2-methyl-1-phenylpropan-1-one), IRGACURE 184® (1-hydroxy cyclohexyl phenyl ketone), IRGACURE 651® (2,2-dimethoxy-1, 2-diphenyl ethan-1-one), IRGACURE 500®, IRGACURE 2959®, IRGACURE 907®, IRGACURE 369®, IRGACURE 1300®, IRGACURE 819®, IRGACURE 1700®, IRGACURE 1800®, IRGACURE 1850®, DAROCUR 4256®, and IRGACURE 784® manufactured by Ciba Specialty Chemicals Ltd.

Other examples of the photoradical polymerization initiator include p-methoxyphenol-2,4-bis(trichloromethyl)triazine, 2-(p-butoxystylyl)-5-trichloromethyl-1,3,4-oxadiazole, 9-phenylacridine, 9,10-benzphenazine, benzophenone/Michlers ketone mixture. Hexaarylbiimidazole/mercaptobenzimidazole mixture, 1-(4-isopropylphenyl)-2-hydroxy-2-methylpropan-1-one, benzylmethylketal, 2-methyl-1-[4-(methylthio)phenyl]-2-morpholino propan-1-one, 2,4-diethyl xanthone/p-dimethylamino methyl benzoate mixture, and benzophenone/methyltriethanolamine mixture. Such photoradical polymerization initiator is suitable to MIX1, MIX2, and MIX3. This is because the main ingredient of the compositions is a compound having —OCOCH=CH$_2$.

Examples of the cationic photopolymerization initiator include diaryl iodonium salts and triaryl sulfonyl salts. Such initiators are suitable to MIX4 or MIX5. This is because the main ingredient of the composition is a compound having an oxetane ring or an oxirane ring.

Examples of the commercial names of the optical cationic photopolymerization initiator include DTS-102® manufactured by Midori Chemicals Co. Examples include Cyracure UVI-6990®, Cyracure UVI-6974® and Cyracure UVI-6992® manufactured by Dow Chemical Company. Example include Adecaoptomer SP-150® SP-152®, SP-170®, and SP-172® manufactured by Asahi Denka Co. Examples include PHOTOINITIATOR 2074® manufactured by Rhodia Co., IRGACURE 250® manufactured by Ciba Specialty Chemicals Ltd, and UV-9380C® manufactured by GE Silicons Co. Such cationic photopolymerization initiators are suitable to MIX4 and MIX5. This is because the main ingredient of the composition is a compound having an oxetanyl group or an oxiranyl group.

Examples of the sensitizer include thioxathone or Anthracure UVS-1331® manufactured by Kawasaki Kasei Chemicals Ltd.

Examples of the solvent include, benzene, toluene, xylene, mesitylene, butylbenzene, diethyl benzene, tetraline, methoxy benzene, 1,2-dimethoxy benzene, ethylene glycol dimethyl ether, diethylene glycol dimethyl ether, acetone, methyl ethyl ketone, methyl isobutyl ketone, cyclopentanone, cyclohexanone, ethyl acetate, ethyl lactate, methyl lactate, ethylene glycol monomethyl ether acetate, propylene glycol monomethyl ether acetate, propylene glycol monoethyl ether acetate, γ-butylolactone, 2-pyrrolidone, N-methyl-2-pyrrolidone, dimethyl formamide, chloroform, dichloromethane, carbon tetrachloride, dichloroethane, tetrachloroethylene, trichloroethylene, chlorobenzene, t-butyl alcohol, diacetone alcohol, glycerine, monoacethine, ethylene glycol, triethylene glycol, hexylene glycol, ethylene glycol monomethyl ether, ethyl cellosolve, and butyl cellosolve, etc. The solvent may be a single compound or a mixture. The solvent is used upon coating the polymerizable liquid crystal composition of the invention on a support substrate.

Examples of the non-liquid crystalline polyfunctional monomer includes 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylol propane triacrylate, trimethylol EO added triacrylate, pentaerythritol triacrylate, pentaerythritol tetraacrylate, trisacryloxyethyl phosphate, bisphenol A EO added diacrylate, bisphenol A glycidyl diacrylate (trade name of products: Biscoat 700® manufactured by Osaka Organic Chemical Industry Ltd.), and polyethylene glycol diacrylate. The compounds can be used for controlling the viscosity or increasing the hardness of the polymer further by addition to MIX1, MIX2, or MIX3.

Then, polymerization conditions for the composition of the invention are to be described. By polymerizing the polymerizable liquid crystal composition of the invention, a polymer can be obtained. For obtaining a polymer of excellent alignment, polymerization by using the photopolymerization catalyst is more preferred than thermal polymerization. This is because polymerization is conducted easily under the condition where the composition is a liquid crystal.

The kind of preferred light used for the photopolymerization depends on the absorption wavelength of the photopolymereization initiator to be used. Usually, the light is UV-light, visible light, infrared light, etc. Electron beams and Electromagnetic waves such as X-rays may also be used. A preferred range for the wavelength is from approximately 150 nm to approximately 500 nm. A more preferred range is from approximately 250 nm to approximately 450 nm and most preferred range is from approximately 300 nm to approximately 400 nm. The light source includes a low pressure mercury lamp (sterilizing lamp, fluorescence chemical lamp, black light), high pressure discharge lamp (high pressure mercury lamp, metal halide lamp), short arc discharge lamp (superhigh pressure mercury lamp, xenon lamp, mercury xenon lamp), etc. A preferred light source is a superhigh pressure mercury lamp. The light from the light source may be irradiated as it is to the composition. A light of a specified wavelength selected by a filter (or in a specified wavelength region) may be irradiated to the composition. A preferred irradiation energy density is within a range from approximately 2 mJ/cm$^2$ to approximately 5,000 mJ/cm$^2$. A more preferred range is from approximately 10 mJ/cm$^2$ to approximately 3,000 mJ/cm$^2$. A particularly preferred range is from approximately 100 mJ/cm$^2$ to approximately 2,000 mJ/cm$^2$. A preferred illuminance is within a range from approximately 0.1 to approximately 5,000 mW/cm$^2$. A more preferred illumination is within a range from approximately 1 mW/cm$^2$ to approximately 2,000 mW/cm$^2$. The temperature upon light irradiation is set such that the composition has a liquid crystal phase. A preferred irradiation temperature is approximately 100° C. or lower. Since thermal polymerization may possibly occur at a temperature of approximately 100° C. or higher, preferred orientation can not be obtained sometimes.

The shape of the polymer is film, plate, grain, powder, etc. The polymer may be molded. For obtaining a film polymer, a support substrate is generally used. A film is obtained by coating a composition on a support substrate and polymerizing a paint film having a liquid crystal phase. A preferred thickness of the polymer depends on the value of the optical anisotoropy and the application use of the polymer. Accordingly, while the range can not be determined strictly, a preferred thickness is within a range from approximately 0.05 μm to approximately 50 μm. A more preferred thickness is within a range from approximately 0.1 μm to approximately 20 μm. A particularly preferred thickness is within a range from approximately 0.5 μm to approximately 10 μm. The haze value (cloudiness) of the polymer is approximately 1.5% or less. The transmittance of the polymer is generally approximately 80% or more in a visible light region. Such a polymer is suitable as an optically isomeric thin film used for liquid crystal display devices.

Examples of the support substrate include, for example, triacetyl cellulose (sometimes referred to as TAC), polyvinyl alcohol, polyimide, polyester, polyallylate, polyetherimide, polyethylene terephthalate, and polyethylene naphthalate. Examples of the commercial names are Arton® manufactured by JSR Co., Zeonex® and Zeonoa® of Nippon Zeon Co., and Apel® of Mitsui Chemical Co. The support substrate is a monoaxially stretched film, biaxially stretched film, etc. A preferred support substrate is a triacetyl cellulose film. The film may be used as it is with no pre-treatment. The film may optionally be applied with a surface treatment such as saponification treatment, corona discharge treatment, and UV-ozone treatment. Other examples are support substrates made of metals such as aluminum, iron, and copper, and support substrates made of glass such as alkali glass, borosilicate glass, and flint glass.

The paint film on the support substrate is prepared by coating the composition as it is. The paint film is prepared by dissolving a composition in an appropriate solvent, coating the same and then removing the solvent. The coating method includes, for example, spin coating, roll coating, curtain coating, flow coating, printing, micro-gravure coating, gravure coating, wire bar coating, dip coating, spray coating, meniscus coating, and casting film formation method, etc.

In the polymerizable liquid crystal composition of the invention, the factors determining the alignment of liquid crystal molecules are (1) kind and blending ratio of the compound contained in the composition, (2) kind of the support substrate, (3) method of alignment treatment, etc. and, particularly, the method of alignment treatment for the substrate is important. A preferred method for the alignment treatment includes methods such as oblique vapor deposition of silicone oxide or slitwise etching fabrication. A particularly preferred method of the alignment treatment is rubbing in one direction using, for example, a rayon cloth. In the rubbing treatment, a support substrate may be rubbed directly, or a support substrate may be coated with a thin film, for example, of polyimide or polyvinyl alcohol and then the thin film may be rubbed. A special thin film that gives satisfactory alignment with no rubbing treatment is also known. Alternatively, a side chain type liquid crystal polymer may be coated on the support substrate.

The alignment in the liquid crystal molecules is classified, for example, as homogeneous (parallel), homeotropic (vertical) and hybrid alignment. Homogeneous alignment means a state in which the alignment vector is in parallel with the substrate and in one direction. Homeotropic alignment means a state in which the alignment vector is vertical to the substrate. Hybrid alignment means a state where the alignment vector rises vertically from the parallel state as apart from the substrate. The alignment described above is observed in the composition having the nematic phase, etc.

Then, the polymer of the invention is to be described. The polymer is obtained by polymerizing the polymerizable liquid crystal composition of the invention. The polymer satisfies a plurality of characteristics including those of colorless transparency, small photoelasticity, less peeling property from support substrate, sufficient hardness, high heat resistance, high weather proofness, etc. The polymer is also excellent in the characteristics such as impact resistance, fabricability, electric characteristics and solvent resistance. Important characteristics for preparing the polymer film are characteristics including those less peeling property from support substrate, sufficient hardness, high heat resistance, etc.

The application use of the polymer is as described below. The polymer can be used as a molding product having an optical anisotoropy. Examples of the use of the polymer include a phase difference plate (½ wavelength plate, ¼ wavelength plate, etc.), and optical film such as anti-reflection film, selective reflection film, and view angle compensation film. Polymers having alignment such as homogenous, hybrid, and homeotropic alignment can be utilized, for example, for phase difference plate, polarizing device, liquid crystal alignment film, anti-reflection film, selective reflection film, and view angle compensation film. Such a polymer is used for the phase difference plate, view angle compensation film, etc. of liquid crystal display devices with an aim of optical compensation. Industrially important examples of the use include view angle compensation in liquid crystal display devices of VA mode, IPS mode, TN mode, MVA mode, etc. The polymer can be utilized also for highly heat conductive epoxy resin, adhesive, synthetic polymer having mechanical isomerism, cosmetic, ornament, non-linear optical material, information memory material, etc.

The phase difference plate as an example of the application use of the polymer has a function of converting the state of polarization. The ½ wavelength functional plate has a function of rotating the oscillation direction of linear polarization by 90°. A composition capable of satisfying the equation: $d=\lambda/2\times\Delta n$ is coated on a support substrate, in which d represents thickness of the composition, $\lambda$ represents wavelength, and $\Delta n$ represents optical anisotoropy. A ½ wavelength functional plate is obtained by aligning and then photopolymerizing the composition. On the other hand, a ¼ wavelength functional plate has a function of converting linear polarization into circular polarization, or circular polarization into linear polarization. In this case, the paint film of the composition may be prepared so as to satisfy the condition: $d=\lambda/4\times\Delta n$. The thickness (d) of the polymer is adjusted as below. In a method of diluting the composition with a solvent and then coating the same on the support substrate, a paint film of an aimed thickness can be obtained by properly selecting the concentration of the composition, the coating method, the condition for coating, etc. A method of utilizing the liquid crystal cell is also prepared. The liquid crystal cell is convenient since it has an alignment film of a polyimide or the like. In a case of pouring the composition into the liquid crystal cell, the thickness of the paint film can be controlled depending on the gap of the liquid crystal cell.

The compound has characteristics such that it is polymerized at a room temperature, photopolymerized under the presence of an appropriate initiator, and has chemical stability, colorless, easy solubility to solvent, good compatibility with other polymerizable compound, and small depositing tension to a support substrate, etc. Since the compound is easily wetted to the support substrate, a uniform paint film can be obtained easily. The compound is easily polymerized under the presence of a photopolymerization initiator by UV-light at a small accumulated amount of light. Since the compound is chemically stable, it is excellent in store stability in a cold dark place.

Since the compound (1-1), the compound (1-2), the compound (5-1), and the compound (5-2) have good compatibility with other compounds, preparation of the composition is easy. The characteristics of the compound are reflected on the characteristics of the composition containing the compound. The characteristics of the composition are reflected on the characteristics of the obtained polymer. The compound (1-1), the compound (1-2), the compound (5-1), and the compound (5-2) are mixed with various polymerizable liquid crystal compounds to provide uniform compositions. In this case, the compound can stabilize the alignment of liquid crystal molecules. Accordingly, a uniform paint film with no alignment defects can be obtained. The alignment is maintained also by polymerization. Accordingly, it is possible to obtain a polymer film with controlled alignment for the liquid crystal molecules and with no alignment defects. In a case where the composition is a thin film, an optically anisotropic polymer film can be obtained. A polymer film having alignment such as homogeneous, homeotropic, or hybrid alignment can be used for an optical compensation film.

The compound (7), the compound (8), the compound (9), the compound (10), and the compound (11) of the invention are to be described. The compounds have core structure of —Ph—C(CF$_3$)$_2$—Ph— or —Ph—SO$_2$—Ph—. Ph represents 1,4-phenylene. Both of the skeletons are flexed and not linear. The feature is greatly different from polymerizable liquid crystal compounds generally having a linear molecular structure. Further, since the compound (7), the compound (8), and the compound (9) have lower melting point than the compound (1-1-3) or the compound (1-2-3), they are less recrystallized and, further, excellent in the compatibility with the polymerizable liquid crystal composition.

The compound having the symmetrical structure is preferred since it is less expensive and can be synthesized easily compared with compounds of asymmetric structure.

The compound of the invention has two polymerizable groups. The compound provides a rigid polymer. This is because the compound provides a three-dimensional structure by polymerization. The compound is preferred in view of providing the polymer of high hardness.

The compound is polymerized at a room temperature, photopolymerized under the presence of an appropriate initiator, stable chemically, colorless, easily soluble to a solvent, and has good compatibility with other polymerizable compound. Since the compound is chemically stable, it is excellent in store stability in a cold and dark place.

Since the compound has a good compatibility with other compounds, it can be prepared easily into a composition. The characteristics of the compound are reflected on the characteristics of the composition containing the compound. The characteristics of the composition are reflected on the characteristics of the obtained polymer. The compound is mixed with various polymerizable liquid crystal compounds to provide uniform compositions. In this case, the compound can control the alignment of the liquid crystal molecules. The compound is useful as an alignment controller. The alignment is maintained also by polymerization. Accordingly, by copolymerizing the compound with a polymerizable liquid crystal compound, a polymer controlled for the alignment of liquid crystal molecules can be obtained. In a case where the composition is a thin film, a polymer film having optical anisotropy can be obtained. The compound is particularly useful as regards having the effect of controlling the alignment of liquid crystal molecules. A polymer film having alignment such as homogeneous, hybrid, or homeotropic alignment has a function of optical compensation, etc.

SPECIFIC EXAMPLES

The following examples are for illustrative purposes only and are not intended, nor should they be interpreted to, limit the scope of the invention.

After describing the measuring method for physical properties, the invention is to be described specifically by way of examples. Examples are given only as an illustration of the invention and the invention is not restricted by the following examples. The ratio of the compound in the composition is on the basis of weight % (wt %).

The structure of the synthesized compound was confirmed by measurement of proton NMR (Bruker: DRX-500) at 500 MHz. Numerical values described represent ppm, in the descriptions, numerical values represent ppm, "s" stands for singlet, "d" for doublet, "t" for triplet, and "m" for multiplet.

Phase transition temperature: A sample was placed on a hot plate of a melting point measuring apparatus having a polarization microscope and temperature was elevated at a rate of 1° C./minute. A temperature upon transfer of a liquid crystal phase to other liquid crystal phase was measured. C stands for crystal, N stands for nematic phase, and I stands for isotropic liquid. NI point is an upper limit temperature of the nematic phase, or a transfer temperature from the nematic phase to the isotropic liquid. "C50N631" shows transfer from crystal to nematic phase at 50° C., transfer from the nematic phase to the isotropic liquid.

Peeling test using Cellotape (registered trade mark): Measurement was conducted in accordance with a test method of JIS standards "JIS-K-5400, 8.5, Adhesion property (8.5.2, Grid tape method)." That is, the result was evaluated in accordance with the number of grids not peeled among the grids by the number of 100.

Pencil hardness: Measurement was conducted in accordance with the method of JIS standards "JIS-K-5400. 8.4. Pencil scratch test." The result was indicated by the hardness of a pencil core.

Heat resistant test: The test was conducted under the condition at 100° C. for 500 hours and the result was evaluated depending on the fluctuation of retardation. After coating a polyamic acid (PIA5310®, manufactured by Chisso Co.) on a glass substrate, it was heated at 210° C. for 30 minutes to prepare a support substrate. The surface of the formed polyimide was rubbed with a rayon cloth. The composition of the sample was diluted with a mixed solvent of toluene and cyclopentanone (2:1 weight ratio) to prepare a 30 wt % solution. The solution was coated by a spin coater on a support substrate and after heating at 70° C. for 3 minutes, UV-light was irradiated at 60° C. for 10 seconds to the formed paint film by using a superhigh pressure mercury lamp (250 W/cm). The retardation of the obtained polymer film was measured at 25° C. After heating the polymer at 100° C. for 500 hours, the retardation was measured again at 25° C. Two values were compared to evaluate the heat resistance. The retardation was measured in accordance with the method described in the literature by using a Senarmont compensator. The wavelength used was 550 nm. The literature referred to was Hiroshi Awaya, INTRODUCTION TO MICROSCOPE FOR POLYMERIC MATERIAL, 94, Agne Technical Center (2001).

Optical anisotropy ($\Delta n$): The value for the retardation of the film (25° C.) was measured in accordance with the method of the heat resistance test described above. The thickness (d) of the polymer film was also measured. Since the retardation was $\Delta n \times d$, the value for the optical anisotropy was calculated based on the relation.

Alignment of liquid crystal molecule: A polymer film (liquid crystal aligned film) was prepared on a TAC (triacetyl cellulose) film applied with a saponification treatment. The alignment of the polymer was determined based on the angle dependence of the transmission light intensity in accordance with two methods of visual observation and analysis by a measuring apparatus.

Visual observation—A polymer film was put between two polarizing plates arranged in crossed nicols, and a light was irradiated in the direction perpendicular to the film surface (tilting angle: 0°). Change of the transmission light was observed while increasing the tilting angle of irradiation from 0° to, for example, 50°. The direction of tilting irradiation was aligned with the direction of rubbing (the direction in the longitudinal axis of the liquid crystal molecule). When the transmission light from the vertical direction was at the maximum, it was judged that the alignment was homogeneous. This is because the alignment vector of liquid crystal molecules is in parallel with the TAC film in the homogeneous alignment. On the other hand, in a case where the transmission light from the vertical direction was at the minimum and the transmission light increased along with increase in the tilting angle, it was judged that the alignment was homeotropic. This is because the alignment vector of the liquid crystal molecules is perpendicular to the TAC film in the homeotropic alignment.

Measurement by polarization analyzer—OPTIPRO polarizer manufactured by Shintec Inc. was used. A light at wavelength of 550 nm was irradiated to the polymer film. Retardation ($\Delta n \times d$) was measured while decreasing the incident angle of the light from 90° relative to the film surface.

Example 1

Synthesis of Compound Represented by Formula 1-1

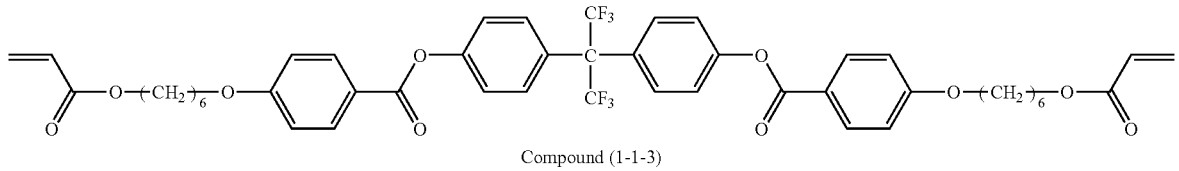

Compound (1-1-3)

The starting material, 4-[6-(acryloyloxy)hexyloxy]benzoic acid (AKI) was synthesized by a method described in *Makromol. Chem.*, 190, 2255-68, 1989.

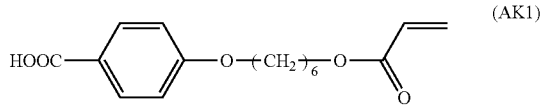

Step 1: Under a nitrogen atmosphere, 4-[6-(acryloyloxy)hexyloxy]benzoic acid (AKI: 6.0 g) and 2,2-bis(4-hydroxyphenyl)-hexafluoropropane (3.2 g), and 4-dimethyl aminopyridine (0.06 g) were added to dichloromethane (100 mL), to which a dichloromethane solution (50 mL) of N,N'-dicyclohexyl carbodiimide (4.1 g) was dropped under ice cooling and stirred at a room temperature for 12 hours, insoluble materials were removed by filtration, water was added to the filtrate, which was washed with hydrochloric acid, aqueous solution of sodium hydroxide, and water. After drying an organic layer over anhydrous magnesium sulfate, the solvent was distilled off under a reduced pressure. After fractionating the residue by silica gel chromatography (toluene/ethyl acetate=19/1), it was recrystallized from a solvent mixture of toluene and ethanol to obtain a compound (1-1-3) (4.3 g).

Melting point: 93° C.-95° C. $^1$H-NMR (CDCl$_3$; δ ppm): 8.14 (d, 4H), 7.48 (d, 4H), 7.25 (d, 4H), 6.98 (d, 4H), 6.41 (dd, 2H), 6.13 (dd, 2H), 5.83 (dd, 2H), 4.19 (t, 4H), 4.06 (t, 4H), 1.82-1.88 (m, 4H), 1.70-1.76 (m, 4H), 1.44-1.57 (m, 8H).

Example 2

Synthesis of Compound Represented by Formula 7

Synthesis of Compound (1-1-8)

Step 1: Sulfuric acid (230 g) was dropped under stirring for 10 minutes to an ethanol solution (1500 mL) of 3-(4-hydroxyphenyl)propionic acid (1150 g), and refluxed successively for 5 hours. The reaction mixture was concentrated and the obtained concentrated solution was poured into water (1,000 mL) and stirred with addition of ethyl acetate. After separation of the solution, an ethyl acetate layer was neutralized with an aqueous solution of a saturated sodium carbonate, washed with a small amount of water and then dried over anhydrous magnesium sulfate. Ethyl acetate and unreacted ingredients were distilled off from the ethyl acetate layer to obtain concentrates (1,400 g). The concentrates were purified by distillation under a reduced pressure to obtain ethyl 3-(4-hydroxyphenyl)propionate (1,144 g). The boiling point was 160° C./4.0 hPa.

Step 2: 6-chlorohexanol (800 g) was added to anhydrous acetic acid (1,200 mL) cooled to 10° C. in an ice bath, and then pyridine (934 g) was dropped for 10 minutes. After the completion of dropping, they were refluxed for 2 hours. The reaction mixture was poured into water and toluene was further added and stirred. After neutralization the toluene layer with an aqueous saturated solution of sodium carbonate, it was washed with a small amount of water and further dried over anhydrous magnesium sulfate. Toluene and unreacted ingredients were distilled off from the toluene layer to obtain concentrates. The concentrates were purified by distillation under a reduced pressure to obtain 6-acetoxy chlorohexane (983 g). The boiling point was 82° C./5.3 hPa.

Step 3: Sodium hydroxide (98 g) was added to a solution of dimethyl formamide (2,800 mL) of ethyl 3-(4-hydroxyphenyl)propionate (400 g) and stirred at 40° C. for 30 minutes. Formation of a salt could be observed visually. 6-acetoxycyclohexane (515 g) was added and stirred at 80° C. for 7 hours. The reaction mixture was poured into water (2,000 mL) and, toluene was further added and stirred. After separation, the toluene layer was washed with 6N hydrochloric acid, an aqueous saturated solution of sodium carbonate and water successively and then dried over anhydrous magnesium sulfate. The solvent was distilled off from the toluene layer to obtain 709 g of concentrates. Sodium hydroxide (185 g) was dissolved in water (400 mL) to which ethanol (600 mL) and

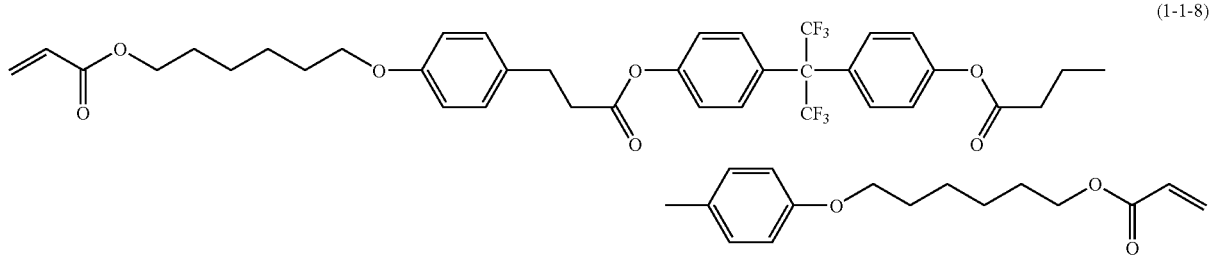

709 g of the concentrates were added and heated and refluxed for 2 hours. The reaction mixture was concentrated under a reduced pressure by using an evaporator and the resultant concentrates were poured into 6N hydrochloric acid. The obtained slurry was filtered to obtain solids. They were recrystallized from ethanol to obtain (4-(6-hydroxyhexyloxy) phenyl)propionic acid (281 g). Melting point: 109° C. to 112° C.

Step 4: Acrylic acid chloride (74.3 g) was dropped for 10 minutes to a mixture of (4-(6-hydroxyhexyloxy)phenyl)propionic acid (200 g), N,N-dimethylaniline (100 g), BHT (0.3 g), and dioxane (1,000 mL). After stirring at 60° C. for 5 hours, the reaction mixture was poured into water and stirred with addition of ethyl acetate. The ethyl acetate layer was washed with water and dried over anhydrous magnesium sulfate. The solvent was removed by distillation from the ethyl acetate layer to obtain solids. The solids were dissolved in toluene and poured into plenty of heptane and re-precipitated to obtain (4-(6-acryloyloxyhexyloxy)phenyl)propionic acid (AK2: 213 g). Melting point: 64° C. to 68° C.

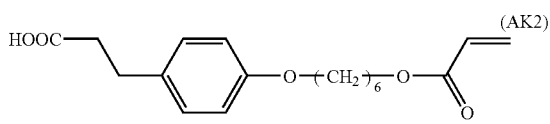

(AK2)

Step 5: Under a nitrogen atmosphere, a dichlomethane (20 mL) solution of N,N'-dicyclohexylcarbodiimide (1.9 g) was dropped under ice cooling to a mixture of (4-(6-acryloyloxyhexyloxy)phenyl)propionic acid (AK2: 3.0 g), 2,2-bis(4-hydroxyphenyl)-hexafluoropropane (1.5 g), 4-dimethylaminopyridine (0.03 g), and dichloromethane (50 mL). After stirring at a room temperature for 12 hours, insoluble materials were removed by filtration. Water was added to the filtrates, which were washed with hydrochloric acid, an aqueous solution of sodium hydroxide and water. After drying the organic layer over anhydrous magnesium sulfate, the solvent was distilled off under a reduced pressure. After separating residues by silica gel chromatography (toluene/ethyl acetate=19/1), they were re-crystallized from a solvent mixture of toluene and ethanol to obtain a compound (1-1-8) (2.1 g).

Melting point: 57-58° C. $^1$H-NMR (CDCl$_3$; δ ppm): 7.38 (d, 4H), 7.17 (d, 4H), 7.04 (d, 4H), 6.85 (d, 4H), 6.40 (dd, 2H), 6.12 (dd, 2H), 5.82 (dd, 2H), 4.19 (t, 4H), 3.94 (t, 4H), 3.01 (t, 4H), 2.86 (t, 4H), 1.76-1.82 (m, 4H), 1.68-1.74 (m, 4H), 1.42-1.53 (m, 8H).

Example 3
Synthesis of Compound Represented by Formula 8
Synthesis of Compound (1-1-12)

Step 1: 2-fluoro-4-[6-(acryloyloxy)hexyloxy]benzoic acid (AK3) was synthesized using ethyl 2-fluoro-4-hydroxy benzoate as a starting material by using a method described in *Makromol. Chem.*, 190, 2255-68 (1989). The melting point of the compound (AK3) was 98° C. to 99° C.

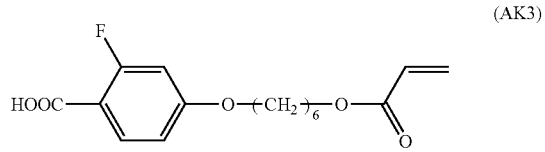

(AK3)

Step 2: Under a nitrogen atmosphere, 2-fluoro-4-[6-(acryloyloxy)hexyloxy]benzoic acid (AK3: 3.0 g), 2,2-bis(4-hydroxyphenyl)-hexafluoropropane (1.6 g), and 4-dimethylamino pyridine (0.03 g) were added to dichloromethane (50 mL), a dichloromethane solution (20 mL) of N,N'-dicyclohexyl carbodiimide (2.0 g) was dropped under ice cooling. After stirring at a room temperature for 12 hours, insoluble materials were removed by filtration. Water was added to the filtrates which were washed with hydrochloric acid, an aqueous solution of sodium hydroxide, and water. After drying the organic layer over anhydrous magnesium sulfate, the solvent was distilled off under a reduced pressure. After separating the residues by silica gel chromatography (toluene/ethyl acetate=19/1), they were recrystallized from a solvent mixture of toluene and ethanol to obtain a compound (1-1-12) (2.6 g).

Melting point: 75-77° C. $^1$H-NMR (CDCl$_3$; δ ppm): 8.04 (t, 2H), 7.48 (d, 4H), 7.26 (d, 4H), 6.78 (dd, 2H), 6.69 (dd, 2H), 6.41 (dd, 2H), 6.13 (dd, 2H), 5.83 (dd, 2H), 4.18 (t, 4H), 4.04 (t, 4H), 1.82-1.87 (m, 4H), 1.70-1.76 (m, 4H), 1.44-1.55 (m, 8H).

Melting points of the compound (1-1-3), and the compound (1-1-8) and the compound (1-1-12) of the invention were compared.

| Compound (1-1-3)  | Melting point 93° C. to 95° C. |
| Compound (1-1-8)  | Melting point 57° C. to 58° C. |
| Compound (1-1-12) | Melting point 75° C. to 77° C. |

Difference of the melting point due to the difference of the molecular structure was recognized. It can be seen that the compound (1-1-8) having the ethane bond as the connection group has a melting point lower than the compound (1-1-3)

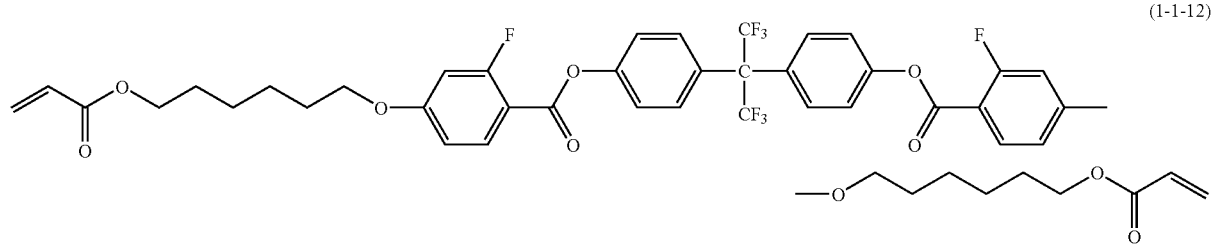

(1-1-12)

and the compound (1-1-12) in which the liquid crystal skeleton is substituted with fluorine has a melting point lower than the compound (1-1-3). That is, it is considered that recrystallization occurs less in a case of preparing compositions by adding the compound of the invention to the polymerizable liquid crystal composition.

Example 4

Synthesis of Compound Represented by Formula 1-2

Synthesis of Compound (1-2-3)

Step 1: Under a nitrogen atmosphere, a dichloromethane solution (10 mL) of N,N'-dicyclohexyl carbodiimide (3.5 g) was dropped under ice cooling to a mixture of 4-(6-(acryloyloxyhexyloxy)phenyl)propionic acid (AK2: 5.1 g), bis(4-hydroxyphenyl)sulfone (2 g), 4-dimethylaminopyridine (0.1 g), and dichloromethane (80 mL). After stirring at a room temperature for 12 hours, insoluble materials were removed by filtration. Water was added to the filtrates, which were washed with hydrochloric acid, an aqueous solution of sodium hydroxide and water. After drying the organic layer over anhydrous magnesium sulfate, the solvent was distilled off

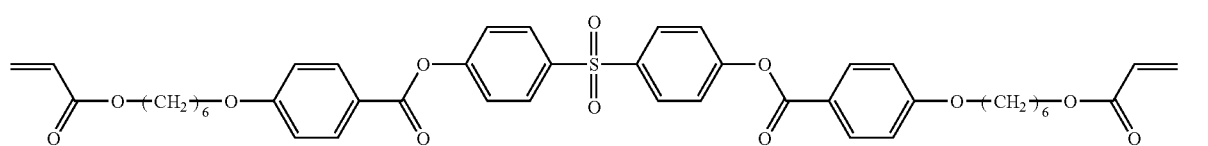

(1-2-3)

Step 1: Under a nitrogen atmosphere, a dichloromethane solution (20 mL) of N,N'-dicyclohexyl carbodiimide (1.4 g) was dropped under ice cooling to a mixture of 4-[6-(acryloyloxy)hexyloxy]benzoic acid (AK1: 2.0 g), bis(4-hydroxyphenyl)sulfone (0.8 g), 4-dimethylaminopyridine (0.02 g), and dichloromethane (50 mL). After stirring at a room temperature for 12 hours, insoluble materials were removed by filtration. Water was added to the filtrates which were washed with hydrochloric acid, an aqueous solution of sodium hydroxide and water. After drying the organic layer over anhydrous magnesium sulfate, the solvent was distilled off under a reduced pressure. After separating the residues by silica gel chromatography (toluene/ethyl acetate=9/1), they were recrystallized from a solvent mixture of toluene and ethanol to obtain a compound (1-2-3) (1.76 g).

Melting point: 88-90° C. $^1$H-NMR (CDCl$_3$; δ ppm): 8.12 (d, 4H), 8.02 (d, 4H), 7.38 (d, 4H), 6.97 (d, 4H), 6.41 (dd, 2H), 6.13 (dd, 2H), 5.83 (dd, 2H), 4.18 (t, 4H), 4.05 (t, 4H), 1.82-1.87 (m, 4H), 1.70-1.76 (m, 4H), 1.44-1.57 (m, 8H).

Example 5

Synthesis of Compound Represented by Formula 9

Synthesis of Compound (1-2-8)

under a reduced pressure. After separating the residue by silica gel chromatography (toluene/ethyl acetate=9/1), it was recrystallized from a solvent mixture of toluene and ethanol to obtain a compound (1-2-8) (1.76 g).

Melting point: 67-68° C. $^1$H-NMR (CDCl$_3$; δ ppm): 7.92 (d, 4H), 7.15 (d, 4H), 7.15 (d, 4H), 6.83 (d, 4H), 6.39 (dd, 2H), 6.12 (dd, 2H), 5.81 (dd, 2H), 4.17 (t, 4H), 3.93 (t, 4H), 2.99 (t, 4H), 2.85 (t, 4H), 1.80-1.77 (m, 4H), 1.72-1.69 (m, 4H), 1.51-1.45 (m, 8H).

Melting points of the compound (1-2-3) and the compound (1-2-8) of the invention were compared.

| Compound (1-2-3) | Melting point 88° C. to 90° C. |
| Compound (1-2-8) | Melting point 67° C. to 68° C. |

Difference of the melting point due to the difference of the molecular structure was recognized. It can be seen that the compound (1-2-8) having the ethane bond as the connection group has a melting point lower than the compound (1-2-3). That is, it is considered that recrystallization occurs less in a case of preparing compositions by adding the compound of the invention to the polymerizable liquid crystal composition.

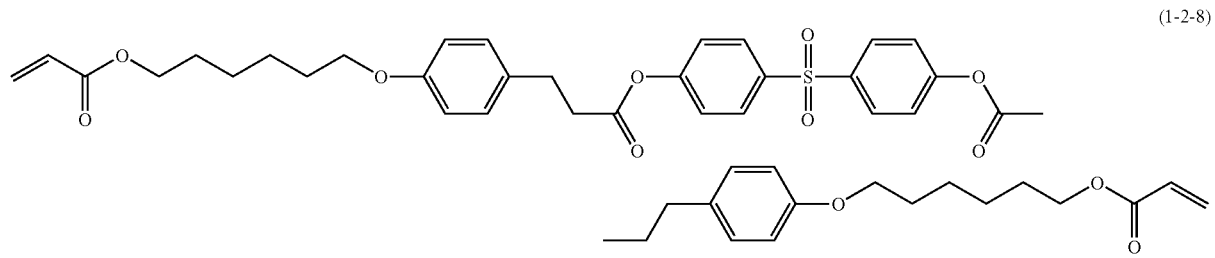

(1-2-8)

Example 6

Synthesis of Compound of Represented by Formula 10

Synthesis of Compound (5-1-5)

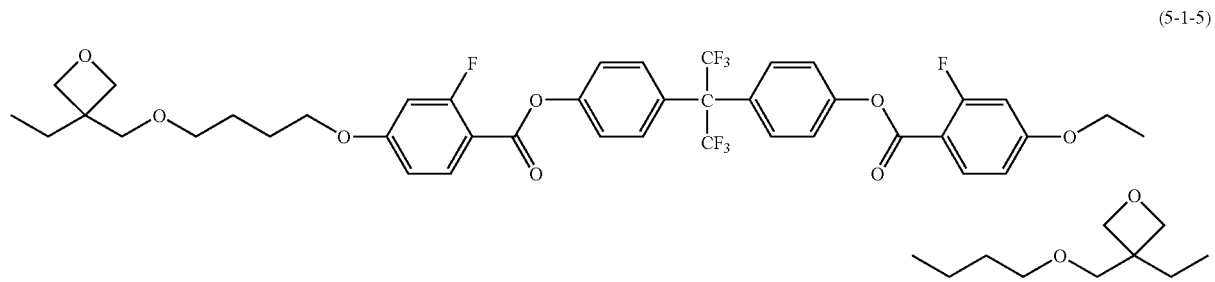

(5-1-5)

Step 1: A mixture of 3-[(6-bromohexyloxy)methyl]-3-methyloxetane (84 g), ethyl 4-hydroxybenzoate (50 g), potassium carbonate (50 g) and dimethyl formamide (600 mL) was stirred at 90° C. for 4 hours. Water was added to the reaction mixture to terminate the reaction and, after extraction with ethyl acetate, the liquid extract was washed with an aqueous solution of 2N-sodium hydroxide and water successively, and the organic layer was dried over anhydrous magnesium sulfate. The residues obtained by distilling off the solvent were purified on silica gel chromatography (toluene/ethyl acetate=8/2), to obtain ethyl 4-[6-(2-methyloxetane-3-ylmetoxy)hexyloxy)benzoate (85 g).

Step 2: A mixture of ethyl 4-[6-(3-methyloxetane-3-ylmethoxy)hexyloxy]benzoate (83 g), sodium hydroxide (12 g), water (50 mL), and Solmix (registered trademark: 200 ml) was refluxed for 2 hours. The reaction mixture was rendered acidic with hydrochloric acid, extracted with ethyl acetate and an organic layer was dried over anhydrous magnesium sulfate. The solvent was distilled off to obtain 4-[6-(3-methyloxetane-3-ylmethoxy)hexyloxy)benzoic acid (OX1: 63 g). Melting point: 58.5° C.

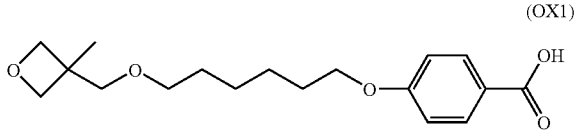

(OX1)

By the same production process, the following compound was prepared.

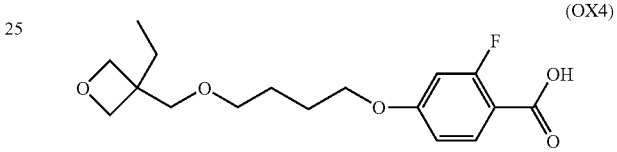

(OX4)

Step 3: Under a nitrogen atmosphere, a dichloromethane solution (20 mL) of N,N'-dicyclohexyl carbodiimide (1.9 g) was dropped under ice cooling to a mixture of 2-fluoro-4-[4-(3-ethyloxetane-3-ylmethoxy)butyloxy]benzoic acid (OX4: 3.1 g), 2,2-bis(4-hydroxyphenyl)-hexafluoropropane (1.5 g), 4-dimethylamino pyridine (0.02 g), and dichloromethane (80 mL). After stirring at a room temperature for 12 hours, insoluble materials were removed by filtration. Water was added to the liquid filtrates, which were washed with hydrochloric acid, an aqueous solution of sodium hydroxide, and water. After drying the organic layer over anhydrous magnesium sulfate, the solvent was distilled off under a reduced pressure. The residues were fractionated by silica gel chromatography (toluene/ethyl acetate=9/1) to obtain an oily compound at a room temperature (5-1-5).

$^1$H-NMR (CDCl$_3$; δ ppm): 8.04 (t, 2H), 7.48 (d, 4H), 7.28 (d, 4H), 6.78 (dd, 2H), 6.69 (dd, 2H), 4.46 (d, 4H), 4.38 (d, 4H), 4.07 (t, 4H), 3.55 (s, 8H), 1.89-1.94 (m, 4H), 1.72-1.81 (m, 8H), 0.89 (t, 6H).

Example 7

Synthesis of Compound Represented by Formula 10

Synthesis of Compound (5-1-1)

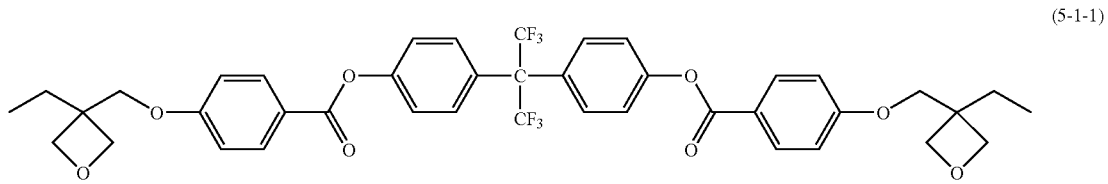

(5-1-1)

Step 1: 3-ethyl-3-hydroxymethyloxetane (trade name of product, OXT-101®, manufactured by To a Gosei Co.; 116 g) was added to pyridine (500 mL) and cooled to 0° C. while stirring. p-Toluene sulfonyl chloride (190 g) was added divisionally for several times. After stirring for 5 hours while keeping at 0° C., the reaction mixture was poured to iced water (1 L). It was extracted with diethyl ether (500 mL), the pH was rendered acidic with 3% hydrochloric acid, and extracts were washed with water. Then, the extracts were washed with a saturated solution of sodium carbonate and water successively and dried over anhydrous magnesium sulfate. The solvent was distilled off to obtain 3-[(tosyloxy)methyl]3-ethyloxetane (243 g).

Step 2: A mixture of ethyl hydroxyl benzoate (50 g), potassium hydroxide (21 g), and dimethyl formamide (400 mL) was stirred at 70° C. for one hour. After lowering the temperature to 45° C., 3-[(tosyloxy)methyl]-3-ethyloxetane (100 g) was dropped to the reaction mixture. It was stirred for 3 hours while being kept at 45° C. Water and toluene were added and separated, and the toluene layer was washed with 3% hydrochloric acid, an aqueous saturated solution of sodium hydrogen carbonate and water. Sodium hydroxide (50 g), ethanol (500 mL) and water (200 mL) were added to residues obtained by distilling off toluene and refluxed for 2 hours. The residues obtained by distilling off ethanol were poured into 5% hydrochloric acid (500 mL) to obtain crystals. The crystals obtained by filtration were recrystallized from a solvent mixture of ethanol and water to obtain 4-(3-ethyloxetane-3-ylmethoxy)benzoic acid (OX5: 60 g). Melting point: 127.5° C.

(OX5)

Step 3: Under a nitrogen atmosphere, a dichloromethane solution (100 mL) of N,N'-dicyclohexyl carbodiimide (12 g) was dropped under ice cooling to a mixture of 4-(3-ethyloxetane-3-ylmethoxy)benzoic acid (OX5: 15 g), 2,2-bis(4-hydroxyphenyl)-hexafluoropropane (10 g), 4-dimethylaminopyridine (0.2 g), and dichloromethane (300 mL). After stirring at a room temperature for 12 hours, insoluble materials were removed by filtration. Water was added to the filtrates, which were washed with hydrochloric acid, an aqueous solution of sodium hydroxide and water. After drying the organic layer over anhydrous magnesium sulfate, the solvent was distilled off under a reduced pressure. Residues were fractionated by silica gel chromatography (toluene/ethyl acetate=9/1), and recrystallized from a solvent mixture of toluene and ethanol to obtain a compound (5-1-1) (16 g). Melting point: 182° C. (decomposed)

$^1$H-NMR (CDCl$_3$; δ ppm): 8.17 (d, 4H), 7.49 (d, 4H), 7.26 (d, 4H), 7.04 (d, 4H), 4.59 (d, 4H), 4.52 (d, 4H), 4.19 (s, 4H), 1.89-1.94 (m, 4H), 0.96 (t, 6H).

Example 8

Synthesis of Compound Represented by Formula 11

Synthesis of Compound (5-2-1)

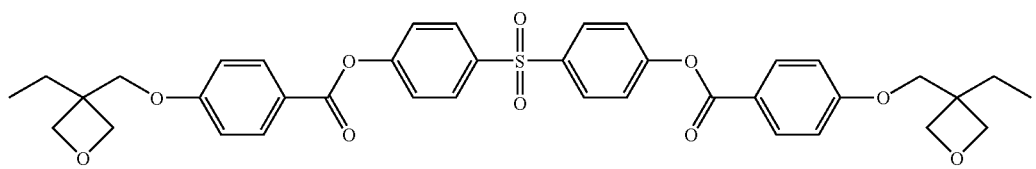

(5-2-1)

Step 1: Under a nitrogen atmosphere, a dichloromethane solution (40 mL) of N,N'-dicyclohexyl carbodiimide (4.4 g) was dropped under ice cooling to a mixture of 4-(3-ethyloxetane-3-ylmethoxy)benzoic acid (OX5: 5.0 g), bis(4-hydroxyphenyl)-sulfone (2.5 g), 4-dimethylaminopyridine (0.06 g), and dichloromethane (100 mL). After stirring at a room temperature for 12 hours, insoluble materials were removed by filtration. Water was added to the filtrates which were washed with hydrochloric acid, an aqueous solution of sodium hydroxide and water. After drying the organic layer over anhydrous magnesium sulfate, the solvent was distilled off under a reduced pressure. Residue were recrystallized from a solvent mixture of methylene chloride and ethanol to obtain compound (5-2-1) (5.3 g). Melting point: 207-208° C.

$^1$H-NMR (CDCl$_3$; δ ppm): 8.15 (d, 4H), 8.03 (d, 4H), 7.39 (d, 4H), 7.04 (d, 4H), 4.59 (d, 4H), 4.52 (d, 4H), 4.19 (s, 4H), 1.89-1.93 (m, 4H), 0.96 (t, 6H).

Example 9

Synthesis of Compound Represented by Formula 11

Synthesis of Compound (5-2-11)

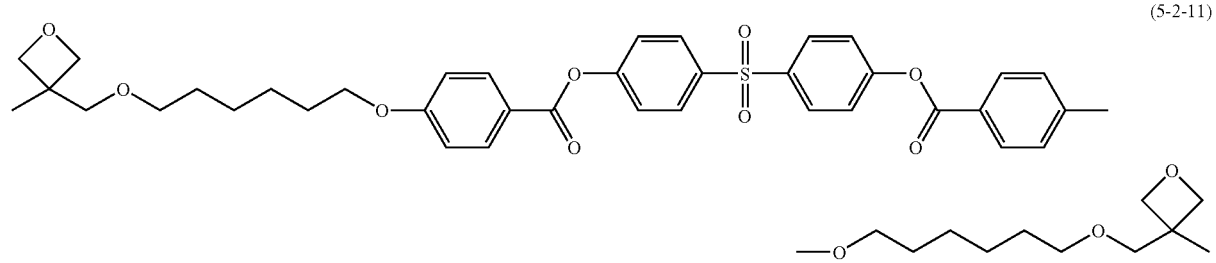

(5-2-11)

Step 1: Under a nitrogen atmosphere, a dichloromethane solution (10 mL) solution of N,N'-dicyclohexyl carbodiimide (2.7 g) was dropped under ice cooling to a mixture of 4-[6-(3-methyloxetane-3-ylmethoxy)hexyloxy]benzoic acid (OX1: 4 g), bis(4-hydroxyphenyl)-sulfone (1.5 g), 4-dimethylaminopyridine (0.1 g), and dichloromethane (80 mL). After stirring at a room temperature for 12 hours, insoluble materials were removed by filtration. Water was added to the filtrates which were washed with hydrochloric acid, an aqueous solution of sodium hydroxide and water. After drying the organic layer over anhydrous magnesium sulfate, the solvent was distilled off under a reduced pressure. Residues were recrystallized from a solvent mixture of methylene chloride and ethanol to obtain a compound (5-2-11) (2.3 g). Melting point: 66-68° C.

$^1$H-NMR (CDCl$_3$; δ ppm): 8.19 (d, 4H), 8.02 (d, 4H), 7.38 (d, 4H), 6.97 (d, 4H), 4.51 (d, 4H), 4.35 (d, 4H), 4.05 (t, 4H), 3.48 (t, 8H), 1.85-1.82 (m, 4H), 1.65-1.60 (m, 4H), 1.51-1.45 (m, 8H), 1.31 (s, 6H).

Example 10

Preparation of Composition (P-1)

A polymerizable liquid crystal composition (M-1) comprising 20% by weight of a compound (1-1-3), 60% by weight of a compound (2-1-3) and 20% by weight of a compound (3-1-3) was prepared. The compound (2-1-3) was synthesized by the method described in JP-A No. 2003-238491. The compound (3-1-3) was synthesized by the method described in *Macromolecules*, 23, 3938-43, (1990).

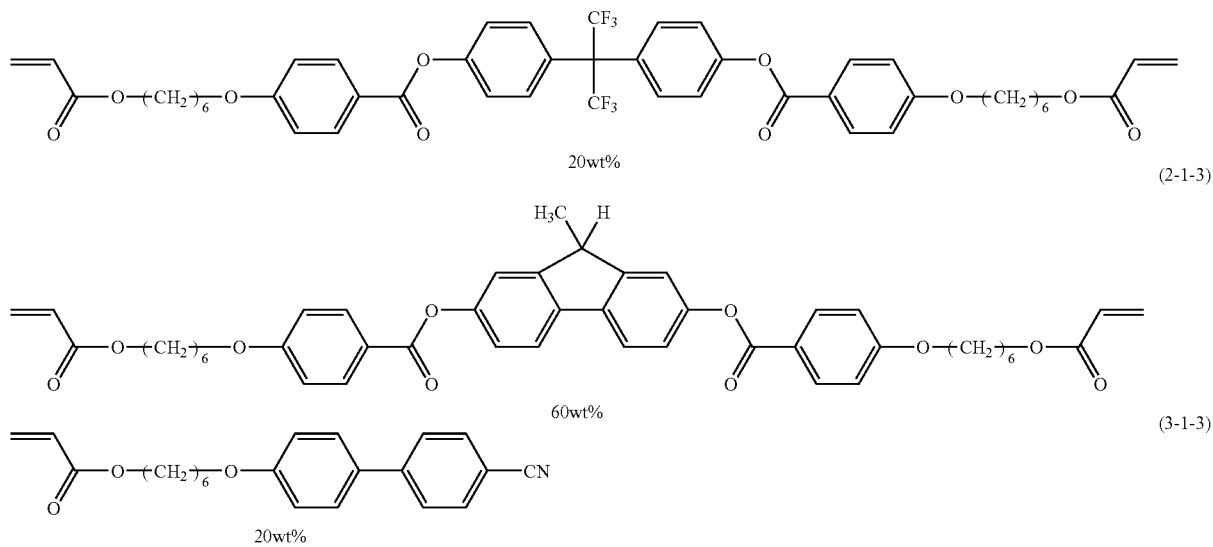

Then, after adding 3% by weight of a polymerization initiator (trade name of products: IRGACURE 907®, manufactured by Ciba Specialty Chemicals Co.) to the polymerizable liquid crystal composition (M-1), toluene was added to prepare a 25 wt % solution. This is a composition (P-1).

Example 11

Preparation of Composition (P-2)

A polymerizable liquid crystal composition (M-2) comprising 10% by weight of a compound (1-2-3), 70% by weight of a compound (2-1-3) and 20% by weight of a compound (3-1-3) was prepared.

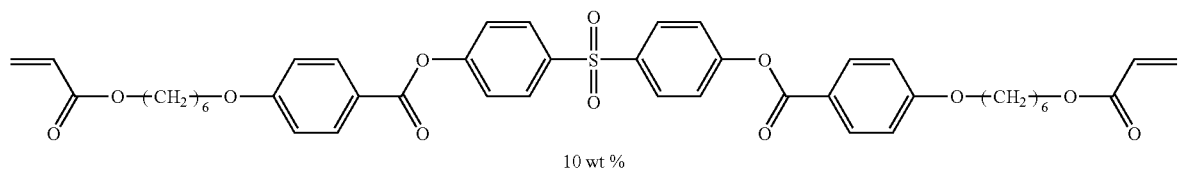

-continued

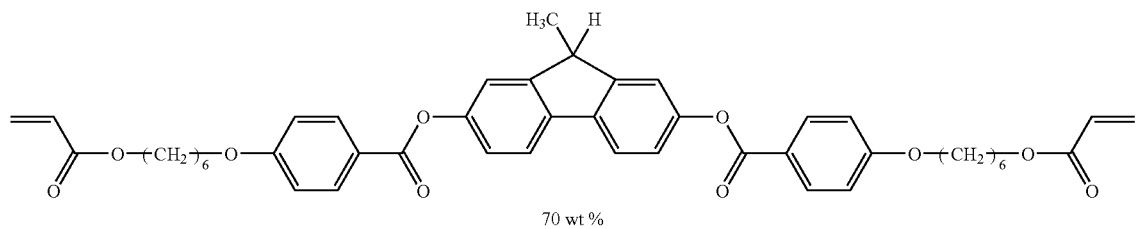

70 wt %

20 wt %

Then, after adding 3% by weight of a polymerization initiator (trade name of products: IRGACURE 907®, manufactured by Ciba Specialty Chemicals Co.) to the polymerizable liquid crystal composition (M-2), toluene was added to prepare a 25 wt % solution. This is a composition (P-2).

Example 12

Preparation of Composition (P-3)

A polymerizable liquid crystal composition (M-3) comprising 20% by weight of a compound (1-2-3), 60% by weight of a compound (2-2-7) and 20% by weight of a compound (3-1-3) was prepared.

Then, after adding 3% by weight of a polymerization initiator (trade name of products: IRGACURE 907®, manufactured by Ciba Specialty Chemicals Co.) to the polymerizable liquid crystal composition (M-3), toluene was added to prepare a 25 wt % solution. This is a composition (P-3).

Example 13

Preparation of Composition (P-4)

A polymerizable liquid crystal composition (M-4) comprising 20% by weight of a compound (1-1-8), 60% by weight of a compound (2-1-3) and 20% by weight of a compound (3-1-3) was prepared.

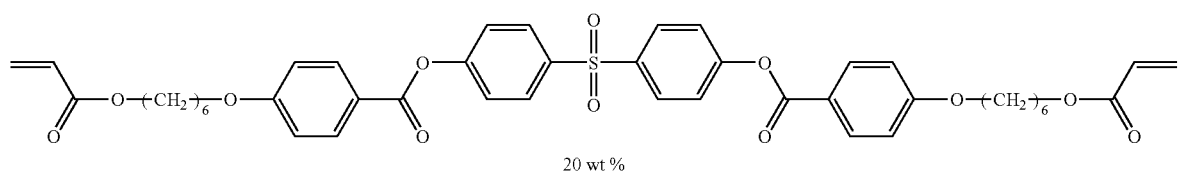

20 wt %

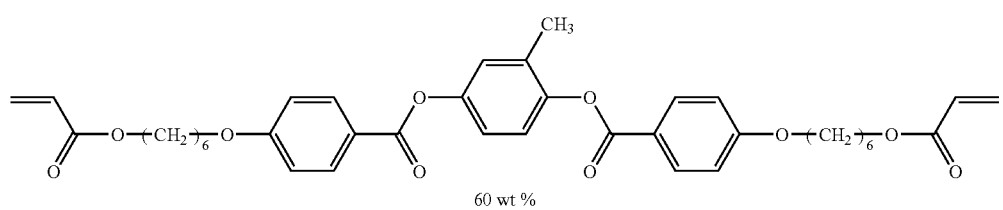

60 wt %

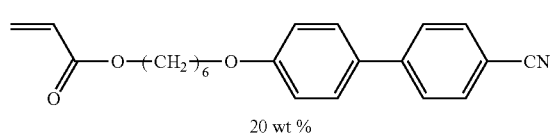

20 wt %

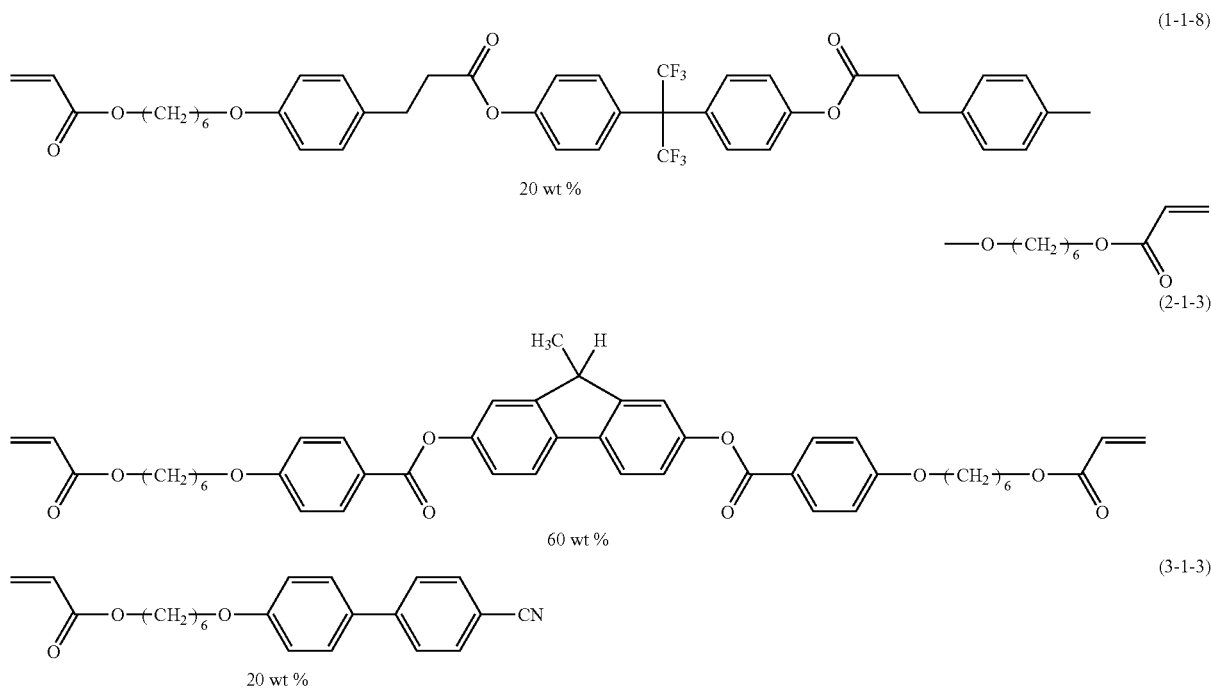

(1-1-8) 20 wt %

(2-1-3) 60 wt %

(3-1-3) 20 wt %

Then, after adding 3% by weight of a polymerization initiator (trade name of products: IRGACURE 907®, manufactured by Ciba Specialty Chemicals Co.) to the polymerizable liquid crystal composition (M-4), toluene was added to prepare a 25 wt % solution. This is a composition (P-4).

Example 14

Preparation of Composition (P-5)

A polymerizable liquid crystal composition (M-5) comprising 20% by weight of a compound (5-1-1), 60% by weight of a compound (6-1-1) and 20% by weight of a compound (7-14) was prepared. The compound (6-1-1) was synthesized by the method described in JP-A No. 2005-60373. The compound (7-1-4) was synthesized by conducting an etherfying reaction between 4'-hydroxy-cyanobiphenyl and 6-bromohexene and then oxidizing the same with m-chloroperbenzoic acid. The phase transition temperature was C68N701.

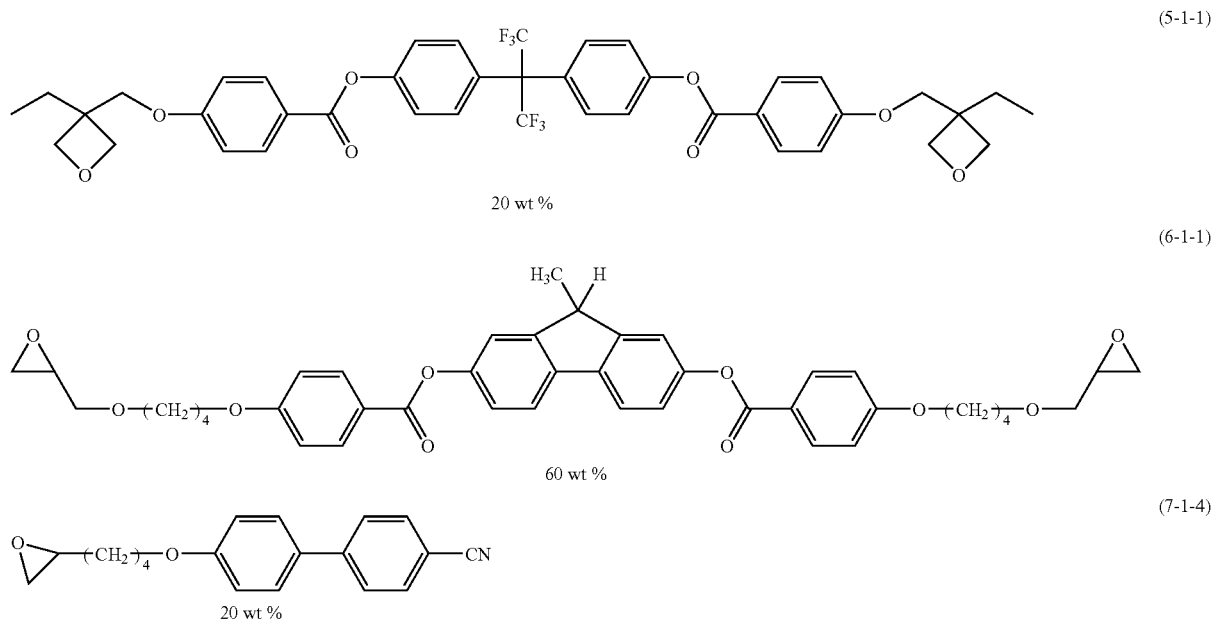

(5-1-1) 20 wt %

(6-1-1) 60 wt %

(7-1-4) 20 wt %

Then, after adding 3% by weight of a polymerization initiator (DTS-102® manufactured by Midori Kagaku Co. Ltd.) to the polymerizable liquid crystal composition (M-5), a solvent mixture (mixing ratio of toluene/cyclopentanone: 2/1 weight ratio) was added to prepare a 20 wt % solution. This is a composition (P-5).

Example 15

Preparation of Composition (P-6)

The compound (4-1) was added to the composition (P-1) described in Example 10 such that the compound (4-1) was at a ratio of 10 parts by weight based on 100 parts by weight of the polymerizable liquid crystal composition (M-1). The compound (5) is Sila-Ace S-330®, trade name of products manufactured by Chisso Co. Ltd. This is a composition (P-6).

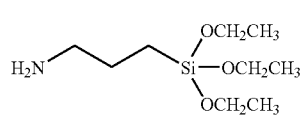

(4-1)

Example 16

Preparation of Composition (P-7)

Ten percent (10%) by weight of the compound (4-1) was added based on the polymerizable liquid crystal composition (M-3) to the composition (P-3) described in Example 12. This is a composition (P-7).

Example 17

Evaluation for Polymer Film (F-1)

A TAC film applied with a saponification treatment was used as a support substrate. The surface of the film was rubbed by a rayon cloth. The composition (P-1) described in Example 10 was coated on the TAC film by using a bar coater. After coating, by heat treatment for 5 minutes in an oven set to 70° C., the solvent was removed and the liquid crystal layer was aligned. UV-light (30 mW/cm$^2$; 365 nm) was irradiated at 25° C. for 30 seconds by using a superhigh pressure mercury lamp (250 W) in a nitrogen atmosphere to the thus formed paint film. The polymer film (F-1) was formed by polymerization. Under the visual observation, alignment of the film (F—) was homogeneous. Also from the result of measurement by an apparatus (shown in FIG. 1), the alignment was homogeneous. The surface hardness of the film (F-1) was HB at the pencil hardness. In the Cellotape peeling test, peeling did not occur at all and all of gridirons were remained. There was no change in the retardation after the heat resistance test at 100° C. for 500 hours. As described above, the liquid crystal aligned film (F-1) was less peeled from the support substrate and had optical anisotropy and sufficient hardness.

Example 18

Evaluation for Polymer Film (F-2)

A TAC film applied with a saponification treatment was used as a support substrate. The surface of the film was rubbed by a rayon cloth. The composition (P-2) described in Example 11 was coated on the TAC film by using a bar coater. After coating, by heat treatment for 5 minutes in an oven set to 70° C., the solvent was removed to align the liquid crystal layer. UV-light (30 mW/cm$^2$; 365 nm) was irradiated at 25° C. for 30 seconds by using a superhigh pressure mercury lamp (250 W) in a nitrogen atmosphere to the thus formed paint film. The polymer film (F-2) was formed by polymerization. Under the visual observation, alignment of the film (F-2) was homogeneous. Also from the result of measurement by an apparatus, the alignment was homogeneous. The surface hardness of the film (F-2) was HB at the pencil hardness. In the Cellotape peeling test, peeling did not occur at all and all of gridirons were remained. There was no change in the retardation after the heat resistance test at 100° C. for 500 hours. As described above, the liquid crystal aligned film (F-2) was less peeled from the support substrate and had optical isomerism and sufficient hardness.

Example 19

Evaluation for Polymer Film (F-3)

A TAC film applied with a saponification treatment was used as a support substrate. The surface of the film was rubbed by a rayon cloth. The composition (P-3) described in Example 12 was coated on the TAC film by using a bar coater. After coating, by heat treatment for 5 minutes in an oven set to 70° C., the solvent was removed to align the liquid crystal layer. UV-light (30 mW/cm$^2$; 365 nm) was irradiated at 25° C. for 30 seconds by using a superhigh pressure mercury lamp (250 W) in a nitrogen atmosphere to the thus formed paint film. The polymer film (F-3) was formed by polymerization. Under the visual observation, alignment of the film (F-3) was homogeneous. Also from the result of measurement by an apparatus (shown in FIG. 1), the alignment was homogeneous. The surface hardness of the film (F-3) was HB at the pencil hardness. In the Cellotape peeling test, peeling did not occur at all and all of gridirons were remained. There was no change in the retardation after the heat resistance test at 100° C. for 500 hours. As described above, the liquid crystal aligned film (F-3) was less peeled from the support substrate and had optical isomerism and sufficient hardness.

Example 20

Evaluation for Polymer Film (F-4)

The composition (P-4) described in Example 13 was treated in the same manner as in Example 19 to obtain a polymer film (F-4). In the visual observation, the alignment of the film (F-4) was homogeneous. This was identical with the result of measurement by the apparatus. The surface hardness of the film (F-4) was HB at the pencil hardness. In the Cellotape peeling test, peeling did not occur at all and all of gridirons were remained. There was no change in the retardation after the heat resistance test at 100° C. for 500 hours. As described above, the liquid crystal aligned film (F-4) was less peeled from the support substrate and had optical isomerism and sufficient hardness.

Example 21

Evaluation for Polymer Film (F-5)

The composition (P-5) described in Example 14 was treated in the same manner as in Example 19 to obtain a polymer film (F-5). In the visual observation, the alignment of the film (F-5) was homogeneous. This was identical with the result of measurement by the apparatus. The surface hardness of the film (F-5) was HB at the pencil hardness. In the Cellotape peeling test, peeling did not occur at all and all of gridirons were remained. There was no change in the retardation after the heat resistance test at 100° C. for 500 hours. As described above, the liquid crystal aligned film (F-5) was less peeled from the support substrate and had optical isomerism and sufficient hardness.

Example 22

Evaluation for Polymer Film (F-6)

Figure 2:
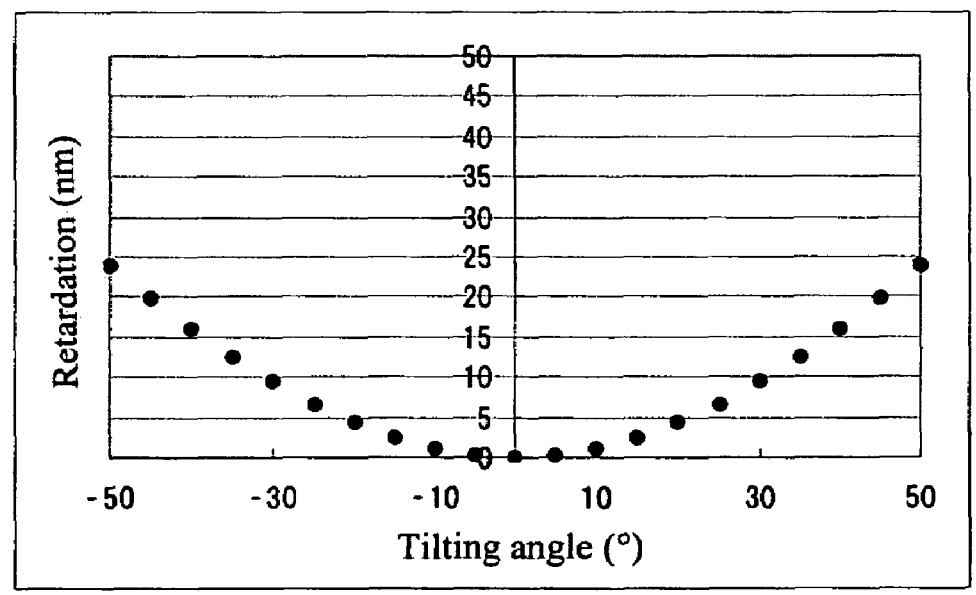
FIG. 2 shows homeotropic alignment, which is a result of measuring retardation of a polymer film (F-6) obtained in Example 22.

A TAC film applied with a saponification treatment was used for the support substrate. The film was not applied with the rubbing treatment. The composition (P-6) described in Example 11 was coated on the TAC film by using a bar coater. After coating, by heat treatment for 5 minutes in an oven set to 70° C., the solvent was removed to align the liquid crystal layer. A UV-light (30 mW/cm$^2$; 365 nm) was irradiated at 25° C. for 30 seconds in the nitrogen atmosphere by using a superhigh pressure mercury lamp (250 W) to the formed paint film. A polymer film (F-6) was formed by polymerization. In the visual observation, the alignment of the film (F-6) was homeotropic (perpendicular alignment). This was identical with the result of measurement (shown in FIG. 2) by an apparatus. The surface hardness of the film (F-6) was H at the pencil hardness. In the Cellotape peeling test, peeling did not occur at all and all of gridirons were remained. There was no change in the retardation after the heat resistance test at 100° C. for 500 hours. As described above, the liquid crystal aligned film (F-6) was less peeled from the support substrate and had an optical isomerism and a sufficient hardness.

Example 23

Evaluation for Polymer Film (F-7)

The composition (P-7) described in Example 16 was treated in the same manner as in Example 22 to obtain a polymer film (F-7). In the visual observation, the alignment of the film (F-7) was homeotropic (vertical alignment). This was identical with the result of measurement by the apparatus. The surface hardness of the film (F-7) was H at the pencil hardness. In the Cellotape peeling test, peeling did not occur at all and all of gridirons were remained. There was no change in the retardation after the heat resistance test at 100° C. for 500 hours. As described above, the liquid crystal aligned film (F-7) was less peeled from the support substrate and had an optical isomerism and a sufficient hardness.

Although the invention has been described and illustrated with a certain degree of particularity, it is understood that the present disclosure has been made only by way of example, and that numerous changes in the conditions and order of steps can be resorted to by those skilled in the art without departing from the spirit and scope of the invention.

What is claimed is:

1. A polymerizable liquid crystal composition comprising at least one compound selected from the group of compounds represented by the formula (1-1) and the formula (1-2) as a first ingredient, at least one compound selected from the group of compounds represented by the formula (2-1) and the formula (2-2) as a second ingredient, and at least one compound selected from the group of compounds represented by the formula (3-1) as a third ingredient,

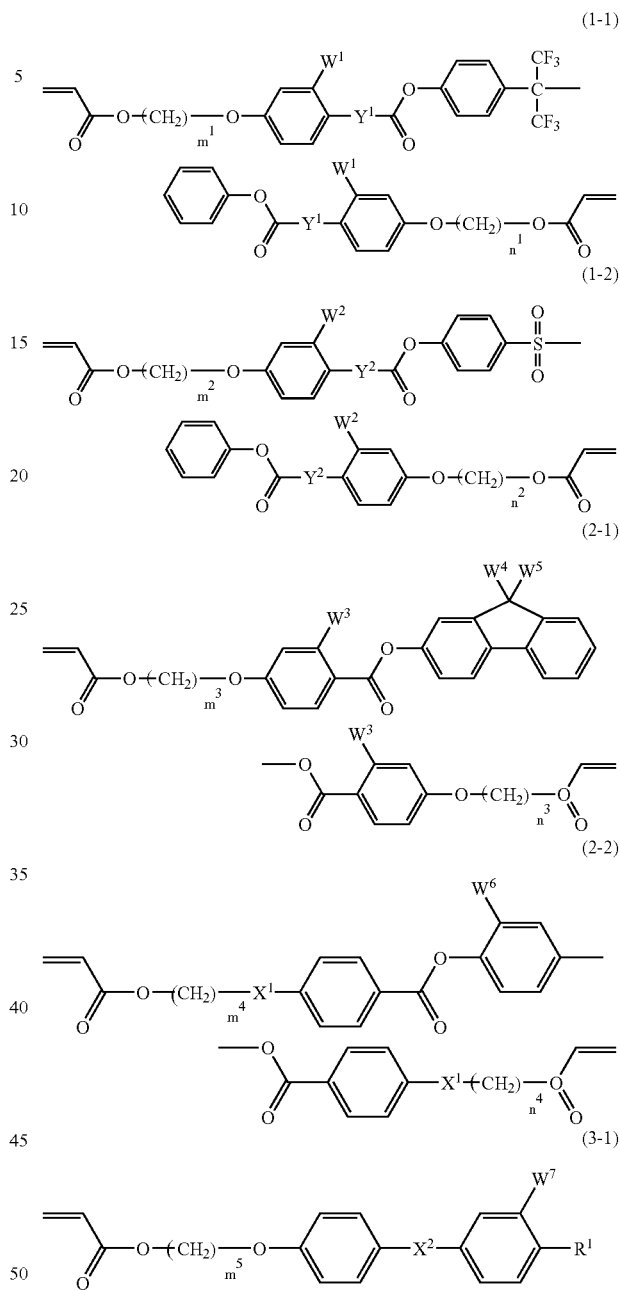

in which $Y^1$ and $Y^2$ each represents independently a single bond, —(CH$_2$)$_2$— or —CH=CH—, $W^1$ and $W^2$ each represents independently hydrogen or fluorine, $m^1$, $m^2$, $n^1$, and $n^2$ each represents independently an integer of from 2 to 15 in the formula (1-1) and the formula (1-2); $W^3$ represents hydrogen or fluorine, $W^4$ and $W^5$ each represents independently hydrogen or methyl, $W^6$ represents hydrogen or methyl, $X^1$ is a group represented by —O— or the following formula ($X^1$-2),

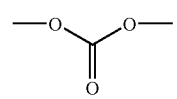

and $m^3$, $m^4$, $n^3$, and $n^4$ each represents independently an integer of from 2 to 15 in the formula (2-1) and the formula (2-2); and $R^1$ represents cyano, trifluoromethoxy, alkyl of 1 to 10 carbon atoms, or alkoxy of 1 to 10 carbon atoms, $W^7$ represents hydrogen or fluorine, $X^2$ represents a single bond, —COO—, or —OCO—, and $m^5$ represents an integer of from 2 to 15 in the formula (3-1).

2. The polymerizable liquid crystal composition according to claim 1, wherein the second ingredient is at least one compound selected from the group of compounds represented by the formula (2-1), the ratio of the first ingredient is within a range from approximately 1% to approximately 25% by weight, the ratio of the second ingredient is within a range from approximately 50% to approximately 98% by weight, and the ratio of the third ingredient is within a range from approximately 1% to approximately 25% by weight based on the polymerizable liquid crystal composition; $Y^1$ and $Y^2$ each represents independently a single bond or —$(CH_2)_2$—, $W^1$ and $W^2$ each represents independently hydrogen or fluoride, and $m^1$, $m^2$, $n^1$, and $n^2$ each represents independently an integer of from 2 to 10 in the formula (1-1) and the formula (1-2); $W^3$ represents hydrogen, $W^4$ represents hydrogen, $W^5$ represents methyl, and $m^3$ and $n^3$ each represents independently an integer of from 2 to 10 in the general formula (2-1); and $X^2$ represents a single bond, —COO—, or —OCO—, $W^7$ represents hydrogen, $m^5$ represents an integer of from 2 to 10, and $R^1$ represents cyano, alkyl of 2 to 8 carbon atoms, or alkoxy of 2 to 8 carbon atoms in the formula (3-1).

3. The polymerizable liquid crystal composition according to claim 2, wherein the ratio of the first ingredient is within a range from approximately 7% to approximately 22% by weight, the ratio of the second ingredient is within a range from approximately 56% to approximately 86% by weight, and the ratio of the third ingredient is within the range from approximately 7% to approximately 22% by weight based on the polymerizable liquid crystal composition; $Y^1$ and $Y^2$ each represents independently a single bond or —$(CH_2)_2$—, $W^1$ and $W^2$ each represents hydrogen, and $m^1$, $m^2$, $n^1$, and $n^2$ each represents independently an integer of from 4 to 6 in the formula (1-1) and the formula (1-2); $W^3$ represents hydrogen, $W^4$ represents hydrogen, $W^5$ represents methyl, and $m^3$ and $n^3$ each represents independently an integer of from 4 to 6 in the general formula (2-1); and $X^2$ represents a single bond, $W^7$ represents hydrogen, $m^5$ represents an integer of from 4 to 6, and $R^1$ represents cyano in the formula (3-1).

4. The polymerizable liquid crystal composition according to claim 1, wherein the second ingredient is at least one compound selected from the group of compounds represented by the formula (2-2), the ratio of the first ingredient is within a range from approximately 1% to approximately 25% by weight, the ratio of the second ingredient is within a range from approximately 50% to approximately 98% by weight, and the ratio of the third ingredient is within a range from approximately 1% to approximately 25% by weight based on the polymerizable liquid crystal composition; $Y^1$ and $Y^2$ each represents independently a single bond or —$(CH_2)_2$—, $W^1$ and $W^2$ each represents independently hydrogen or fluoride, and $m^1$, $m^2$, $n^1$, and $n^2$ each represents independently an integer of from 2 to 10 in the formula (1-1) and the formula (1-2); $X^1$ is a group represented by —O— or the following formula ($X^1$-2),

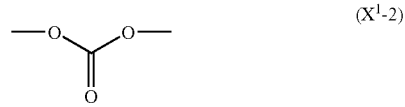

$W^6$ represents hydrogen or methyl, $m^4$ and $n^4$ each represents independently an integer of from 2 to 10 in the formula (2-2); and $X^2$ represents a single bond, —COO—, or —OCO—, $W^7$ represents hydrogen, $m^5$ represents an integer of from 2 to 10, and $R^1$ represents cyano, alkyl of 2 to 8 carbon atoms, or alkoxy of 2 to 8 carbon atoms in the formula (3-1).

5. The polymerizable liquid crystal composition according to claim 4, wherein the ratio of the first ingredient is within a range from approximately 7% to approximately 22% by weight, the ratio of the second ingredient is within a range from approximately 56% to approximately 86% by weight, and the ratio of the third ingredient is within the range from approximately 7% to approximately 22% by weight based on the polymerizable liquid crystal composition; $Y^1$ and $Y^2$ each represents independently a single bond or —$(CH_2)_2$—, $W^1$ and $W^2$ each represents hydrogen, and $m^1$, $m^2$, $n^1$, and $n^2$ each represents independently an integer of from 4 to 6 in the formula (1-1) and the formula (1-2); $W^6$ represents methyl, $X^1$ represents —O—, and $m^4$ and $n^4$ each represents independently an integer of from 4 to 6 in the general formula (2-2); and $X^2$ represents a single bond, $W^7$ represents hydrogen, $m^5$ represents an integer of from 4 to 6, and $R^1$ represents cyano in the formula (3-1).

6. The polymerizable liquid crystal composition according to claim 1, further comprising a silane coupling agent represented by the following formula (4),

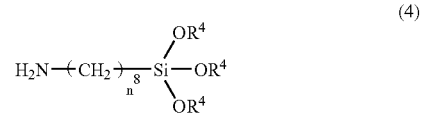

wherein the ratio of the polymerizable liquid crystal composition to the silane coupling agent is within a range from approximately 100:1 to approximately 100:10 by weight ratio in which $R^4$ represents methyl or ethyl, and $n^8$ represents an integer of from 1 to 5 in the formula (4).

7. The polymerizable liquid crystal composition according to claim 2, further comprising a silane coupling agent represented by the following formula (4),

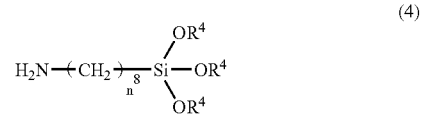

wherein the ratio of the polymerizable liquid crystal composition to the silane coupling agent is within a range from approximately 100:1 to approximately 100:10 by weight ratio in which $R^4$ represents methyl or ethyl, and $n^8$ represents an integer of from 1 to 5 in the formula (4).

8. The polymerizable liquid crystal composition according to claim 3, further comprising a silane coupling agent represented by the following formula (4),

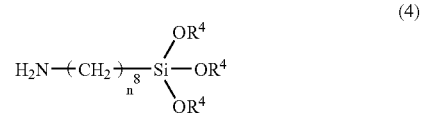

wherein the ratio of the polymerizable liquid crystal composition to the silane coupling agent is within a range from approximately 100:1 to approximately 100:10 by weight ratio in which $R^4$ represents methyl or ethyl, and $n^8$ represents an integer of from 1 to 5 in the formula (4).

9. The polymerizable liquid crystal composition according to claim 4, further comprising a silane coupling agent represented by the following formula (4), (4)

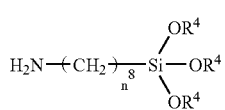

wherein the ratio of the polymerizable liquid crystal composition to the silane coupling agent is within a range from approximately 100:1 to approximately 100:10 by weight ratio in which $R^4$ represents methyl or ethyl, and $n^8$ represents an integer of from 1 to 5 in the formula (4).

10. The polymerizable liquid crystal composition according to claim 5, further comprising a silane coupling agent represented by the following formula (4), (4)

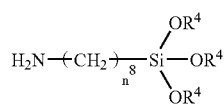

wherein the ratio of the polymerizable liquid crystal composition to the silane coupling agent is within a range from approximately 100:1 to approximately 100:10 by weight ratio in which $R^4$ represents methyl or ethyl, and $n^8$ represents an integer of from 1 to 5 in the formula (4).

11. A polymerizable liquid crystal composition comprising at least one compound selected from the group of compounds represented by the formula (5-1) and the formula (5-2) as a first ingredient, at least one compound selected from the group of compounds represented by the formula (6-1) and the formula (6-2) as a second ingredient, and at least one compound selected from the group of compounds represented by the formula (7-1) as a third ingredient, in which $R^2$ and $R^3$ each represents independently methyl or ethyl, $Y^3$ and $Y^4$ each represents independently a single bond, $-(CH_2)_2-$ or $-CH=CH-$, $W^8$ and $W^9$ each represents independently hydrogen or fluorine, $Q^1$ and $Q^2$ each represents a single bond, $-O-(CH_2)_{r^1}-$, or $-(CH_2)_{r^1}-O-$, $r^1$ represents an integer of from 1 to 15 in the formula (5-1) and the formula (5-2); $W^{10}$ and $W^{11}$ each represents independently hydrogen or methyl, $m^6$, $m^7$, $n^6$, and $n^7$ each represents independently an integer of from 2 to 15 in the formula (6-1) and the formula (6-2); $X^3$ represents a single bond, $-COO-$, or $-OCO-$, $R^5$ represents cyano, alkyl of 2 to 8 carbon atoms, or alkoxy of 2 to 8 carbon atoms, and $m^8$ represents an integer of from 2 to 15 in the formula (7-1).

12. The polymerizable liquid crystal composition according to claim 11, wherein the first ingredient is at least one compound selected from the group of compounds represented by the general formula (5-1), and the second ingredient is at least one compound selected from the group of compounds represented by the general formula (6-1), the ratio of the first ingredient is within a range from approximately 1% to approximately 20% by weight, the ratio of the second ingredient is within a range from approximately 60% to approximately 98% by weight, and the ratio of the third ingredient is within a range from approximately 1% to approximately 20% by weight based on the polymerizable liquid crystal composition; $R^2$ represents methyl or ethyl, $Y^3$ represents a single bond or $-(CH_2)_2-$, $W^8$ represents hydrogen or fluorine, $Q^1$ represents a single bond, $-O-(CH_2)r^1-$, or $-(CH_2)r^1-O-$, $r^1$ represents an integer of from 1 to 10 in the formula (5-1); $W^{10}$ and $W^{11}$ each represents independently hydrogen or methyl, $m^6$, and $n^6$ each represents independently an integer of from 2 to 10 in the formula (6-1); and $X^3$ represents a single bond, $R^5$ represents cyano, and $m^8$ is an integer of from 2 to 10 in the formula (7-1).

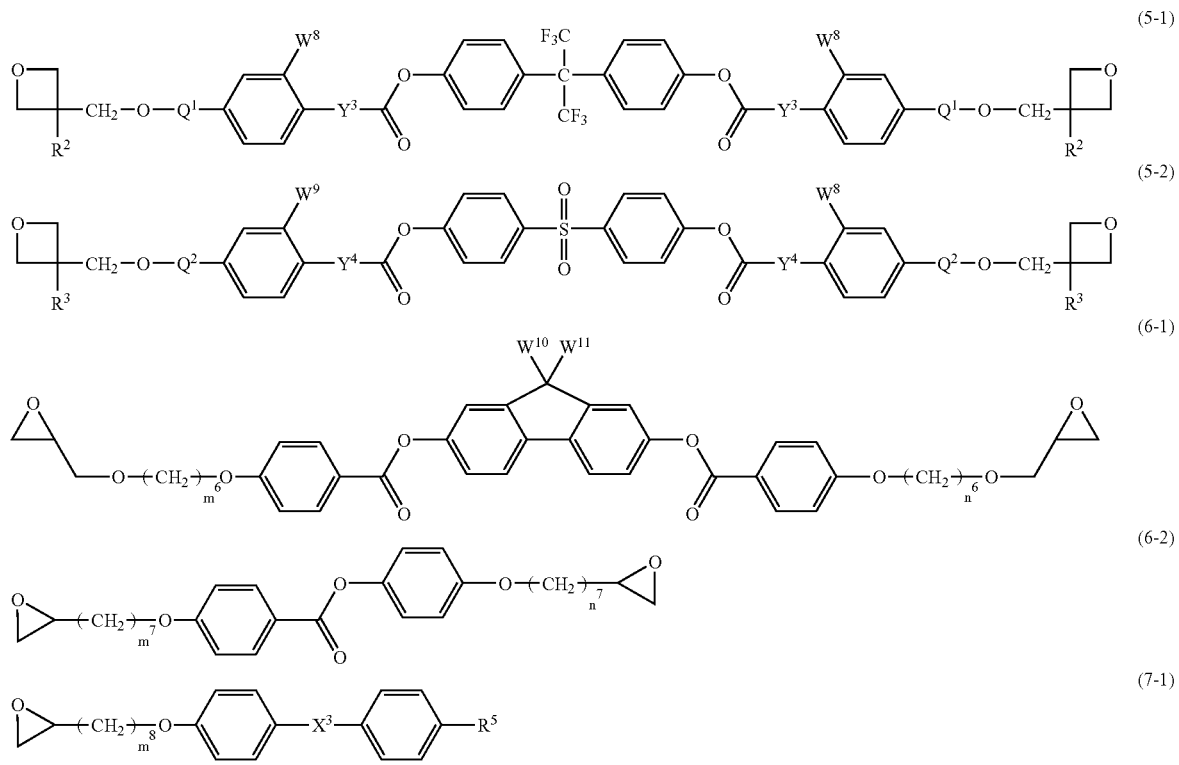

13. The polymerizable liquid crystal composition according to claim 12, wherein the ratio of the first ingredient is within a range from approximately 7% to approximately 20% by weight, the ratio of the second ingredient is within a range from approximately 60% to approximately 86% by weight, and the ratio of the third ingredient is within a range from approximately 7% to approximately 20% by weight based on the polymerizable liquid crystal composition; $R^2$ represents ethyl, $Y^3$ represents a single bond, $W^8$ represents hydrogen, and $Q^1$ represents a single bond in the formula (5-1); $W^{10}$ and $W^{11}$ each represents independently hydrogen or methyl, $m^6$ and $n^6$ each represents independently an integer of from 4 to 6 in the formula (6-1); and $X^3$ represents a single bond, $R^5$ represents cyano, and $m^8$ represents an integer of from 2 to 4 in the formula (7-1).

14. A polymer obtained by polymerizing the polymerizable liquid crystal composition according to claim 1.

15. A polymer obtained by polymerizing the polymerizable liquid crystal composition according to claim 11.

16. The polymer of claim 14, wherein said polymer is a polymer film.

17. The polymer of claim 15, wherein said polymer is a polymer film.

18. A phase difference plate comprising the polymer film of claim 16.

19. A phase difference plate comprising the polymer film of claim 17.

20. A liquid crystal display device comprising the polymer film of claim 16.

21. A liquid crystal display device comprising the polymer film of claim 17.

22. A compound represented by the formula (7):

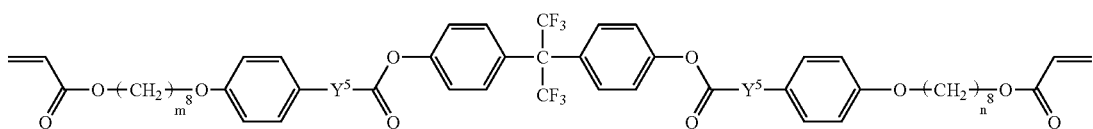

(7)

in which $Y^5$ represents —$CH_2CH_2$—, or —CH=CH—, and $m^8$ and $n^8$ each represents independently an integer of from 2 to 15 in the formula (7).

23. A compound represented by the formula (8):

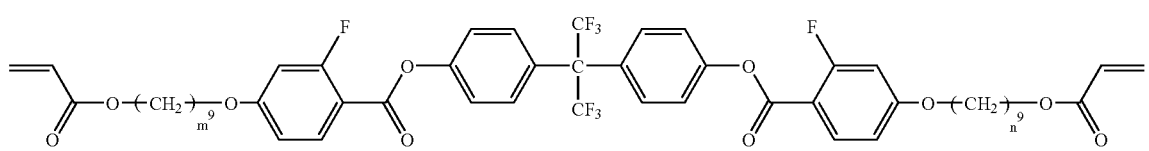

(8)

in which $m^9$ and $n^9$ each represents independently an integer of from 2 to 15 in the formula (8).

24. A compound represented by the formula (9):

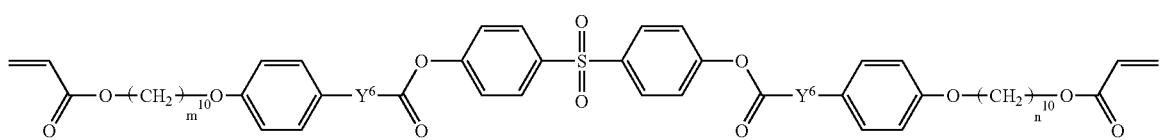

(9)

in which $Y^6$ represents —$CH_2CH_2$—, or —CH=CH—, and $m^{10}$ and $n^{10}$ each represents independently an integer of from 2 to 15 in the formula (9).

25. A compound represented by the formula (10):

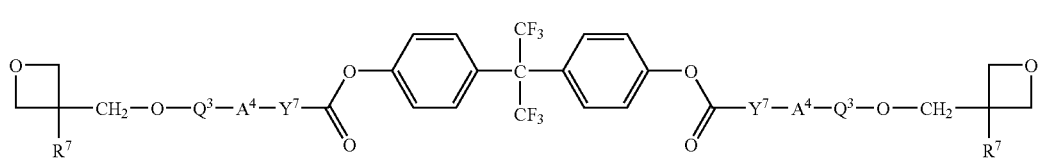

(10)

in which $R^7$ represents hydrogen, methyl, or ethyl, $A^4$ represents 1,4-phenylene, 2-fluoro-1,4-phenylene, 3-fluoro-1,4-phenylene, naphthalene-2,6-diyl or pyridine-2,5-diyl, $Y^7$ represents a single bond, —$CH_2CH_2$—, or —CH=CH—, $Q^3$ represents a single bond, —O—$(CH_2)r^2$- or —$(CH_2)r^2$-O—, and $r^2$ represents an integer of from 1 to 15 in the formula (10).

26. The compound according to claim 25, wherein $R^7$ represents methyl or ethyl, $A^4$ represents 1,4-phenylene, $Y^7$ represents a single bond, and $Q^3$ represents a single bond in the formula (10).

27. A compound represented by the formula (11):

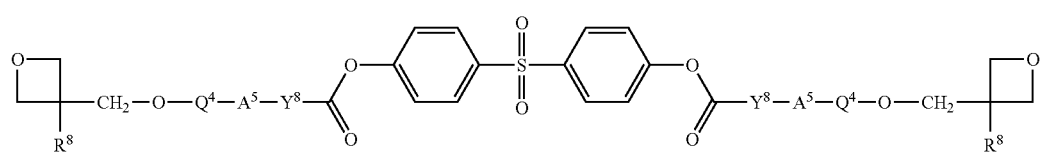

(11)

in which $R^8$ represents hydrogen, methyl, or ethyl, $A^5$ represents 1,4-phenylene, 2-fluoro-1,4-phenylene, 3-fluoro-1,4-phenylene, naphthalene-2,6-diyl or pyridine-2,5-diyl, $Y^8$ represents a single bond, —$CH_2CH_2$—, or —CH=CH—, $Q^4$ represents a single bond, —O—$(CH_2)r^3$- or —$(CH_2)r^3$-O—, and $r^3$ represents an integer of from 1 to 15 in the formula (11).

28. The compound according to claim 27, wherein $R^8$ represents ethyl, $A^5$ represents 1,4-phenylene, $Y^8$ represents a single bond, and $Q^4$ represents a single bond in the formula (11).

29. The compound according to claim 27, wherein $R^8$ represents methyl, or ethyl, $A^5$ represents 1,4-phenylene, $Y^8$ represents a single bond, $Q^4$ represents —O—$(CH_2)r^3$- or —$(CH_2)r^3$-O—, and $r^3$ represents an integer of from 1 to 10 in the formula (11).

* * * * *